US011373182B2

(12) United States Patent
Gilliam, III et al.

(10) Patent No.: US 11,373,182 B2
(45) Date of Patent: *Jun. 28, 2022

(54) SYSTEM AND METHOD FOR TRANSFERRING FUNDS

(71) Applicant: Early Warning Services, LLC, Scottsdale, AZ (US)

(72) Inventors: Clinton Gilliam, III, San Francisco, CA (US); Melissa Lowry, San Francisco, CA (US); Michael Joseph Kennedy, San Francisco, CA (US); Sergei Lilichenko, Orinda, CA (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/551,627

(22) Filed: Aug. 26, 2019

(65) Prior Publication Data

US 2019/0378132 A1    Dec. 12, 2019

Related U.S. Application Data

(63) Continuation of application No. 15/209,685, filed on Jul. 13, 2016, now Pat. No. 10,395,247, which is a (Continued)

(51) Int. Cl.
*G06Q 20/40* (2012.01)
*G06Q 20/02* (2012.01)
(Continued)

(52) U.S. Cl.
CPC .......... *G06Q 20/40* (2013.01); *G06Q 20/023* (2013.01); *G06Q 20/10* (2013.01); *G06Q 20/385* (2013.01);
(Continued)

(58) Field of Classification Search
CPC ........ G06Q 20/10; G06Q 40/02; G06Q 20/04; G06Q 20/40; G06Q 20/02; G06Q 40/00
See application file for complete search history.

(56) References Cited

U.S. PATENT DOCUMENTS 2,011,032 A    8/1935  Blanchard
5,229,764 A    7/1993  Matchett et al.
(Continued)

FOREIGN PATENT DOCUMENTS

AU    4034997    3/1998
AU    1757201    5/2001
(Continued)

OTHER PUBLICATIONS

Provident Bank, Universal Payment Identification Code (UPIC) guide (Year: 2016).*
(Continued)

*Primary Examiner* — Hao Fu
(74) *Attorney, Agent, or Firm* — Bryan Cave Leighton Paisner LLP

(57) ABSTRACT

A method including receiving, by a computer system over a computer network from a recipient financial institution, (i) a public identifier associated with a recipient and (ii) a private profile identifier that was generated by the recipient financial institution. The method also can include storing, by the computer system, a record including the public identifier and the private profile identifier in an information directory. The method additionally can include receiving, by the computer system over the computer network, a funds transfer request to transfer funds from a sender account of the sender at a sender financial institution to the recipient account at the recipient financial institution. The method further can include determining, by the computer system, the private profile identifier for the recipient based on the public identifier in the funds transfer request and using the record stored
(Continued)

in the information directory. The method additionally can include in response to receiving the funds transfer request, providing the private profile identifier, by the computer system over the computer network, to the sender financial institution to facilitate a transfer of the funds from the sender account at the sender financial institution to the recipient financial institution. Other embodiments are disclosed.

20 Claims, 24 Drawing Sheets

Related U.S. Application Data continuation-in-part of application No. 14/587,745, filed on Dec. 31, 2014, now Pat. No. 10,318,936, which is a continuation-in-part of application No. 13/782,587, filed on Mar. 1, 2013, now Pat. No. 10,395,223.

(60) Provisional application No. 61/657,339, filed on Jun. 8, 2012, provisional application No. 61/607,882, filed on Mar. 7, 2012.

(51) Int. Cl.
 G06Q 20/10 (2012.01)
 G06Q 20/38 (2012.01)
(52) U.S. Cl.
 CPC ....... *G06Q 20/3821* (2013.01); *G06Q 20/405* (2013.01)

(56) References Cited

U.S. PATENT DOCUMENTS

| | | |
|---|---|---|
| 5,265,007 A | 11/1993 | Barnhard, Jr. et al. |
| 5,282,249 A | 1/1994 | Cohen et al. |
| 5,283,829 A | 2/1994 | Anderson |
| 5,329,589 A | 7/1994 | Fraser et al. |
| 5,383,113 A | 1/1995 | Kight et al. |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,889,863 A | 3/1999 | Weber |
| 5,903,721 A | 5/1999 | Sixtus |
| 5,913,203 A | 6/1999 | Wong et al. |
| 5,915,023 A | 6/1999 | Bernstein |
| 5,920,847 A | 7/1999 | Kolling et al. |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 | 4/2002 | Walker et al. |
| 6,385,595 B1 | 5/2002 | Kolling |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,891,953 B1 | 5/2005 | DeMello et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith, II et al. |
| 7,039,951 B1 | 5/2006 | Chaudhari et al. |
| 7,051,001 B1 | 5/2006 | Slater |
| 7,089,208 B1 | 8/2006 | Levchin et al. |
| 7,098,783 B2 | 8/2006 | Crichlow |
| 7,103,261 B2 | 9/2006 | Grecia |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 | 3/2007 | Nosek |
| 7,200,551 B1 | 4/2007 | Senez |
| 7,206,938 B2 | 4/2007 | Bender et al. |

(56) References Cited

U.S. PATENT DOCUMENTS

| | | |
|---|---|---|
| 7,227,950 B2 | 6/2007 | Faith et al. |
| 7,240,031 B1 | 7/2007 | Kight et al. |
| 7,249,098 B2 | 7/2007 | Milberger et al. |
| 7,254,235 B2 | 8/2007 | Boudreault et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,343,014 B2 | 3/2008 | Sovio et al. |
| 7,349,871 B2 | 3/2008 | Labrou et al. |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |
| 7,475,039 B2 | 1/2009 | Remington et al. |
| 7,475,808 B1 | 1/2009 | Bishop et al. |
| 7,478,066 B2 | 1/2009 | Remington et al. |
| 7,499,887 B2 | 3/2009 | Boyle et al. |
| 7,505,937 B2 | 3/2009 | Dilip et al. |
| 7,519,560 B2 | 4/2009 | Lam et al. |
| 7,526,650 B1 | 4/2009 | Wimmer |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,636,668 B1 | 12/2009 | Alves et al. |
| 7,644,037 B1 | 1/2010 | Ostrovsky |
| 7,653,591 B1 | 1/2010 | Dabney |
| 7,657,497 B2 | 2/2010 | Nandy |
| 7,677,438 B2 | 3/2010 | DeJean et al. |
| 7,685,067 B1 | 3/2010 | Britto et al. |
| 7,689,482 B2 | 3/2010 | Lam et al. |
| 7,693,791 B2 | 4/2010 | Hahn-Carlson et al. |
| 7,702,579 B2 | 4/2010 | Neely et al. |
| 7,707,082 B1 | 4/2010 | Lapstun et al. |
| 7,707,107 B2 | 4/2010 | Gebb et al. |
| 7,711,690 B1 | 5/2010 | Garrison et al. |
| 7,716,127 B2 | 5/2010 | Gebb et al. |
| 7,716,132 B1 | 5/2010 | Spies et al. |
| 7,720,754 B1 | 5/2010 | Gutierrez-Sheris |
| 7,720,756 B2 | 5/2010 | Kavounas |
| 7,734,543 B2 | 6/2010 | Braco |
| 7,752,130 B2 | 7/2010 | Byrd et al. |
| 7,756,785 B2 | 7/2010 | Gebb et al. |
| 7,756,786 B2 | 7/2010 | Trende et al. |
| 7,765,156 B2 | 7/2010 | Staniar et al. |
| 7,769,687 B2 | 8/2010 | Gebb et al. |
| 7,769,998 B2 | 8/2010 | Lynch et al. |
| 7,774,271 B1 | 8/2010 | Edwards et al. |
| 7,778,901 B2 | 8/2010 | Ganesan et al. |
| 7,783,567 B1 | 8/2010 | Kleiman et al. |
| 7,792,749 B2 | 9/2010 | Ganesan |
| 7,809,650 B2 | 10/2010 | Bruesewitz et al. |
| 7,840,520 B2 | 11/2010 | Nandy |
| 7,848,972 B1 | 12/2010 | Sharma |
| 7,856,384 B1 | 12/2010 | Kulasooriya et al. |
| 7,870,070 B2 | 1/2011 | Meier et al. |
| 7,873,573 B2 | 1/2011 | Realini |
| 7,877,325 B2 | 1/2011 | Bishop et al. |
| 7,885,869 B2 | 2/2011 | Uehara et al. |
| 7,899,744 B2 | 3/2011 | Bishop et al. |
| 7,904,385 B2 | 3/2011 | Bishop et al. |
| 7,908,214 B2 | 3/2011 | Bishop et al. |
| 7,925,585 B2 | 4/2011 | Bishop et al. |
| 7,937,312 B1 | 5/2011 | Woolston |
| 7,941,367 B2 | 5/2011 | Bishop et al. |
| 7,941,372 B2 | 5/2011 | Bishop et al. |
| 7,942,321 B2 | 5/2011 | Linton et al. |
| 7,945,491 B2 | 5/2011 | Sharma |
| 7,953,660 B2 | 5/2011 | Ganesan et al. |
| 7,958,030 B2 | 6/2011 | Kemper et al. |
| 7,958,049 B2 | 6/2011 | Jamison et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,970,706 B2 | 6/2011 | Keene |
| 7,979,348 B2 | 7/2011 | Thomas et al. |
| 7,979,349 B2 | 7/2011 | Bishop et al. |
| 7,996,307 B2 | 8/2011 | Bishop et al. |
| 7,996,310 B1 | 8/2011 | Edwards et al. |
| 8,001,612 B1 | 8/2011 | Wieder |
| 8,020,005 B2 | 9/2011 | Mani et al. |
| 8,041,606 B2 | 10/2011 | Mascavage, III et al. |
| 8,050,997 B1 | 11/2011 | Nosek et al. |
| 8,060,389 B2 | 11/2011 | Johnson |
| 8,069,115 B2 | 11/2011 | Schoenberg et al. |
| 8,073,772 B2 | 12/2011 | Bishop et al. |
| 8,073,773 B2 | 12/2011 | Kozee et al. |
| 8,086,497 B1 | 12/2011 | Oakes, III |
| 8,103,584 B2 | 1/2012 | Bishop et al. |
| 8,103,585 B2 | 1/2012 | Bishop et al. |
| 8,112,354 B2 | 2/2012 | Lalwani |
| 8,121,894 B2 | 2/2012 | Mason |
| 8,121,945 B2 | 2/2012 | Rackley et al. |
| 8,123,124 B2 | 2/2012 | Salazar et al. |
| 8,126,793 B2 | 2/2012 | Jones |
| 8,165,934 B2 | 4/2012 | Manista et al. |
| 8,165,958 B1 | 4/2012 | McLaughlin et al. |
| 8,180,706 B2 | 5/2012 | Bishop et al. |
| 8,190,514 B2 | 5/2012 | Bishop et al. |
| 8,195,565 B2 | 6/2012 | Bishop et al. |
| 8,229,850 B2 | 7/2012 | Dilip et al. |
| 8,234,212 B2 | 7/2012 | Bishop et al. |
| 8,244,609 B2 | 8/2012 | Prakash et al. |
| 8,249,965 B2 | 8/2012 | Tumminaro |
| 8,249,983 B2 | 8/2012 | Dilip et al. |
| 8,255,278 B1 | 8/2012 | Young et al. |
| 8,255,327 B2 | 8/2012 | Kemper et al. |
| 8,255,336 B2 | 8/2012 | Dilip et al. |
| 8,266,028 B2 | 9/2012 | Bulman et al. |
| 8,266,065 B2 | 9/2012 | Dilip et al. |
| 8,275,704 B2 | 9/2012 | Bishop et al. |
| 8,290,835 B2 | 10/2012 | Homer et al. |
| 8,290,862 B2 | 10/2012 | Sheehan et al. |
| 8,290,863 B2 | 10/2012 | Sheehan et al. |
| 8,311,913 B2 | 11/2012 | Marchetti et al. |
| 8,311,914 B2 | 11/2012 | Marchetti et al. |
| 8,311,937 B2 | 11/2012 | Marchetti et al. |
| 8,311,942 B1 | 11/2012 | Mason |
| 8,321,341 B2 | 11/2012 | Nandy |
| 8,310,346 B2 | 12/2012 | Burbridge et al. |
| 8,341,046 B2 | 12/2012 | Marchetti et al. |
| 8,342,407 B2 | 1/2013 | Williams et al. |
| 8,352,365 B1 | 1/2013 | Goldberg et al. |
| 8,370,639 B2 | 2/2013 | Azar et al. |
| 8,374,932 B2 | 2/2013 | Marchetti et al. |
| 8,380,177 B2 | 2/2013 | Laracey |
| 8,380,591 B1 | 2/2013 | Kazenas et al. |
| 8,380,622 B2 | 2/2013 | Bushman et al. |
| 8,401,939 B2 | 3/2013 | Lam et al. |
| 8,402,555 B2 | 3/2013 | Grecia |
| 8,407,124 B2 | 3/2013 | Uehara et al. |
| 8,407,141 B2 | 3/2013 | Mullen et al. |
| 8,417,628 B2 | 4/2013 | Poplawski et al. |
| 8,423,460 B2 | 4/2013 | Kay et al. |
| 8,433,629 B2 | 4/2013 | Murtaugh et al. |
| 8,458,086 B2 | 6/2013 | Bishop et al. |

(56) References Cited

U.S. PATENT DOCUMENTS

| | | |
|---|---|---|
| 8,458,774 B2 | 6/2013 | Ganesan |
| 8,467,766 B2 | 6/2013 | Rackley et al. |
| 8,484,104 B1 | 7/2013 | Hurlbutt et al. |
| 8,498,914 B2 | 7/2013 | Hazelhurst |
| 8,521,657 B2 | 8/2013 | Kuebert et al. |
| 8,527,413 B2 | 9/2013 | Heller |
| 8,532,021 B2 | 9/2013 | Tumminaro |
| 8,533,079 B2 | 9/2013 | Sharma |
| 8,533,860 B1 | 9/2013 | Grecia |
| 8,549,601 B2 | 10/2013 | Ganesan |
| 8,560,417 B2 | 10/2013 | Mullen et al. |
| 8,596,527 B2 | 12/2013 | Bishop et al. |
| 8,606,640 B2 | 12/2013 | Brody et al. |
| 8,615,457 B2 | 12/2013 | Mullen et al. |
| 8,634,559 B2 | 1/2014 | Brown et al. |
| 8,646,685 B2 | 2/2014 | Bishop et al. |
| 8,666,865 B2 | 3/2014 | Mullen et al. |
| 8,706,641 B2 | 4/2014 | Bruesewitz et al. |
| 8,713,325 B2 | 4/2014 | Ganesan |
| 8,719,905 B2 | 5/2014 | Ganesan |
| 8,738,526 B2 | 5/2014 | Nosek et al. |
| 8,745,699 B2 | 6/2014 | Ganesan |
| 8,751,347 B2 | 6/2014 | Mullen et al. |
| 8,751,381 B2 * | 6/2014 | Musser ............... G06Q 20/023 705/39 |
| 8,768,838 B1 | 7/2014 | Hoffman |
| 8,769,784 B2 | 7/2014 | Ganesan et al. |
| 8,775,306 B2 | 7/2014 | Nosek et al. |
| 8,789,153 B2 | 7/2014 | Ganesan |
| 8,794,509 B2 | 8/2014 | Bishop et al. |
| 8,806,592 B2 | 8/2014 | Ganesan |
| 8,814,039 B2 | 8/2014 | Bishop et al. |
| 8,820,633 B2 | 9/2014 | Bishop et al. |
| 8,887,247 B2 | 11/2014 | Ganesan |
| 8,887,308 B2 † | 11/2014 | Grecia |
| 8,893,237 B2 | 11/2014 | Ganesan |
| 8,938,787 B2 | 1/2015 | Turgeman |
| 9,392,008 B1 | 7/2016 | Michel et al. |
| D769,296 S | 10/2016 | Grecia |
| 9,626,664 B2 | 4/2017 | Bouey et al. |
| 9,691,056 B2 | 6/2017 | Bouey et al. |
| 9,928,490 B1 * | 3/2018 | Vancini ............... G06Q 40/02 |
| D826,955 S | 8/2018 | Grecia |
| 10,049,349 B1 | 8/2018 | Grassadonia et al. |
| 10,078,821 B2 | 9/2018 | Bouey et al. |
| D857,054 S | 8/2019 | Grecia |
| D857,712 S | 8/2019 | Grecia |
| 2002/0013768 A1 | 1/2002 | Ganesan |
| 2002/0023054 A1 | 2/2002 | Gillespie |
| 2002/0029193 A1 | 3/2002 | Ranjan et al. |
| 2002/0046185 A1 | 4/2002 | Villart et al. |
| 2002/0052852 A1 | 5/2002 | Bozeman |
| 2002/0091635 A1 | 7/2002 | Dilip et al. |
| 2002/0128932 A1 | 9/2002 | Yung et al. |
| 2002/0143634 A1 | 10/2002 | Kumar et al. |
| 2002/0194119 A1 | 12/2002 | Wright et al. |
| 2002/0194503 A1 | 12/2002 | Faith et al. |
| 2003/0014316 A1 | 1/2003 | Jaalinoja et al. |
| 2003/0097331 A1 | 5/2003 | Cohen |
| 2003/0115151 A1 | 6/2003 | Wheeler et al. |
| 2003/0126094 A1 | 7/2003 | Fisher et al. |
| 2003/0130919 A1 | 7/2003 | Templeton et al. |
| 2003/0165328 A1 | 9/2003 | Grecia |
| 2003/0216996 A1 | 11/2003 | Cummings et al. |
| 2003/0220875 A1 | 11/2003 | Lam et al. |
| 2003/0220876 A1 | 11/2003 | Burger et al. |
| 2003/0236728 A1 | 12/2003 | Sunderji et al. |
| 2004/0030645 A1 | 2/2004 | Monaghan |
| 2004/0034594 A1 | 2/2004 | Thomas et al. |
| 2004/0089711 A1 | 5/2004 | Sandru |
| 2004/0138955 A1 | 7/2004 | Song et al. |
| 2004/0158522 A1 | 8/2004 | Brown et al. |
| 2004/0193522 A1 | 9/2004 | Binet et al. |
| 2004/0230489 A1 | 11/2004 | Goldthwaite et al. |
| 2004/0259626 A1 | 12/2004 | Akram et al. |
| 2005/0008148 A1 | 1/2005 | Jacobson |
| 2005/0010523 A1 | 1/2005 | Myklebust et al. |
| 2005/0010786 A1 | 1/2005 | Michener et al. |
| 2005/0065891 A1 | 3/2005 | Lee et al. |
| 2005/0069135 A1 | 3/2005 | Brickell |
| 2005/0071283 A1 | 3/2005 | Randle et al. |
| 2005/0080716 A1 | 4/2005 | Belyi et al. |
| 2005/0125347 A1 | 6/2005 | Akialis et al. |
| 2005/0137948 A1 | 6/2005 | Kissner et al. |
| 2005/0144452 A1 | 6/2005 | Lynch et al. |
| 2005/0149455 A1 | 7/2005 | Bruesewitz et al. |
| 2005/0187873 A1 | 8/2005 | Labrou |
| 2005/0203959 A1 | 9/2005 | Muller et al. |
| 2005/0246292 A1 | 11/2005 | Sarcanin |
| 2005/0273842 A1 | 12/2005 | Wright et al. |
| 2005/0274793 A1 | 12/2005 | Cantini et al. |
| 2005/0289030 A1 | 12/2005 | Smith |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0022048 A1 | 2/2006 | Johnson |
| 2006/0080243 A1 | 4/2006 | Kemper et al. |
| 2006/0080727 A1 | 4/2006 | Hammons et al. |
| 2006/0085357 A1 | 4/2006 | Pizarro |
| 2006/0106717 A1 | 5/2006 | Randle et al. |
| 2006/0116949 A1 | 6/2006 | Wehunt et al. |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0212401 A1 | 9/2006 | Ameerally et al. |
| 2006/0224470 A1 | 10/2006 | Ruano et al. |
| 2006/0258397 A1 | 11/2006 | Kaplan et al. |
| 2006/0280339 A1 | 12/2006 | Cho |
| 2006/0287004 A1 | 12/2006 | Fuqua |
| 2006/0287963 A1 | 12/2006 | Steeves et al. |
| 2007/0046456 A1 | 3/2007 | Edwards et al. |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0156726 A1 | 7/2007 | Levy |
| 2007/0168281 A1 | 7/2007 | Bishop et al. |
| 2007/0174189 A1 | 7/2007 | Bishop et al. |
| 2007/0179885 A1 * | 8/2007 | Bird ................ G06Q 20/10 705/39 |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0010685 A1 | 1/2008 | Holtzman et al. |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0040171 A1 | 2/2008 | Albers |
| 2008/0046362 A1 | 2/2008 | Easterly |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0091596 A1 | 4/2008 | Labaton |
| 2008/0091606 A1 | 4/2008 | Grecia |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0127319 A1 | 5/2008 | Galloway et al. |
| 2008/0140564 A1 | 6/2008 | Tal et al. |
| 2008/0141033 A1 | 6/2008 | Ginter et al. |

(56) References Cited

U.S. PATENT DOCUMENTS

| | | |
|---|---|---|
| 2008/0147536 A1 | 6/2008 | Breen |
| 2008/0167962 A1 | 7/2008 | Lawe |
| 2008/0177661 A1 | 7/2008 | Mehra |
| 2008/0189209 A1 | 8/2008 | Loomis et al. |
| 2008/0208737 A1 | 8/2008 | Dilip et al. |
| 2008/0208742 A1 | 8/2008 | Arthur et al. |
| 2008/0208743 A1 | 8/2008 | Arthur et al. |
| 2008/0210751 A1 | 9/2008 | Kim |
| 2008/0210752 A1 | 9/2008 | March |
| 2008/0222048 A1 | 9/2008 | Higgins et al. |
| 2008/0222199 A1 | 9/2008 | Tiu et al. |
| 2008/0227471 A1 | 9/2008 | Dankar et al. |
| 2008/0238610 A1 | 10/2008 | Rosenberg |
| 2008/0242274 A1 | 10/2008 | Swanburg et al. |
| 2008/0244271 A1 | 10/2008 | Yu |
| 2008/0244277 A1 | 10/2008 | Orsini et al. |
| 2008/0249936 A1 | 10/2008 | Miller et al. |
| 2008/0255993 A1 | 10/2008 | Blinbaum |
| 2008/0294563 A1 | 11/2008 | Boutahar et al. |
| 2008/0306872 A1 | 12/2008 | Felsher |
| 2008/0313264 A1 | 12/2008 | Pestoni |
| 2008/0313714 A1 | 12/2008 | Fetterman et al. |
| 2008/0319887 A1 | 12/2008 | Pizzi et al. |
| 2009/0006861 A1 | 1/2009 | Bemmel |
| 2009/0006920 A1 | 1/2009 | Munson et al. |
| 2009/0018909 A1 | 1/2009 | Grecia |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0048971 A1 | 2/2009 | Hathaway et al. |
| 2009/0068982 A1 | 3/2009 | Chen et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0083541 A1 | 3/2009 | Levine |
| 2009/0089193 A1 | 4/2009 | Paintin |
| 2009/0089205 A1 | 4/2009 | Bayne |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119207 A1 | 5/2009 | Grecia |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0204457 A1 | 8/2009 | Buhrmann et al. |
| 2009/0204815 A1 | 8/2009 | Dennis et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0319425 A1 | 12/2009 | Tumminaro et al. |
| 2009/0327133 A1 | 12/2009 | Aharoni et al. |
| 2010/0010906 A1 | 1/2010 | Grecia |
| 2010/0030687 A1 | 2/2010 | Panthaki et al. |
| 2010/0031022 A1 | 2/2010 | Kramer |
| 2010/0042537 A1 | 2/2010 | Smith et al. |
| 2010/0042539 A1 | 2/2010 | Dheer et al. |
| 2010/0057622 A1 | 3/2010 | Faith et al. |
| 2010/0063935 A1 | 3/2010 | Thomas et al. |
| 2010/0094765 A1 | 4/2010 | Nandy |
| 2010/0100480 A1 | 4/2010 | Altman et al. |
| 2010/0100899 A1 | 4/2010 | Bradbury et al. |
| 2010/0115610 A1 | 5/2010 | Tredoux et al. |
| 2010/0127822 A1 | 5/2010 | Devadas |
| 2010/0131415 A1 | 5/2010 | Sartipi |
| 2010/0161736 A1 | 6/2010 | Picknelly |
| 2010/0185868 A1 | 7/2010 | Grecia |
| 2010/0198729 A1 | 8/2010 | Kavounas |
| 2010/0269166 A1 | 10/2010 | Awad et al. |
| 2010/0293090 A1 | 11/2010 | Domenikos et al. |
| 2010/0306107 A1 | 12/2010 | Nahari |
| 2010/0320266 A1 | 12/2010 | White |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0099382 A1 | 4/2011 | Grecia |
| 2011/0110508 A1 | 5/2011 | LaFreniere et al. |
| 2011/0112945 A1 | 5/2011 | Cullen, III et al. |
| 2011/0112954 A1 | 5/2011 | Bruesewitz et al. |
| 2011/0131130 A1 | 6/2011 | Griffin et al. |
| 2011/0145149 A1 | 6/2011 | Valdes et al. |
| 2011/0173116 A1 | 7/2011 | Fan et al. |
| 2011/0191160 A1 | 8/2011 | Blackhurst et al. |
| 2011/0196782 A1 | 8/2011 | Allen et al. |
| 2011/0202407 A1 | 8/2011 | Buhrmann et al. |
| 2011/0202982 A1 | 8/2011 | Alexander et al. |
| 2011/0247058 A1 | 10/2011 | Kisters |
| 2011/0251869 A1 | 10/2011 | Shekhter |
| 2011/0251952 A1 | 10/2011 | Kelly et al. |
| 2011/0258111 A1 | 10/2011 | Raj et al. |
| 2011/0264543 A1 | 10/2011 | Taveau et al. |
| 2011/0264583 A1 | 10/2011 | Cooper et al. |
| 2011/0270749 A1 | 11/2011 | Bennett et al. |
| 2011/0276473 A1 | 11/2011 | Blok |
| 2011/0276479 A1 | 11/2011 | Thomas |
| 2011/0282778 A1 | 11/2011 | Wright et al. |
| 2011/0288946 A1 | 11/2011 | Baiya et al. |
| 2011/0295746 A1 | 12/2011 | Thomas et al. |
| 2011/0313921 A1 | 12/2011 | Dheer et al. |
| 2011/0320347 A1 | 12/2011 | Tumminaro et al. |
| 2012/0005749 A1 | 1/2012 | Zoldi et al. |
| 2012/0016731 A1 | 1/2012 | Smith et al. |
| 2012/0018511 A1 | 1/2012 | Hammad |
| 2012/0041876 A1 | 2/2012 | Nosek et al. |
| 2012/0066121 A1 | 3/2012 | Shahbazi et al. |
| 2012/0084201 A1 | 4/2012 | Ostrovsky |
| 2012/0109802 A1 | 5/2012 | Griffin et al. |
| 2012/0116953 A1 | 5/2012 | Klein et al. |

(56) References Cited

U.S. PATENT DOCUMENTS

| | | |
|---|---|---|
| 2012/0130898 A1 | 5/2012 | Snyder et al. |
| 2012/0151220 A1 | 6/2012 | Grecia |
| 2012/0173409 A1 | 7/2012 | Hu |
| 2012/0173417 A1 | 7/2012 | Lohman et al. |
| 2012/0203695 A1 | 8/2012 | Morgan et al. |
| 2012/0209766 A1 | 8/2012 | Kitchen et al. |
| 2012/0231814 A1 | 9/2012 | Caiman et al. |
| 2012/0265687 A1 | 10/2012 | Dilip et al. |
| 2012/0278239 A1 | 11/2012 | Nosek et al. |
| 2012/0284154 A1 | 11/2012 | Creighton et al. |
| 2012/0284175 A1 | 11/2012 | Wilson et al. |
| 2012/0290453 A1 | 11/2012 | Manista et al. |
| 2013/0018791 A1 | 1/2013 | Mendocino et al. |
| 2013/0024360 A1 | 1/2013 | Bailout |
| 2013/0036000 A1 | 2/2013 | Giordano et al. |
| 2013/0036048 A1 | 2/2013 | Campos et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0080333 A1 | 3/2013 | Kamotskyy et al. |
| 2013/0080368 A1 | 3/2013 | Nandy |
| 2013/0085936 A1 | 4/2013 | Law et al. |
| 2013/0103576 A1 | 4/2013 | Ackley |
| 2013/0110658 A1 | 5/2013 | Lyman et al. |
| 2013/0110678 A1 | 5/2013 | Vigier et al. |
| 2013/0110724 A1 | 5/2013 | Edwards |
| 2013/0117178 A1 | 5/2013 | Mullen et al. |
| 2013/0124364 A1 | 5/2013 | Mittal |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0179281 A1 | 7/2013 | White et al. |
| 2013/0179352 A1 | 7/2013 | Dwyre et al. |
| 2013/0185214 A1 | 7/2013 | Azen et al. |
| 2013/0197998 A1 | 8/2013 | Buhrmann et al. |
| 2013/0212010 A1 | 8/2013 | Mullen et al. |
| 2013/0226627 A1 | 8/2013 | Kubovcik et al. |
| 2013/0232071 A1 | 9/2013 | Dilip et al. |
| 2013/0238488 A1 | 9/2013 | Bouey et al. |
| 2013/0238489 A1 | 9/2013 | Bouey et al. |
| 2013/0238490 A1 | 9/2013 | Bouey et al. |
| 2013/0238491 A1 | 9/2013 | Bouey et al. |
| 2013/0238492 A1 | 9/2013 | Muthu et al. |
| 2013/0246280 A1 | 9/2013 | Kirsch |
| 2013/0262296 A1 | 10/2013 | Thomas et al. |
| 2013/0262311 A1 | 10/2013 | Buhrmann et al. |
| 2013/0282588 A1 | 10/2013 | Hruska |
| 2014/0006184 A1 | 1/2014 | Godsey |
| 2014/0040069 A1 | 2/2014 | Tomasofsky et al. |
| 2014/0046820 A1 | 2/2014 | Sunderji et al. |
| 2014/0058862 A1 | 2/2014 | Celkonas |
| 2014/0059693 A1 | 2/2014 | Stecher |
| 2014/0067677 A1 | 3/2014 | Ali et al. |
| 2014/0081783 A1 | 3/2014 | Paranjape et al. |
| 2014/0164246 A1 | 6/2014 | Thomas et al. |
| 2014/0187205 A1 | 7/2014 | Dankar et al. |
| 2014/0188697 A1 | 7/2014 | Bruesewitz et al. |
| 2014/0188728 A1 | 7/2014 | Dheer et al. |
| 2014/0195425 A1 | 7/2014 | Campos et al. |
| 2014/0244493 A1 | 8/2014 | Kenyon et al. |
| 2014/0244515 A1 | 8/2014 | Garfinkle et al. |
| 2014/0304778 A1 | 10/2014 | Grecia |
| 2014/0310142 A1 | 10/2014 | Mak |
| 2014/0337230 A1 | 11/2014 | Bacastow |
| 2014/0351137 A1 | 11/2014 | Chisholm |
| 2014/0365350 A1 | 12/2014 | Shvarts |
| 2014/0372308 A1 | 12/2014 | Sheets |
| 2015/0026061 A1 | 1/2015 | Siegel et al. |
| 2015/0046181 A1 | 2/2015 | Adjaoute |
| 2015/0046216 A1 | 2/2015 | Adjaoute |
| 2015/0046224 A1 | 2/2015 | Adjaoute |
| 2015/0066738 A1 | 3/2015 | Tian et al. |
| 2015/0073975 A1 | 3/2015 | Bomhofen et al. |
| 2015/0073977 A1 | 3/2015 | Ghosh et al. |
| 2015/0081324 A1 | 3/2015 | Adjaoute |
| 2015/0089568 A1 | 3/2015 | Sprague et al. |
| 2015/0112866 A1 | 4/2015 | Muthu et al. |
| 2015/0186994 A1 | 7/2015 | He |
| 2015/0193776 A1 | 7/2015 | Douglas et al. |
| 2016/0034932 A1 | 2/2016 | Sion et al. |
| 2016/0078443 A1 | 3/2016 | Tomasofsky et al. |
| 2016/0078444 A1 | 3/2016 | Tomasofsky et al. |
| 2016/0092872 A1 | 3/2016 | Prakash et al. |
| 2016/0104133 A1 | 4/2016 | Davis et al. |
| 2016/0188317 A1 | 6/2016 | Hilliar et al. |
| 2016/0203490 A1 | 7/2016 | Gupta et al. |
| 2016/0267280 A1 | 9/2016 | Mansour et al. |
| 2016/0283918 A1 | 9/2016 | Weinflash |
| 2016/0300206 A1 | 10/2016 | Novac et al. |
| 2016/0300207 A1 | 10/2016 | Novac et al. |
| 2016/0300225 A1 | 10/2016 | Novac et al. |
| 2016/0300226 A1 | 10/2016 | Novac et al. |
| 2016/0321625 A1 | 11/2016 | Gilliam, III et al. |
| 2017/0024719 A1 | 1/2017 | Finch et al. |
| 2017/0024744 A1 | 1/2017 | Finch et al. |
| 2017/0024828 A1 | 1/2017 | Michel et al. |
| 2017/0103399 A1 | 4/2017 | Napsky et al. |
| 2019/0318354 A1 | 10/2019 | Weinflash et al. |
| 2019/0340590 A1 | 11/2019 | Davey et al. |
| 2020/0118089 A1 | 4/2020 | Bartrim et al. |
| 2020/0118090 A1 | 4/2020 | Bartrim et al. |
| 2020/0118091 A1 | 4/2020 | Bartrim et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 865010 | 9/1998 |
| EP | 820620 | 3/1999 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | H11265413 | 9/1999 |
| JP | 2000311209 | 11/2000 |
| JP | 2002049872 | 2/2002 |
| JP | 2002298041 | 10/2002 |
| JP | 2003308437 | 10/2003 |
| JP | 2004192437 | 7/2004 |
| JP | 2004532448 | 10/2004 |
| JP | 2005512173 | 4/2005 |
| JP | 2006285329 | 10/2006 |

(56) References Cited

FOREIGN PATENT DOCUMENTS

| | | |
|---|---|---|
| JP | 2007128192 | 5/2007 |
| JP | 2008102914 | 5/2008 |
| JP | 2008262601 | 10/2008 |
| JP | 2014132474 | 7/2014 |
| KR | 1020120075590 | 7/2012 |
| KR | 1020140099676 | 8/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 2001033522 | 5/2001 |
| WO | 2001055984 | 8/2001 |
| WO | 2001067364 | 9/2001 |
| WO | 2002025534 | 3/2002 |
| WO | 2002025605 | 3/2002 |
| WO | 2002035429 | 5/2002 |
| WO | 2002069561 | 9/2002 |
| WO | 2002073483 | 9/2002 |
| WO | 2003091849 | 11/2003 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010039101 | 4/2010 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2017011596 | 1/2017 |
| WO | 2017014815 | 1/2017 |

OTHER PUBLICATIONS

International Trade Administration (export.gov), "Chapter 1: Methods of Payment in International Trade," https://2016.export.gov/tradefinanceguide/eg_main_043221.asp, Nov. 7, 2012 (Year: 2012).
Federal Financial Institutions Examination Council (Wholesale Payment System, https://ithandbook.ffiec.gov/media/274899/ffiec_itbooklet_wholesalepaymentsystems.pdf, Section 4, Jul. 2004.
Oldfield et al. , "The Place of Risk Management in Financial Institutions," The Wharton School, Financial Institutional Center, University of Pennsylvania, 1995.
NoPass, "No Password Login | Touch ID Fingerprint iPhone App," available at https://web.archive.org/web/20150328095715/http://www.nopassapp.com/, Mar. 28, 2015.
Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014.
NoPass, "Register," available at https://web.archive org/web/20141222172212/http://www.nopassapp.com/register/, Dec. 22, 2014.
NoPass, "Login," available at https://web.archive.org/web/20141222170523/http://www.nopassapp.com/login/, Dec. 22, 2014.
Apple, "iOS Security," available at https://web.archive.org/web/20140226213513/http://images.apple.com/iphone/business/docs/iOS_Security_Feb14.pdf, Feb. 2014.
EBay Developers Program, "eBay Web Services XML API Guide," 2005.
The PayPal Account, Chapter 2, link.springer.com, Apr. 30, 2007.
International Search Report for PCT/US2016/042163, dated Sep. 26, 2016.
International Search Report and Written Opinion for PCT/US2016/026000, dated Jul. 13, 2016.
International Search Report and Written Opinion for PCT/US11/33828, dated Jul. 12, 2011, 11 pages.
International Search Report for PCT/US10/36231, dated Nov. 8, 2010, 8 pages.
International Search Report for PCT/US10/36233, dated Jul. 28, 2010, 7 pages.
International Search Report for PCT/US10/36229, dated Jul. 28, 2010, 12 pages.
International Search Report for PCT/US10/35465, dated Jul. 13, 2010, 7 pages.
International Search Report for PCT/US09/48490, dated Jul. 31, 2009, 1 page.
"Greg's diary", Aug. 2009, available at http://www.lemis.com/grog/diary-aug.2009.php?dirdate=20090807&imagesizes=11111111111111111113#Photo-19.
Trusted Computing Platform Alliance (TCPA), Main Specification Version 1.1b, Published by the Trusted Computing Group, 2003, 332 pages.
Benson, Carol Coye, "Faster, Better, Cheaper—Like it or Not," http://paymentsviews.com/2013/03/13/faster-better-cheaper-like-it-or-not/, Mar. 13, 2013.
Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].
Gayle C. Avery, Ellen Baker; Reframing the Infomated Household-Workplace; Information & Organization, 2002, vol. 12, Aug. 2001.
Mark Bernkopf; Electronic Cash and Monetary Policy; First Monday, vol. 1, No. 1-6, May 1996.
Electronic Payment Systems in European Countries; Country Synthesis Report; Böhle, Rader, Riehm, Institut far Technikfolgenabschatzung and Systemanalyse for the European Science and Technology Observatory Network (ESTO); Final Version, Sep. 1999.
Mark E. Budnitz; Electronic Money in the 1990s: A Net Benefit or Merely a Trade-Off?; 9 Ga. St. U. L. Rev. 747, 1992-1993.
Chida, Mambo, Shizuya; Digital Money—A Survey; Received Jun. 15, 2001; Revised Aug. 21, 2001; Interdisciplinary Information Sciences. vol. 7, No. 2, pp. 135-165 (2001).
Harold L. Frohman, William R. Ledder; Defense Transportation's EDI Program: A Security Risk Assessment PL205LN5; Logistics Management Institute; May 1993.
Aryya Gangopadhyay; Managing Business with Electronic Commerce: Issues & Trends; Idea Group Publishing (2002).
Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.
Lorin M. Hitt and Frances X. Frei; Do Better Customers Utilize Electronic Distribution Channels? The Case of PC Banking; Dec. 2001.
Eun Kim, Petra Schubert, Dorian Seitz and Bumtae Kim; The EBMG Reference Model on Electronic Markets: The Korean Case of JODAL (2007).
Glenbrook Partners; PayPal in the Air!—A look at PayPal Mobile; Payment News; Glenbrook eCommerce Market Analysis Reports (2006).
Sangjo Oh, Heejin Lee, Sherah Kurnia, Robert B. Johnston, Ben Lim; A Stakeholder Perspective on Successful Electronic Payment

(56) References Cited

OTHER PUBLICATIONS

Systems Diffusion; Proceedings of the 39th Hawaii International Conference on Systems Sciences, 2006.

John R. Palumbo; Naval Postgraduate School, Monterey, California; Thesis, Financial Transaction Mechanisms for World Wide Web Applications, Mar. 1996.

Hua-Fu Pao; Naval Postgraduate School, Monterey, California; Thesis, Security Management of Electronic Data Interchange; Jun. 1993.

Tobern P. Pedersen; Electronic Payments of Small Amounts; Aarhus University (1998).

Eveline Franco Veloso; The Business Revolution through B2B Market Tone and its Impacts over the Financial System gong into 21st Century; The Institute of Brazilian Business and Management Issues; XII Minerva Program—Fall 2000, 2000.

Alladi Venkatesh and Nicholas Vitalari; Households and Technology: The Case of Home Computers—Some Conceptual and Theoretical Issues; originally appeared in M.L. Roberts and L. Wortzel (eds.) Marketing to the Changing Household, Ballinger Publishing, 1985, pp. 187-203.

A. Vilmos and S. Narnouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic.

Raja Mohn Rosli bin Raja Zulkifli; Building a World Class Infrastructure to Support E-Commerce in Malaysia; 1997 Telekom Malaysia, 1997.

Chang, et al., "Smart Phone for Mobile Commerce," Computer Standards & Interfaces 31.4, pp. 740-747, 2009.

NACHA (Business-to-Business EIPP: Presentment Models and Payment Options, http://euro.ecom.cmu.edu/resources/elibrary/epay/B2BPaymentOptions.pdf, 2001), (Year: 2001).

Gajek, Sebastian, et al., "TruWallet: Trustworthy and Migratable Wallet-Based Web Authentication," Proceedings of the 2009 ACM Workshop on Scalable Trusted Computing, 2009, (year: 2009).

Author: William Grecia—Patent owners of U.S. Pat. No. 8,887,308 Publication: claim chart comparison Publication Date: Mar. 30, 2020 Publication Location: https://www.scribd.com/document/454055626/8887308-to-20190378132-anticipated-Claim-1.†

\* cited by examiner
† cited by third party

Update Notification Settings

To receive notifications, make your selection below.

Email

- [X] psmith@google.com (Secondary)
- [ ] Pat.smith@wellsfargo.com (Other)
- [ ] 1234567890@txt.att.net (Mobile device)

Mobile phone

Be sure to select a number where you can receive SMS messages.

- [X] Home: (925) 555-4545
- [ ] Work: (925) 555-4545
- [ ] Mobile: (925) 555-4545

Note: To add or change email addresses/phone numbers, sign on to *Bank Online®* and select Account Services to update your contact information.

[ Cancel ]  [ Save ]

Send Money | Transfer Activity | Preferences

Send Money — 601

| | | |
|---|---|---|
| To | Select a recipient ▼ | Add Recipient \| Manage Recipients — 613 |
| From Account — 605 | Choose account ▼ | |
| Amount ($xxxxx limit) — 607 | $ | Notification Preferences — 615 |
| Description (Recommended) — 609 | | We will contact you at: |
| From (Your name) | Pat Smith | wincubator1@gmail.com |
| Nickname (Optional) — 611 | Recommended if your recipient knows you by another name | pooja.mangla@wellsfargo.com |
| | | 222-444-555 |
| | | Edit — 617 |

603

[ Continue ]

Payment Channels — 619

Choose your method of payment

Method                                    623 — Funds available to recipient
☐ Credit Card network (Visa, American Express, Mastercard)    2 days
☒ ACH — 621                                   4 days
☐ Paypal — 630                                4 days 625 — Fee
$5.00
$0.00   Fees charged by PayPal

[X]

Recent Transfers Sent — 631

⚠ (4) new transactions returned since last session.   View More Transfers

| Date Sent — 633 | From Account | Recipient | Amount | Description | Status | Actions |
|---|---|---|---|---|---|---|
| 12/09/2009 | Checking XXX-XXX8300 | Frank Costanza (JR) | $121.00 | Trip | Pending | View Details |
| 11/25/2009 | Checking XXX-XXX8300 | Frank Costanza (JR) | $25.00 | Lunch | Returned | View Details |
| 11/09/2009 | Savings XXX-XXX8301 | Ali Tahbaz | $50.00 | Movies | Complete | |

635   637   639   641   643   645

600   ? Help

Enter the email address or mobile number where you were notified.

By entering your email address or mobile number, you consent to the receipt of email or automated text notification from clearXchange, a Member Bank, or their agents regarding transfers and other notifications for this service.

Mobile numbers must be 10 digits (XXX-XXX-XXXX)
Message and data rates may apply.

Submit   or Cancel

SYSTEM AND METHOD FOR TRANSFERRING FUNDS

CROSS-REFERENCE TO RELATED APPLICATIONS

This application is a continuation of U.S. patent application Ser. No. 15/209,685, filed Jul. 13, 2016, which is a continuation-in-part of U.S. patent application Ser. No. 14/587,745, filed Dec. 31, 2014, which is a continuation-in-part of U.S. patent application Ser. No. 13/782,587, filed Mar. 1, 2013, which claims the benefit of U.S. Provisional Application No. 61/657,339, filed Jun. 8, 2012, and U.S. Provisional Application No. 61/607,882, filed Mar. 7, 2012. U.S. patent application Ser. Nos. 15/209,685, 14/587,745 and 13/782,587, and U.S. Provisional Application Nos. 61/657,339 and 61/607,882 are incorporated herein by reference in their entirety.

TECHNICAL FIELD

The technical field relates to systems and methods for transferring funds over an electronic money transfer network, and more particularly to systems and methods for securely transferring funds over an electronic money transfer network to individuals who have access to a physical payment terminal or online payment processes maintained by an entity other than a financial institution.

BACKGROUND

Many existing systems of transferring money over electronic money transfer networks, such as Automatic Clearing House (ACH) networks, have limitations. Traditional wire transfers, for instance, typically require both a sender of money and recipient of money to be physically present at a financial institution or have direct access (e.g., online access) to an account at a financial institution. Requiring a sender and a recipient to have accounts at financial institution(s) may make it difficult to transfer money from/to some people, such as underbanked segments of the population and/or people who lack ready access to financial institutions. Moreover, traditional wire transfers that involve transferring money between financial institutions or exchange of currency is heavily regulated and generally requires additional fees. These fees may form the basis of transaction costs that make transfer of money between individuals inefficient, impractical or otherwise difficult.

Many existing systems of transferring money to individuals do not accommodate otherwise possible money transfer scenarios. As an example, existing systems of transferring money may not make funds available to people who want to send or receive money at a physical payment terminal of a retail store or other non-financial institution that is not a financial institution. Existing systems of transferring money may not make funds available to people who want to send or receive money using online payment processes of non-financial institutions. Debit transfer systems and other systems of transferring money to people at retail establishments and/or retail websites may be cost-prohibitive and/or may not facilitate transfers of money between people. Many existing systems of transferring money to individuals may not make fund available soon after a request to transfer funds has been made (e.g., substantially in "real-time"). As a result, it has often proven difficult to cost-effectively transfer money over electronic money transfer networks to individuals, particularly those individuals who lack access to the payment systems of financial institutions.

SUMMARY

The systems, methods, and computer-readable media discussed herein relate to securely transferring funds over an electronic money transfer network, such as an Automatic Clearing House (ACH) network, to individuals who have access to a second (e.g., public) network. An example method may include receiving transaction data related to a fund transfer, the transaction data specifying a transfer amount of the fund transfer, a sender public identifier to identify a sender of the fund transfer, a recipient public identifier to identify a recipient of the fund transfer, a financial institution identifier for a sender financial institution, a financial institution identifier for a recipient financial institution, and a tokenized financial instrument of the sender, determining, using the financial institution identifier for the sender financial institution, the sender financial institution, the sender financial institution being a member of a payment network, providing to the sender financial institution the tokenized financial instrument of the sender to enable the sender financial institution to de-tokenize the tokenized financial instrument of the sender and identify an account of the sender financial institution associated with the sender, receiving, from the sender financial institution, a sender private identifier generated by the sender financial institution, the sender financial institution generating the sender private identifier upon confirming the account of the sender financial institution associated with the sender, associating the sender private identifier with the sender public identifier, providing to the sender financial institution the transfer amount of the fund transfer, the recipient public identifier, and the recipient financial institution identifier to enable the sender financial institution to determine availability of money in the account associated with the sender to satisfy the transfer amount of the fund transfer, generating a transaction identifier associated with the fund transfer, and providing the transaction identifier and a recipient private identifier to the recipient financial institution to enable the recipient financial institution to identify an account associated with the recipient to enable the recipient financial institution to receive an ACH message over the ACH network, the ACH message indicating payment from the sender financial institution to the recipient financial institution, the ACH message being generated by the sender financial institution and including the transaction identifier to identify the fund transfer between a sender and a recipient, the ACH message allowing the recipient financial institution to retrieve money from an ACH batch transfer and deposit money into the account associated with the recipient.

In some embodiments, the method further comprises validating that the sender has authorization to use the public identifier to perform the fund transfer. The method may further comprises receiving a tokenized financial instrument of the recipient and a recipient FI identifier associated with the recipient financial institution, determining, using the recipient FI identifier, the recipient financial institution, the recipient financial institution being a member of the payment network, providing to the recipient financial institution the tokenized financial instrument of the recipient to enable the recipient financial institution to de-tokenize the tokenized financial instrument of the recipient and identify an account of the recipient financial institution associated with the recipient, and receiving, from the recipient financial institution, the recipient private identifier generated by the recipient financial institution, the recipient financial institution generating the recipient private identifier upon confirming the account of the recipient financial institution associated with the sender.

The method may further comprise receiving the transfer amount of the fund transfer, the sender public identifier to identify the sender of the fund transfer, the recipient public identifier to identify the recipient of the fund transfer, the financial institution identifier for the sender financial institution, the financial institution identifier for the recipient financial institution, and the tokenized financial instrument of the sender from an first online reseller of goods. The first online reseller of goods may tokenize a financial instrument of the sender to create the tokenized financial instrument of the sender. The financial instrument may be issued by the sender financial institution.

In some implementations, the method may further comprise receiving a tokenized financial instrument of the recipient from a second online reseller of goods different than the first online reseller of goods. The second online reseller of goods may tokenize a financial instrument of the recipient to create the tokenized financial instrument of the recipient. The recipient financial institution may transfer funds to the account associated with the recipient before the recipient financial institution receives the ACH message. The method may further comprise providing a notification a request to a sender system requesting if the sender will accept the fund transfer from the sender.

An example system comprises one or more processors and a memory coupled to the one or more processors. The memory may be configured to instruct the one or more processors to perform a method. The method may comprise receiving transaction data related to a fund transfer, the transaction data specifying a transfer amount of the fund transfer, a sender public identifier to identify a sender of the fund transfer, a recipient public identifier to identify a recipient of the fund transfer, a financial institution identifier for a sender financial institution, a financial institution identifier for a recipient financial institution, and a tokenized financial instrument of the sender, determining, using the financial institution identifier for the sender financial institution, the sender financial institution, the sender financial institution being a member of a payment network, providing to the sender financial institution the tokenized financial instrument of the sender to enable the sender financial institution to de-tokenize the tokenized financial instrument of the sender and identify an account of the sender financial institution associated with the sender, receiving, from the sender financial institution, a sender private identifier generated by the sender financial institution, the sender financial institution generating the sender private identifier upon confirming the account of the sender financial institution associated with the sender, associating the sender private identifier with the sender public identifier, providing to the sender financial institution the transfer amount of the fund transfer, the recipient public identifier, and the recipient financial institution identifier to enable the sender financial institution to determine availability of money in the account associated with the sender to satisfy the transfer amount of the fund transfer, generating a transaction identifier associated with the fund transfer, and providing the transaction identifier and a recipient private identifier to the recipient financial institution to enable the recipient financial institution to identify an account associated with the recipient to enable the recipient financial institution to receive an ACH message over the ACH network, the ACH message indicating payment from the sender financial institution to the recipient financial institution, the ACH message being generated by the sender financial institution and including the transaction identifier to identify the fund transfer between a sender and a recipient, the ACH message allowing the recipient financial institution to retrieve money from an ACH batch transfer and deposit money into the account associated with the recipient.

A nontransitive computer readable media system may comprise executable instructions, the executable instructions being executable by a processor to perform a method. The method may comprise receiving transaction data related to a fund transfer, the transaction data specifying a transfer amount of the fund transfer, a sender public identifier to identify a sender of the fund transfer, a recipient public identifier to identify a recipient of the fund transfer, a financial institution identifier for a sender financial institution, a financial institution identifier for a recipient financial institution, and a tokenized financial instrument of the sender, determining, using the financial institution identifier for the sender financial institution, the sender financial institution, the sender financial institution being a member of a payment network, providing to the sender financial institution the tokenized financial instrument of the sender to enable the sender financial institution to de-tokenize the tokenized financial instrument of the sender and identify an account of the sender financial institution associated with the sender, receiving, from the sender financial institution, a sender private identifier generated by the sender financial institution, the sender financial institution generating the sender private identifier upon confirming the account of the sender financial institution associated with the sender, associating the sender private identifier with the sender public identifier, providing to the sender financial institution the transfer amount of the fund transfer, the recipient public identifier, and the recipient financial institution identifier to enable the sender financial institution to determine availability of money in the account associated with the sender to satisfy the transfer amount of the fund transfer, generating a transaction identifier associated with the fund transfer, and providing the transaction identifier and a recipient private identifier to the recipient financial institution to enable the recipient financial institution to identify an account associated with the recipient to enable the recipient financial institution to receive an ACH message over the ACH network, the ACH message indicating payment from the sender financial institution to the recipient financial institution, the ACH message being generated by the sender financial institution and including the transaction identifier to identify the fund transfer between a sender and a recipient, the ACH message allowing the recipient financial institution to retrieve money from an ACH batch transfer and deposit money into the account associated with the recipient.

A number of embodiments include a method including receiving, by a computer system over a computer network from a recipient financial institution, (i) a public identifier associated with a recipient and (ii) a private profile identifier that was generated by the recipient financial institution. The recipient can have a recipient account at the recipient financial institution. The private profile identifier can be a unique identifier for the recipient at the recipient financial institution. The recipient financial institution can associate the private profile identifier with an account number of the recipient account at the recipient financial institution. The public identifier can be confirmed as useable to contact the recipient. The method also can include storing, by the computer system, a record including the public identifier and the private profile identifier in an information directory. The record does not include the account number of the recipient account. The method additionally can include receiving, by the computer system over the computer network, a funds transfer request to transfer funds from a sender account of the sender at a sender financial institution to the recipient account at the recipient financial institution. The funds transfer request can identify the recipient by the public identifier. The funds transfer request does not include the account number of the recipient account at the recipient financial institution or the private profile identifier. The method further can include determining, by the computer system, the private profile identifier for the recipient based on the public identifier in the funds transfer request and using the record stored in the information directory. The method additionally can include in response to receiving the funds transfer request, providing the private profile identifier, by the computer system over the computer network, to the sender financial institution to facilitate a transfer of the funds from the sender account at the sender financial institution to the recipient financial institution. The private profile identifier can be provided to the sender financial institution to enable the sender financial institution to associate the transfer of the funds with the private profile identifier such that the recipient financial institution can identify the account number of the recipient account based on the private profile identifier. The computer system can be operated by an entity that is different from the recipient financial institution and the sender financial institution.

Various embodiments include a system including one or more processors and one or more computer-readable media including computing instructions configured to be executed on the one or more processors and perform certain acts. The acts can include receiving, by a computer system over a computer network from a recipient financial institution, (i) a public identifier associated with a recipient and (ii) a private profile identifier that was generated by the recipient financial institution. The recipient can have a recipient account at the recipient financial institution. The private profile identifier can be a unique identifier for the recipient at the recipient financial institution. The recipient financial institution can associate the private profile identifier with an account number of the recipient account at the recipient financial institution. The public identifier can be confirmed as useable to contact the recipient. The acts also can include storing, by the computer system, a record including the public identifier and the private profile identifier in an information directory. The record does not include the account number of the recipient account. The acts additionally can include receiving, by the computer system over the computer network, a funds transfer request to transfer funds from a sender account of the sender at a sender financial institution to the recipient account at the recipient financial institution. The funds transfer request can identify the recipient by the public identifier. The funds transfer request does not include the account number of the recipient account at the recipient financial institution or the private profile identifier. The acts further can include determining, by the computer system, the private profile identifier for the recipient based on the public identifier in the funds transfer request and using the record stored in the information directory. The acts additionally can include in response to receiving the funds transfer request, providing the private profile identifier, by the computer system over the computer network, to the sender financial institution to facilitate a transfer of the funds from the sender account at the sender financial institution to the recipient financial institution. The private profile identifier can be provided to the sender financial institution to enable the sender financial institution to associate the transfer of the funds with the private profile identifier such that the recipient financial institution can identify the account number of the recipient account based on the private profile identifier. The computer system can be operated by an entity that is different from the recipient financial institution and the sender financial institution.

These and other advantages will become apparent to those skilled in the relevant art upon a reading of the following descriptions and a study of the several examples of the drawings.

BRIEF DESCRIPTION OF THE DRAWINGS

FIG. 5 depicts a screen shot of a web page that may be presented to a user to configure notification settings.

FIG. 6 depicts a screen shot of a web page that may be presented to a user to send money to a recipient.

FIG. 7 depicts a screen shot of a web page that may be presented to an out-of-network user when an out-of-network user is sent a payment.

DESCRIPTION OF EXAMPLES OF EMBODIMENTS

Figure 1:
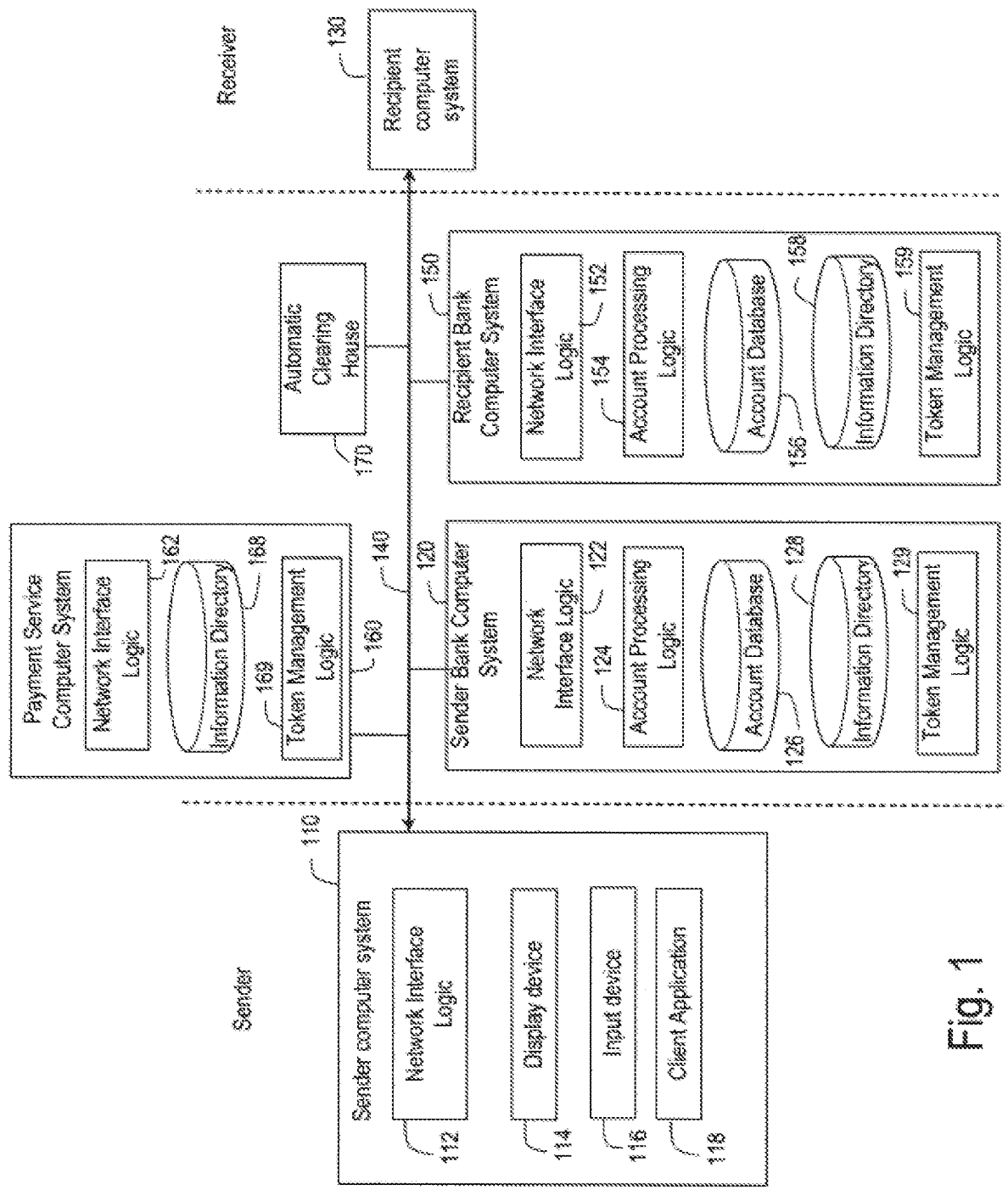
FIG. 1 depicts a schematic diagram of a funds transfer system in which a sender and a recipient use different banking institutions according to an example implementation.

Referring to FIG. 1, a funds transfer system 100 that implements a payment network, or a "funds transfer payment network," is shown. The funds transfer system 100 may be utilized by senders to send funds to recipients and by recipients to receive the funds. The funds transfer system 100 may facilitate the transfer of funds from senders to receivers (e.g., recipients) without either party disclosing any financial account information to each other. The senders and recipients may be individuals or business entities. In the example implementation, the sender uses a bank account as the source of funds. In other implementations, the sender may use credit cards, debit cards, business credit cards or check cards as the source of funds. The funds transfer system 100 may be used for both intrabank transfers (i.e., transfers in which the sender and the recipient both have accounts at the same bank and the funds are transferred between the accounts within the same bank) and interbank transfers (i.e., transfers in which the sender and the recipient have accounts at different banks and the funds are transferred between the accounts at different banks).

The funds transfer system 100 may include, among other systems, a sender computer system 110, a bank computer system 120, a recipient computer system 130, a bank computer system 150, a payment service computer system 160, and an automated clearing house computer system 170. Each of the above described systems may communicate through a network 140, which may include one or more of the Internet, Cellular network, Wi-Fi, Wi-Max, a proprietary banking network, and so on. In FIG. 1 and throughout the remaining description, for sake of providing an example, it is assumed that the sender performs a funds transfer from an account maintained by the bank computer system 120 and the receiver receives the funds using an account maintained by the bank computer system 150. Hence, the computer system 120 is sometimes referred to herein as the sender bank computer system and the computer system 150 is sometimes referred to herein as the receiver bank computer system. It will be appreciated of course that any given bank computer system may operate in different capacities in the context of different fund transfer transactions. Additionally, while the examples provided herein are primarily in the context of a sender requesting a funds transfer to a recipient, it will also be appreciated that a recipient may request a funds transfer from a sender.

The sender computer system 110 may be used by an individual user (e.g., a business owner or employee, a consumer, and so on) to create transactions and interact with banking functions provided through an online banking area of a website provided by the sender bank computer system 120 or through a website provided by a payment service 160. The sender computer system 110 may, for example, comprise a user computer (e.g., desktop or laptop computer), a cellular telephone, smart phone, a mobile handheld wireless e-mail device, a personal digital assistant, a portable gaming device, or other suitable device. The sender computer system 110 may also comprise one or more servers each with one or more processors configured to execute instructions stored in memory. For example, such an arrangement may be utilized if the sender is a merchant or other business.

The sender computer system 110 may comprise network interface logic 112, a display device 114, an input device 116, and client application 118. Network interface logic 112 may include, for example, program logic that connects the sender computer system 110 to the network 140. As described in greater detail below, for example, the sender computer system 110 may receive and display screens on the display device 114 including account information, transaction instructions, and so on. In an example implementation, such screens may be used to request a username and password information. Such screens may also be used to prompt the user to provide information regarding the amount of the funds and the identity of the merchant or individual that is to receive the funds. Such information may comprise, for example, a name, an address, a phone number, an e-mail address, a selection of a recipient from an electronic directory, and/or other information. Such screens may also include screens displaying information regarding past transactions. Such screens are presented to the user via the display device 114. The input device 116 may be used to permit the user to initiate account access and to facilitate receiving fund transfer request information from the user.

The client application 118 may comprise program logic (i.e., stored executable instructions) configured to implement at least some of the functions described herein. As will be appreciated, the level of functionality that resides on the sender computer system 110 as compared to other components of the funds transfer system 100 may vary depending on the implementation. The client application 118 may simply be a web browser (e.g., Internet Explorer®, Mozilla Firefox®, Chrome®, Safari®, and so on) configured to receive and display web pages received from the banking computer system 120. The client application may also comprise a mobile web browser, text message (SMS) interface, a dedicated application, or other program suitable for sending and receiving information over the network 140.

The bank computer system 120 is operated by a bank institution that maintains accounts held by customers, such as demand deposit accounts, credit card accounts, home mortgage loans, student loans, and so on. The bank computer system 120 may, for example, comprise one or more servers each with one or more processors configured to execute instructions stored in memory, send and receive data stored in memory, and perform other operations to implement the operations described herein associated with logic or processes shown in FIGS. 1-7.

The bank computer system 120 may include network interface logic 122, account processing logic 124, an account database 126, and an information directory 128. The network interface logic 122 may include, for example, program logic that connects the bank computer system 120 to the network 140. The network interface logic 122 may facilitate secure communications between the bank and the sender and/or the recipient. The network interface logic 122 may also facilitate communication with other entities, such as other banks, settlement systems, and so on. The network interface logic 122 may include user interface program logic configured to generate and present web pages to users accessing the bank computer system 120 over the network 140.

The account processing logic 124 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a sender or recipient of funds), the account processing logic 124 reflects an appropriate debit or credit in the account database 126, which stores account information (e.g., transactions, information about the account holder, and so on) for accounts that are maintained by the bank on behalf of its customers. The account processing logic 124 may also process fund transfer requests to transfer funds from a sender using the sender computer system 110 to a recipient using the recipient computer system 130.

The information directory 128 may be used when an identifier other than a bank account/routing number is used (e.g. an e-mail address, phone number, Universal Payment Identification Code (UPIC), randomly generated number, and so on) to identify a recipient of a funds transfer. The information directory 128 may be a database that is maintained to allow the financial institution to convert/correlate the recipient's cell phone number (or e-mail address, or other identifier) to a bank account number/routing number of the recipient's bank account. This arrangement allows the sender to uniquely identify the recipient (e.g., with an e-mail address or other identifier), without necessarily having private/personal information regarding the recipient (i.e., the recipient's bank account/routing number).

Users may register their information with the information directory 128 prior to any financial transaction. A user may be added to the information directory 128 upon registering for the funds transfer system 100 through the bank computer system 120. Upon registration, a new entry may be created for the newly registered user in a database that implements the information directory 128. The user may provide one or more identifiers (e.g., phone numbers, e-mail addresses, and so on) that the user may share with other individuals with whom the user interacts (for example, in the same way that people selectively or freely share phone numbers and e-mail addresses with other individuals for purposes of communicating with such other individuals). Herein, such identifiers are referred to as "public identifiers" or "public tokens." (The terms "identifier" and "token" are used interchangeably herein to refer to a code (e.g., an e-mail address, a phone number, a user generated or system generated character string, etc.) that identifies a user.) The information directory 128 may also generate or otherwise associate an identifier that is securely maintained and that is used to identify the user in the information directory 128. Herein, such identifiers are referred to as "private identifiers." The private identifier may, for example, be a unique ID of the database entry for the user in the information directory 128. While the private identifier is known by the information directory 128, it need not be known by the user with whom it is associated or by other users. However, it may be known by banks and other entities that are members of the funds transfer payment network. In addition to the public identifier(s) (e.g., phone numbers, e-mail addresses, and so on), the private identifier (e.g., database UID), other information may also be stored in the database entry, such as account information (account numbers, routing numbers, etc.) for accounts held by the user at the bank and user preferences. At least some of this information may be populated automatically, e.g., if the user registers for the funds transfer system 100 during a secure on line banking session on the bank computer system 120.

Additionally, the database entry for each user may also store a registry of other users connected to that user. That is, for each user, a registry may be stored that includes a listing of each other user with whom the user has an established connection. Such connection may be established, for example, the first time that the user sends or receives funds from the other user. A connection may also be established by way of a user interface that permits a user to add connections with other users through a lookup service in the information directory 128 and/or another information directory. An example of such a user interface is discussed below in connection with FIG. 4. The users may include not only users that are registered in the funds transfer payment network, but also other affiliated payment networks, as discussed in greater detail below. For each user in the registry, additional information may be stored, such as their unique ID and/or other information. As another example, the information for the other users may be stored in separate database entries in the information directory 128.

In various implementations, a plurality of information directories may exist, each directory maintained by a different institution or entity. For example, users that maintain accounts at the bank associated with bank computer system 120 may register through bank computer system 120, users that maintain accounts at the bank associated with bank computer system 150 may register through bank computer system 150, and so on for other users that maintain accounts at other entities. Such entities may also include non-bank entities (e.g., payment processing companies, credit agencies, credit card network providers, and so on), and users may also register through such non-bank entities.

In addition to the public and private identifiers that have already been described herein, additional identifiers may also be used. For example, such additional identifiers may be handled with varying levels of security. As another example, variations of existing public identifiers may be used to implement special purpose public tokens, public tokens with customized functionality, and so on, as discussed in greater detail below.

The token management logic 129 manages tokens. For example, the token management logic 129 may be configured to register tokens, authenticate tokens, generate tokens and so on. The token management logic 129 may also facilitate identification of the recipient when a token is not recognized. The token management logic 129 may also be used to customize attributes of tokens, such that particular accounts are used, particular methods of notification are used, and so on. The token management logic 129 is discussed in greater detail below in connection with FIG. 2.

The recipient computer system 130 may be configured in generally the same manner as the other computer systems described herein. For example, if the fund recipient is an individual, the computer system 130 may be a mobile device, such as a cellular phone, smart phone, mobile handheld wireless e-mail device, personal digital assistant, portable gaming device, a desktop computer or other suitable device. The computer system 130 may also comprise one or more servers each with one or more processors configured to execute instructions stored in memory. For example, such an arrangement may be utilized if the recipient is a merchant or other business.

In one implementation (e.g., where the recipient is a bricks-and-mortar merchant), the recipient computer system 130 may include point of sale devices (e.g., cash register systems) that are equipped to electronically obtain public token information from customers. For example, the cash register systems may be equipped with a near field communication (NFC) reader device that is capable of reading a public token (e.g., cell phone number) from an NFC equipped cell phone. As another example, the cell phone may include an application that is configured to generate a bar code or other image on a display screen that contains the public token, and the cash register system may be equipped with a bar code reader configured to read the bar code. The recipient computer system 130 may then request payment from the sender via the funds transfer system 100 using the public token obtained at the point of sale.

The recipient bank computer system 150 may be configured in a similar manner as the sender bank computer system 120. Thus, the bank computer system 150 comprises network interface logic 152, account processing logic 154, account database 156, and information directory 158 corresponding to the network interface logic 122, account processing logic 124, account database 126 and information directory 128 of the bank computer system 120.

The payment service computer system 160 may be associated with a payment service that is configured to facilitate interbank fund transfers, e.g., a payment service provided by a non-bank entity as previously mentioned. The payment service may, for example, be an entity that is formed as a joint venture between banks and/or other entities that send and receive funds using the funds transfer system 100. As another example, the payment service may be a third party vendor. As another example, the payment service may be a web portal provided for an online community of individuals where such individuals obtain user names/login IDs or otherwise become registered members. The individuals may, for example, use the web portal to interact with each other and/or to interact with a service provided by the online community. Examples of online communities include MSN®, iPhone® users, Facebook®, LinkedIn®, and so on. The payment service may, for example, be an additional service that is offered by the web portal to the members of the online community. As another example, the payment service may be provided by one of the banks, i.e., such that the bank performs both the operations described herein as being performed by the bank computer system 120/150 and the operations described herein as being performed by the payment service computer system 160.

Herein, the banks associated with computer systems 120 and 150 are assumed to be "member banks." That is, the banks associated with computer systems 120 and 150 are assumed to follow established protocols for transferring funds using the funds transfer system 100. For example, in the context of a payment service that is created as a joint venture, the member banks may include at least the banks that are part owners of the joint venture, as well as potentially other banks. While two member banks are shown in FIG. 1, it will be appreciated that there may be additional member banks. Additionally, as previously indicated, non-bank entities may also be members. The payment service may also be used by senders and recipients that have bank accounts at non-member banks, for example, by permitting such users to register directly with the payment service computer system 160. Hence, users do not need to be customers of any particular bank in order to be able to use the funds transfer system 100.

The payment service computer system 160 may, for example, comprise one or more servers each with one or more processors configured to execute instructions stored in memory, send and receive data stored in memory, and perform other operations to implement the operations described herein associated with logic or processes shown in FIGS. 1-6. The payment service computer system 160 includes network interface logic 162 and an information directory 168. Although not specifically shown, it will be appreciated that the payment service computer system 160 may include account processing logic and an account database in the same or similar manner to the account processing logic 124, 155 and the account databases 126, 156. The network interface logic 162 may include user interface program logic configured to generate and present web pages to users accessing the payment service computer system 160 over the network 140.

The information directory 168 may be used when an identifier other than a bank account/routing number is used (e.g. an e-mail address, phone number, Universal Payment Identification Code (UPIC), randomly generated number, and so on). As described above in connection with the information directory 128 and 158, the information directory 168 is a database that is maintained to allow the payment service to convert/correlate the recipient's cell phone number (or e-mail address, or other token) to a bank account number/routing number of the recipient's bank account for users that registered through the payment computer service system 160. This arrangement allows the sender to uniquely identify the recipient (e.g., with an e-mail address or other identifier), without necessarily having private/personal information regarding the recipient (i.e., the recipient's bank account/routing number).

Users including senders and recipients may register their information with the information directory 168 in advance, e.g., where such users do not bank or have accounts with any of the other member entities. Additionally, the payment service computer system 160 may be configured such that users that only wish to send funds may do so without registering. For example, the payment service computer service system 160 may be configured to generate web pages that receive credit card information from a sender to complete a transaction each time a sender wishes to send funds, without requiring that the sender ever register with the payment service computer service system 160.

As will be appreciated, the information that is stored in the information directory 168 may vary depending on the implementation, including the extent to which information is also stored in the information directories 128 and 158. For example, in one implementation, when a user registers at the bank computer system 120 (or at the bank computer system 150, or at the computer system of another member entity), information may be stored in both the information directory 128 and the information directory 158. The information directory 128 may store a complete identification of the user's bank accounts and other information collected during registration. Conversely, the information directory 168 may store a reduced amount of information, such as the registered public token(s), the financial institution with it is associated, and the private token (e.g., unique ID) associated with each token. More detailed bank account number/routing number, or other sensitive information need not be stored at the information directory 168. In another implementation, instead of using a payment service computer system 160 to maintain the information directory 168, such information may be stored entirely in the information directories 128, 158 maintained by individual member banks. As will also be appreciated, the extent to which transaction details are tracked and maintained in the account processing logic 124, 154 as compared to the extent to which transaction details are tracked and maintained by the payment service computer system 160 may vary depending on the implementation.

The Automatic Clearing House (ACH) system 170 is used to transmit funds to and from bank accounts of the senders and recipients. As is known, the ACH Network is a nationwide batch oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the implementations of the current invention will continue to function similarly even if some methods and steps in the ACH system are modified.

Figure 2:
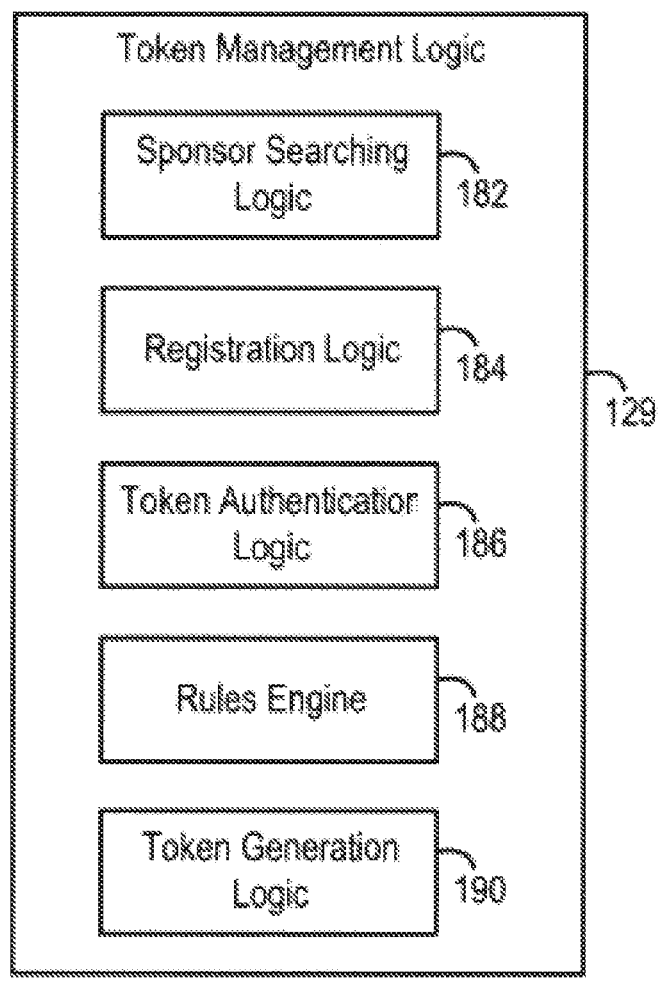
FIG. 2 depicts a schematic diagram of token management logic that may manage tokens for fund transfer requests according to an example implementation.

Referring to FIG. 2, FIG. 2 shows the token management logic 169 in greater detail. As shown in FIG. 2, the token management logic 169 includes sponsor identification or sponsor searching logic 182, registration logic 184, token authentication logic 186, rules engine 188, and token generation logic 190. Although the token management logic 169 is shown, it will be appreciated that the token management logic 129 and 159 may be configured in the same or similar manner.

The sponsor identification logic 182 may be configured to identify a sponsor of a token. For example, if the sender uses a token to identify a recipient that is unrecognized at the information directory 128 of the sender bank computer system 120 (i.e., because the recipient is not a customer of the sender bank), the sponsor identification logic 182 may be configured to receive the token from the sender bank computer system 120 and access the information directory 168 to provide an identification of the unique ID and financial institution associated with that token.

As will be appreciated, the extent to which the bank computer systems 120, 150 have sponsor identification logic that operates in the same manner as the sponsor identification logic 182 may depend, in part, on the extent to which the information is stored in the information directory 168 as compared to the extent to which information is also stored in the information directories 128 and 158. In various implementations, greater or lesser degrees of reliance may be placed on the information directory 168 to perform user identification functions in a centralized fashion in connection with the transfer of funds between entities. Herein, for sake providing an example, it is assumed that the information directory 168 is used to perform user identification functions in a centralized fashion in connection with the transfer of funds between entities. In such implementations, it may be possible to avoid replicating all the functions of the sponsor identification logic 182 and the bank computer systems 120, 150.

In one implementation, the funds transfer payment network is configured to interact with other affiliated payment networks (e.g., PayPal, CashEdge, and so on). In such an arrangement, if the token provided by the sender bank computer system 120 is not recognized in the information directory 168, the sponsor identification logic 182 is configured to transmit inquiries to the other affiliated payment networks (e.g., in a predetermined sequence) to determine if the token is recognized at any of the other affiliated payment networks. If the recipient is registered with another payment network, then the funds may be transferred to the recipient by routing the funds through the other payment network. In an implementation where a user lookup service is provided by the information directory 168, the look up service may operate in the same manner to identify users registered at remote entities. Information may also be stored in the information directory 168 identifying the payment network determined to be associated with that token, thereby facilitating additional funds transfers to that token in the future. Hence, in such an arrangement, funds may be pushed to a recipient that is not registered with the funds transfer payment network but rather that is registered with another payment system. Additionally, such funds may be pushed to the recipient without the sender having to know or be concerned about whether the recipient is registered with the funds transfer payment network.

The registration logic 184 is configured to facilitate the process of registering new users. For example, in the preceding discussion, if the token is not recognized at the information directory 168, and is not registered at any other affiliated payment network, then the registration logic may be configured to send the recipient an e-mail or other communication inviting the recipient to register with the payment network. Such an e-mail may include a link to the website provided by the payment service computer system 160. The registration logic 184 may be configured to generate web pages for presentation to the user at the website to facilitate the registration process. If, based on information provided by the user when registering at the website, it is determined that the user is a customer of one of the member entities, then the user may be forwarded to the website of the member entity to complete the registration process. As will be appreciated, the registration logic 184 may also present web pages to the user in other scenarios (e.g., where the user has arrived at the website as a result of a search engine query, where the user has arrived at the website via another website (e.g., such as an online community website or merchant website), and so on). The registration logic 184 may create new database entries in the information directory 168 responsive to inputs received from the user.

The token authentication logic 186 is configured to authenticate tokens. For example, when a user registers a new token, the token authentication logic 186 may be configured to confirm that the user is associated with that token (e.g., that the user who is attempting to register a cell phone number as a token is indeed the owner of that cell phone number). (Herein, the term "own" in the context of telephone numbers refers to the telephone number being assigned to one particular user as opposed to being assigned to other users, and is not being used to refer to ownership as between the user and the phone carrier that provides the telephone number to the user. The term is used analogously in the context of e-mail addresses.) As another example, when a user attempts to register a new e-mail address, the authentication logic 186 may perform an authentication operation such as sending the user an e-mail at the new e-mail address. The e-mail may, for example, contain a link that must be accessed by the user in order to successfully complete the registration process.

Additionally, the token authentication logic 186 may be configured to perform authentication operations on previously-registered tokens. For example, a user that registers a cell phone number may ultimately switch cell phone numbers and/or cell phone carriers. The token authentication logic 186 may be configured to process disconnect directories that are published by cell phone carriers and that list cell phone numbers that have been disconnected by that carrier. For example, if a registered cell phone number is listed as having been disconnected, the token authentication logic 186 may send an e-mail to the user at a registered e-mail address to determine whether the cell phone number is no longer a valid token for that user or whether the user has merely changed cell phone carriers but has retained the cell phone number.

The token authentication logic 186 may also be configured to send follow up communications to the user trying to use a token to send/receive money from another user if there is uncertainty regarding whether the other user is correct owner of the token. For example, the token authentication logic 186 may be configured to notify the sender that such uncertainty exists, request that the sender provide confirm information that was provided regarding the recipient, provide additional information regarding the recipient, and so on. For example, if a user attempts to send funds using the token jsmith@abc-company.com, an e-mail may be sent to the user if there is uncertainty whether ownership of the token jsmith@abc-company.com has changed (e.g., due to a change in employees at ABC Company). The authentication logic 186 may also be configured to access other networks or online communities (e.g., Facebook, LinkedIn, etc.) to obtain additional information that may be used to authenticate the token. The token authentication logic 186 may also be configured to track the changing public tokens by date and time of use and the date and time that a particular recipient ceases to use a particular public token.

Hence, the registration logic 182 and the authentication logic 184 cooperate to facilitate the registration of tokens and to ensure that the tokens are associated with their correct owners. In one implementation, the entity that registers a token is responsible for warranting the validity of the registration. For example, if the recipient bank registers a token 415-555-1226, and subsequently accepts a payment to the user that registered the token 415-555-1226, then the recipient bank is responsible for refunding money to the sender if the user that registered the token 415-555-1226 is not actually the owner of that cell phone number at the time of the funds transfer (e.g., because the previous owner changed cell phone numbers, and the new owner is on a different payment network). Hence, the recipient bank undertakes responsibility for correctly authenticating the user at the time of registration and for routinely processing disconnect directories to ensure that the authentication remains valid.

In one implementation, the warranty (and/or limited access to the information directory 168) may be provided as a service to third parties. For example, an on line retailer that is refunding money to a customer may wish to verify that a token previously provided by the customer (e.g., "415-555-1226") remains accurate. If funds are refunded to the customer at the "415-555-1226" token, but the customer no longer owns that token, then the payment service would be responsible for refunding the funds to the correct customer. The fee charged for the service may, for example, be based on the dollar value of liability accepted by the payment service for providing incorrect information. As another example, a service may be provided in which a per token fee is charged for identifying a user based on a token and/or for identifying a token (e.g., e-mail address, cell phone number, etc.) based on an identification of a user.

The rules engine 188 is configured to permit users to configure different attributes for different tokens. The attributes may be specified in rules that are configured based on user specified preferences. In various implementations, the rules engine 188 may provide a user with default settings that are used until the user decides to customize the rules. For example, the rules engine 188 may be used to configure the manner in which funds are directed to various accounts held by the user at the bank (e.g., to forward at least a portion of the funds or transfer funds into a particular type of account), and so on. As another example, the funds may be split between a plurality of accounts according to the rules specified by the user, e.g., the funds may also be transferred into at least one of a retirement account, savings account, PayPal® account, or a certificate of deposit. As another example, portion of the received funds may be forwarded to a different user that is registered with the payment network. As another example, the rules engine 188 may be used to configure the manner in which a notification is sent to a recipient informing the recipient that a fund transfer request has been made by a sender. For example, according to one implementation, the rules may be configured to specify the channel(s) by which notifications are sent (e-mail, text message, voicemail, and so on), the e-mail account(s) and/or phone number(s) to which notifications are sent, and so on. As another example, if the fund transfer amount is greater than a threshold value, the user may receive an automated telephone call instead of an e-mail message or may receive an e-mail/telephone call instead of no message. As another example, if the fund transfer request originated from a particular sender, then the user may specify the mode of the notification (e.g., e-mail, voicemail, or text message). As another example, the rules engine 188 may be used to configure the payment channel used to send funds to a recipient (e.g., ACH transfer, credit card network, PayPal network, printed and mailed check, and so on). As another example, the rules engine 188 may be used to configure the speed with which funds are transferred to the recipient (e.g., instantaneous, same day, overnight, 2-day payment, and so on). As another example, the rules engine 188 may be used to configure transaction limits (e.g., to ensure that no more than $500 can be charged to a particular token during a predetermined time period such as one day, one week, one month, etc.).

The token generation logic 190 may be configured to generate additional public tokens for a user. The token generation logic 190 may cooperate with the rules engine 188 to create different tokens that are configured with different attributes. For example, a business may wish to use different individual tokens depending on whom within the business is responsible for processing a particular transaction. For example, a recipient that is a landlord that owns several apartment buildings may wish to create different tokens for each apartment building. For example, the additional tokens may be based on user provided alphanumeric character strings, may be system generated based on pseudo random character strings, or may be generated in another fashion. For example, if the landlord recipient already uses an e-mail address as a public token (e.g., landlord@ mail.com), the additional public tokens may be variants of the public token already used by the recipient (e.g., landlord@mail.com/building1, landlord@mail.com/building2, landlord@mail.com/building3 and so on). Such tokens may then be configured with different attributes using rules engine 188. For example, if each of the different buildings has a different building manager, then an e-mail may be sent to an e-mail address of the respective building manager for a particular apartment building when a tenant of that apartment building pays rent.

As another example, the landlord recipient may provide each tenant with a different public token for use by the tenants to pay rent. Again, for example, the additional tokens may be variants of the public token already used by the recipient (e.g., landlord@mail.com/unit101, landlord@ mail.com/unit102, landlord@mail.com/unit103 and so on). The bank computer system 150 may then receive funds from each tenant and all the funds may be transferred to one or more accounts belonging to the landlord. The account processing logic 154 may be configured to generate a report showing the funds received in connection with each token (thereby showing, for example, which tenants have paid in a given month and which tenants have not paid in a given month). Tokens may also be programmed with additional information, for example, the amount of the expected monthly payment. The account processing logic 154 may then be configured to compare the amount actually received with the expected monthly payment to ensure that the tenant has paid completely and to track overall account status of the tenant.

As another example, a recipient may also configure single use tokens. For example, a recipient may be organizing an event in which other users are expected to financially contribute to the event. The recipient may then configure a token (e.g., johnsmith@mail.com/moms-birthday-party) which may be provided to the other users. The account processing logic 154 may then generate a report showing the funds that have been received from various ones of the other users in connection with that token.

As another example, senders may also configure different tokens. For example, a sender may use a first token as their default token (e.g., johnsmith@mail.com), and create additional special purpose tokens where payment is to be made from other accounts (e.g., johnsmith@mail.com/collegesavings to make a tuition payment from a college savings fund).

As another example, as previously indicated, the information directories 128, 158, 168 may provide a lookup service that may be used by users to establish connections with other users. In such an implementation, users may be able to configure aspects of their tokens that are displayed to other users. For example, if an individual is operating a business under another name (e.g., Joseph Smith DBA "Joe's Lawn Service"), it may be desirable to permit the user to configure the token such that the business name is displayed to other users, even though the name on the account is actually the individual's name. In this manner, it may be easier for customers of the business to establish a connection with the business.

Figure 3A:
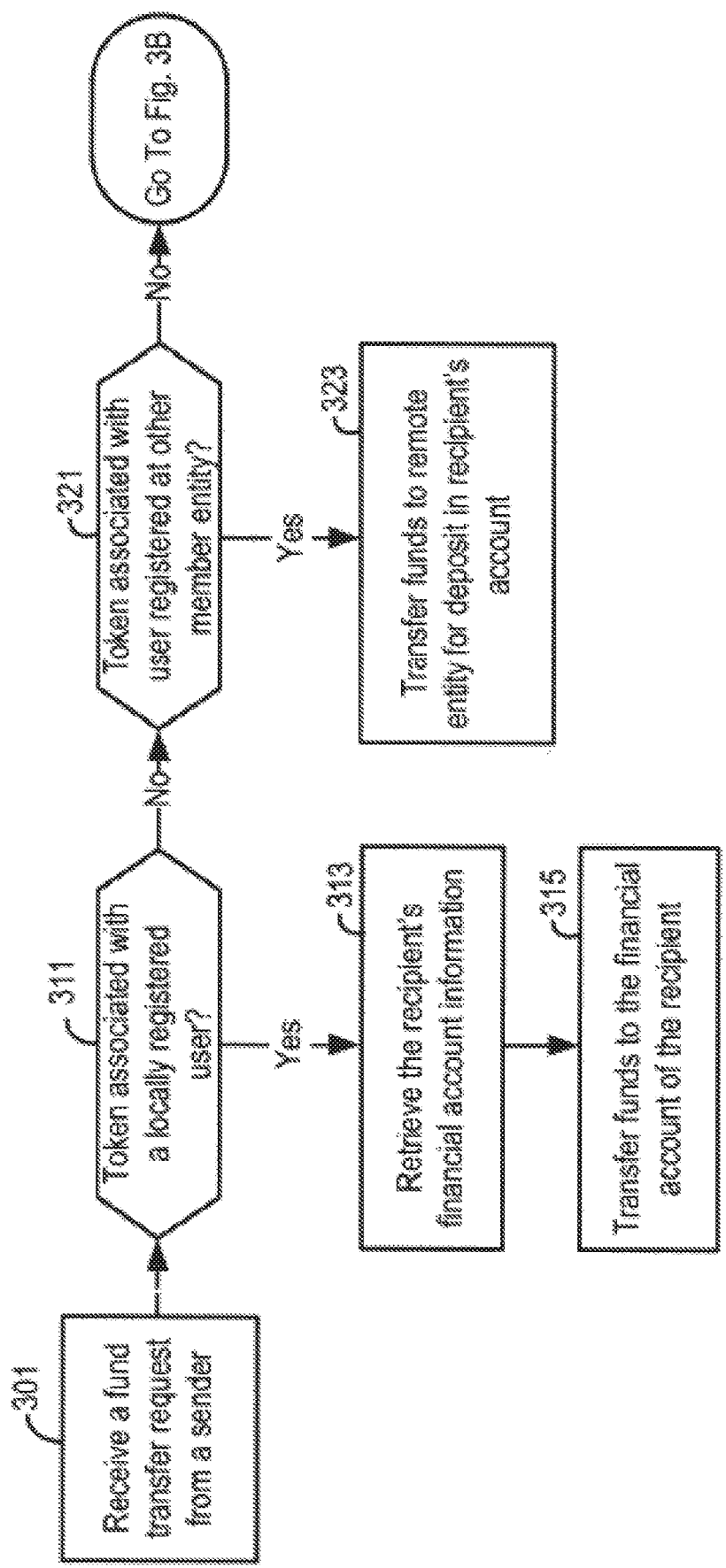
FIG. 3A depicts a process in which a fund transfer request results in the funds being received by a registered or unregistered recipient according to an example implementation.
Figure 3B:
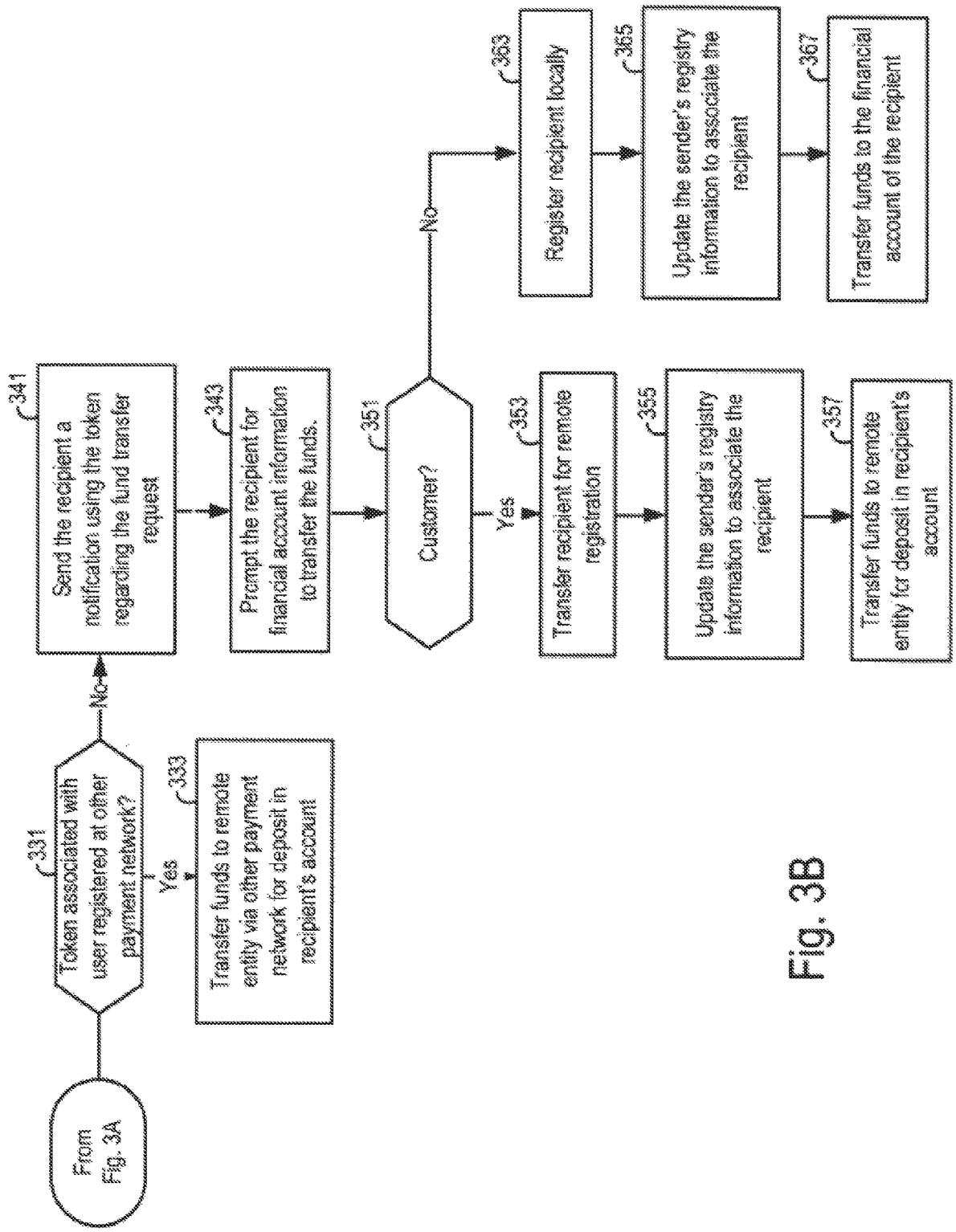
FIG. 3B depicts a process in which a fund transfer request results in the funds being received by a registered or unregistered recipient according to an example implementation.

Referring to FIGS. 3A and 3B, FIGS. 3A and 3B illustrate a process in which the funds may be received by a registered or unregistered recipient according to an example implementation. In FIGS. 3A and 3B, a fund transfer message is received from a sender at the sender bank computer system 120 and propagates to the recipient bank computer system, where it causes funds to be deposited in to the account of a recipient. Specifically, at step 301 in FIG. 3A, the sender bank computer system 120 receives a fund transfer request from a sender which identifies the recipient using a token. At step 311, the bank computer system 120 searches the information directory 128 to determine whether the token is associated with a user that is registered with the sender bank (i.e., a transfer within the same bank). If the token is associated with a user registered with the sender bank then, at step 313, the recipient's account information is retrieved from the information directory 128. Subsequently, at step 315, the funds are transferred to the recipient's account. The funds may be transferred to the recipient's financial account based on preferences of the sender and the recipient, as discussed in greater detail below in connection with FIGS. 4 to 6.

If, at step 311, the recipient is not registered with the sender bank, then the process proceeds to step 321. At step 321, the bank computer system 120 transmits an inquiry to the payment service computer system 160, and it is determined if the token is associated with a user that is registered at another member entity of the funds transfer payment network. For example, if it is the first time that the sender has transferred funds to this particular recipient, then the bank computer system 120 may transfer the public token of the recipient as provided by the sender. In this scenario, the sponsor identification logic 182 may perform a search of the information directory 168 to determine if the token is associated with a user that is registered with another member entity. If the public token is located in the directory, then the payment service computer system 160 may return the unique ID associated with the public token along with an identification of the financial institution or other member entity with which it is associated to the sender bank computer system 120. The sender bank computer system 120 may then create another registry entry for the sender, and store the public token and the unique ID of the recipient as part of the registry entry. The sender bank computer system 120 may also prompt the sender to provide other information about the recipient (e.g., a nickname or other name by which the sender wishes to identify the recipient).

As another example, if the sender has transferred funds to this recipient previously, then the bank computer system 120 may transfer the unique ID of the recipient to the payment service computer system 160. In this scenario, the sponsor identification logic 182 may use the unique ID as an index to the database that implements the information directory 168 to locate the recipient in the information directory 168. Assuming the unique ID is still valid and is still located in the information directory 168, then the payment service computer system 160 may return the financial institution or other member entity with which it is associated to the sender bank computer system 120. As another example, if the sender has transferred funds to this recipient previously, then the bank computer system 120 identifies the member entity with which it is associated based on the unique ID itself (e.g., where the unique ID is embedded with information that identifies the financial institution). At step 323, the sender's registry is updated to include an entry for the recipient, including the unique identifier of the recipient. At step, 325 the funds are transferred to the member entity (e.g., the recipient bank in the example of FIG. 1) for deposit along with the unique ID of the recipient. Based on the unique ID, the information directory 158 may be accessed by the recipient bank computer system 150 to identify the account number of the recipient. The funds may then be deposited in the bank account of the recipient.

If, at step 321, the recipient is not a user that is registered at another member entity of the funds transfer payment network, then the process proceeds to step 331 illustrated in FIG. 3B. At step 331, the sponsor identification logic 182 of the payment service computer system 160 transmits inquiries to other payment networks (e.g., PayPal®, Star, Blink, Interlink, Plus, etc.), and it is determined if the token is associated with a user that is registered at another payment network. For example, the sponsor identification logic 182 may transmit an inquiry to a first payment network to inquire whether the recipient is registered at that payment network. If not, the sponsor identification logic 182 may continue to transmitting additional inquiries to other affiliated payment networks until the payment network at which the recipient has registered an account is identified. At step 333, if the recipient is registered with another payment network, information may also be stored in the information directory 168 identifying the payment network determined to be associated with that token, thereby facilitating additional funds transfers to that token in the future. Next, at step 335 the funds may be transferred to the recipient by routing the funds through the other payment network. Hence, in such an arrangement, funds may be pushed to a recipient that is not registered with the funds transfer payment network without the sender having to know or be concerned about whether the recipient is registered with the funds transfer payment network.

If, after the search of other payment networks is completed, no other payment network is identified at which the recipient is registered, then the recipient is presumed to not be a registered user of any payment network. Accordingly, at step 341, an invitation is sent to the recipient to invite the recipient to join the payment network. For example, if the token used by the sender is an e-mail address, then an e-mail is sent to the recipient informing that another user is attempting to transfer funds to the recipient and inviting the recipient to join the payment network. A link in the e-mail may, for example, deliver the recipient to the website provided by the bank computer system 120. As another example, if the token used by the sender is a cell phone number, the recipient may be sent a text message containing a URL inviting the recipient to join the payment network. As will be appreciated, the recipient may be sent such an invitation in other situations, e.g., if the recipient is not a registered user of the funds transfer payment network, even if the user is a registered user of another payment network.

At step 343, the recipient may be prompted to provide account information. At step 351, based on the account information, it may be determined whether the user is a customer of one of the member entities. For example, a bank routing number for a demand deposit account may be used to determine whether the user is a customer of one of the member entities. If the recipient is a customer of a member entity, then at step 353 the recipient may be transferred to the member entity for registration (e.g., the recipient bank in the example of FIG. 1). A unique ID is associated with the recipient in the information directory 158 of the recipient bank computer system 150 and in the information directory 168 of the payment service computer system 160. At step 355, the sender's registry is updated to include the recipient, including the unique identifier of the recipient. At step 357, the funds are transferred to the recipient.

If the recipient is not a customer of a member entity, then at step 363 the recipient is registered by the payment service computer system 160. At step 365, the sender's registry is updated to include an entry for the recipient, including the unique identifier of the recipient. At step 367, the funds are transferred to the recipient. As will be appreciated, if the recipient has customized fund transfer preferences, the fund transfer may be processed by the rules engine 188 according to the recipient preferences. Examples of token customization to reflect such preferences were previously described above in connection with rules engine 188 and token generation logic 190.

Figure 4:
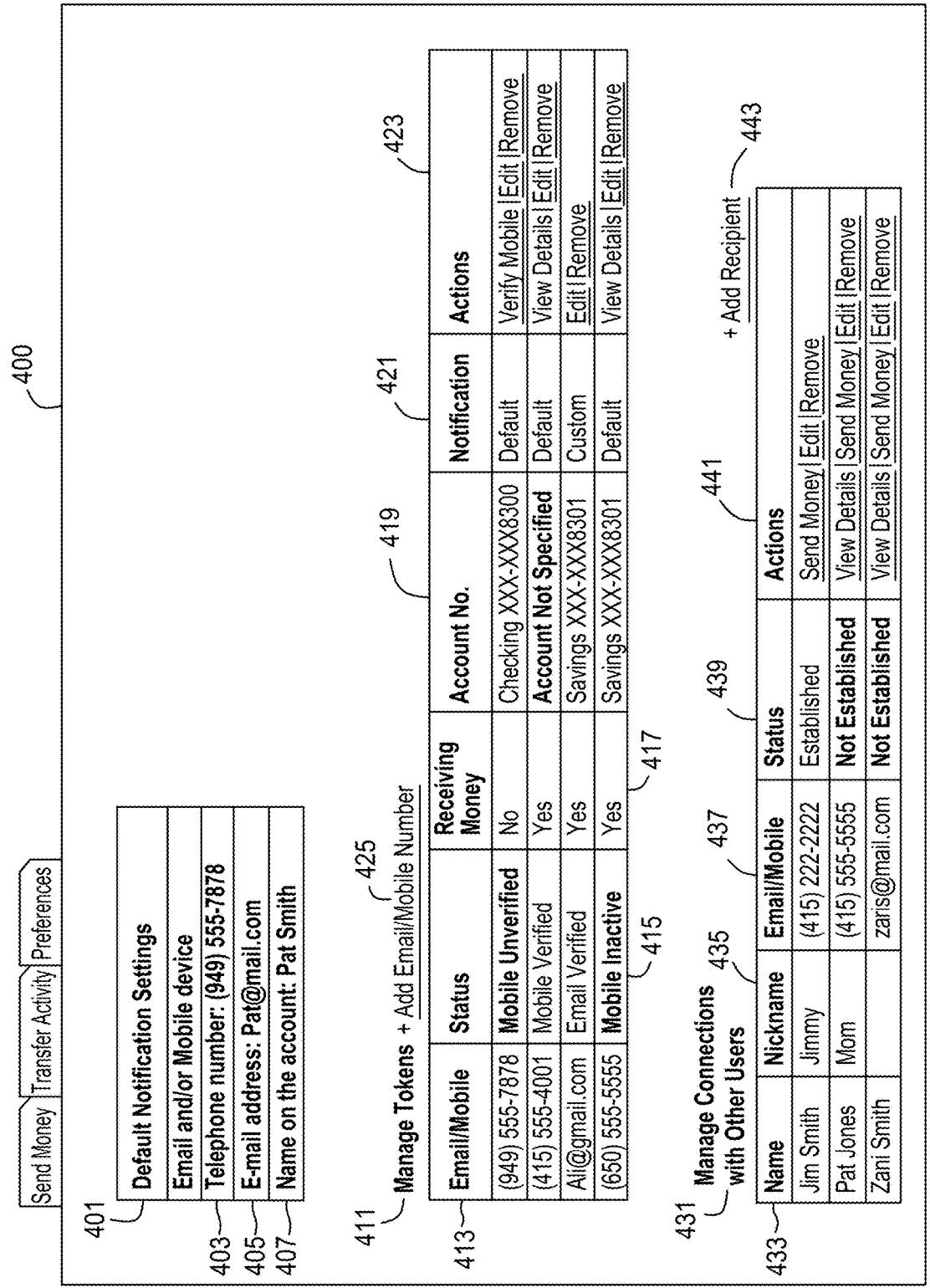
FIG. 4 depicts a screen shot of a web page that may be presented to a user to configure user preferences and manage connections with other users.

FIG. 4 is a screen shot of a web page 400 that may be provided to a user when the user selects a preferences tab. The web page 400 may be used to configure preferences in connection with the token management logic 129, 159 or 169 (depending on where the user registered for the payment network). Web page 400 includes a plurality of fields including a default notification settings field 401, a manage connections field 411, and a manage recipients field 431. The default notification settings field 401 presents the user with information regarding the current default notification settings for a funds transfer event. As shown in the screen shot in FIG. 4, notification settings field 401 may include settings to specify a telephone number to which automated telephone call notifications or text message notifications should be sent (field 403) and an e-mail address to which e-mail notifications should be sent (field 405). The user may also be permitted to specify the name on the account (field 407) as it should appear to other users when the other users receive a funds transfer notification. The information specified in field 407 may also be used in other situations, for example, when other users are searching for connections through a lookup service in information directory 128, 156, 168. The user may configure the rules engine 188 to notify the user regarding transactions based on the user preferences received from the user prior to the occurrence of the transactions. If the user fails to configure customized notification settings, default notification settings may be used. In various implementations, a user may choose different/custom notification settings for each token that the user has registered.

In the example shown in FIG. 4, the telephone number that may receive a call, text message or voice message, upon the occurrence of a predetermined event is 949-555-7878. Additionally, the e-mail address that may be used to notify the user that a fund transfer has occurred from or to the user's accounts is pat@mail.com. The user may choose to be notified by e-mail or telephone or both.

The token field 413 may display a particular token that the user has registered or is in the process of registering. The status field 415 may display whether the token has been verified/unverified or is active/inactive. The receiving money field 417 is derived in part on the information in the status field and indicating whether a particular token is currently available for sending/receiving money. For example, for the inactive phone number (i.e., 650-555-5555), the user may send/receive funds using this token for connections established prior to the token becoming inactive. However, the user cannot establish new connections with other users based on this token. For example, this may be a mobile number that was previously owned by the user. Because a unique ID serves as the basis for funds transfers after a connection has been established, previously established connections are still valid (because they are based on the unique ID and not the mobile number), however, new connections are not permitted to be established (because another user may now be using the token).

The account number field 419 may display the type of account and a partial account number of an account that is associated with the token in field 413. Hence, funds sent/received using the token specified in field 413 are withdrawn from/deposited to the account specified in field 419. If an account number is not associated with the e-mail address or the mobile number in field 413, then the account number field 419 may display a message such as "account is not specified." The notification field 421 may indicate whether the default notification settings specified in field 701 are to be used for notifications or whether other/customized settings are to be used.

Actions field 423 may include various links that allow the user to take various actions. For example, links may include, edit, remove, and verify. If the status of a token is verified, then the edit field allows the user to edit attributes of the token as specified in the rules engine 188. For example, the accounts and notification preferences (fields 719 and 721) may be edited in greater detail. If the account number is verified, then the remove link may also be displayed. if the account is unverified or inactive, a verify link that sends an e-mail or a SMS and displays a verification code may be displayed. An edit and remove link may also be displayed for unverified or in active e-mail or telephone numbers. The user may also add new tokens using new connections link 425.

As will be apparent from fields 401 and 411, separate payment and notification channels may be used for funds transfers. For example, for the 415-555-4001 token, the payment channel occurs through the 415-555-4001 token, however, the notification channel occurs through the 949-555-7878 and pat@mail.com tokens. Additionally, if the user decides to set a custom notification channel for the 415-555-4001 token, the user can do so without disrupting connections that have already been established using the 415-555-4001 token. Disrupting one channel (e.g., by changing the token) does not impact the other channel.

The manage connections field 431 allows a user to perform various functions related to managing the user's connections with other users. Field 431 shows a registry of connections that have been established by a user. Within field 431 various information may be displayed regarding each other user, for example, name (field 433), nickname (field 435), e-mail/mobile (field 437), status (field 439), and actions (field 441) and a link that allows a user to add new recipients 443. Although not specifically shown, it will be appreciated that a unique ID may also be stored for each of the users in the registry shown in field 431. As previously indicated, the unique ID need not be known by the user and is maintained more securely.

The name field 433 may be the name of the recipient as it appears on the account associated with the other user (e.g., as specified by the other user). The nickname field 435 may be a nickname assigned to the other user (e.g., as specified by the user). The e-mail/mobile field 437 may display the public tokens that are being used by the recipient. The status field 437 may display whether a permanent connection has been established for a particular contact. Actions field 441 may be determined based on the status field. For example, if a link has been established, then the actions field 441 may display a link that allows a user to send money to the recipient. If a link has not been established, then the actions field may display a send money link, but the actions field 441 may also display a view details link. The view details link may display another screen to the user where the user may provide further details to establish a connection with a recipient. Other actions that may be displayed are edit and remove. Edit may allow the user to edit each field discussed above and remove may allow a user to remove a recipient and related information from the user's registry. A link 443 may be used to add additional users to the registry, e.g., via a search of information directories 128, 158 and/or 168.

In an example implementation, the manage connections field 431 may present a message to the user that informs the user when another user is no longer the owner of a token. The message may include a link that allows the user to update the token information. In other implementations, if the other user's information has changed, then the message presented by the manage connections field 431 may allow the user to update the outdated information.

FIG. 5 is a screen shot of a form that allows a user to update default or custom notification settings. In FIG. 5, the user is provided with a list of e-mail addresses associated with the user's account. The user may use a checkbox to indicate which e-mail address should receive a notification. For example, the user in the screen shot shown in FIG. 5 has chosen email address "psmith@google.com" by placing a check mark 505 in the appropriate field. In other implementations, a user may choose multiple e-mail addresses instead of choosing a single e-mail address. Also shown on the screen shot are telephone numbers associated with the user accounts. The user may use a check mark 509 to select a phone number that receives a notification. In other implementations, the user may choose multiple telephone numbers and multiple e-mail addresses for notification. A link 511 may allow the user to add e-mail addresses or telephone numbers to the account information maintained by the bank. In one implementation, the user may select the link and the user may be automatically taken to a web portal provided by a banking institution. The user may click on save button 513 to save the notification changes implemented by the user.

FIG. 6 shows a screen shot of a web page 600 that may be presented to a user when the user selects the send money tab. The web page 600 may include a send money field 601 that the user may fill out to send money to a chosen recipient. The web page 600 may include a display of various payment channels 619 that are available to the user. The web page 600 may also include a field 630 showing details regarding recent transactions that are pending, returned or completed.

The send money form 601 may prompt the user to choose a recipient from a pull down menu 603. The list of recipients presented using menu 603 may be populated using the list of recipients contained in field 431 discussed in FIG. 4. The list of recipients menu 603 may contain the names of users that the user has sent funds to or received funds from in the past or that have been added in another manner. In one implementation, the recipients may be identified by the nicknames assigned to each recipient. Since the nicknames may be directly correlated with the unique ID within the token management logic 129, the account information may be derived from the nicknames via the unique ID. Hence, as previously indicated, the connection between the two users is not disrupted when a cell phone number or e-mail address becomes obsolete. After choosing the recipient, the user may choose an account from which funds may be sent to the recipient using a drop down menu 605. The drop down menu may be pre-populated with a list of all accounts that are held by the user. The user may enter a dollar amount that the user would like to transfer to the recipient in the amount field 607. The user's name may be presented with an optional field description 609 that may allow the user to ascertain that the payment was for a particular product or service provided by the recipient. Another field may be auto-populated with the user's name as the sender of the funds. A nickname field 611 is also displayed if the recipient knows the user by a name that is different than the user's name as it appears on the user's account. The send money form 601 also displays links that allow the user to add recipients 615, manage recipients 617 and edit the current notification preferences 613.

The payment channels form 619 presented to the user may allow the user to choose various payment channels such as, credit card, ACH or PayPal®. Also displayed with each payment channel may be the funds available to recipient field 623. For example, the credit card method may make the funds available to the recipient within 2-days of processing the send request. However, the user may be charged a fee as indicated by field 625, for example, $5.00. In other examples, a user may choose ACH in field 621, however the funds may be available to the recipient in 4 days with no fee. Other payment channels, such as PayPal®, Star, Blink, Interlink, and Plus may also be presented to the user.

Field 630 shows a few of the most recent transactions that the user has performed. Additional recent transactions may be displayed via selection of a link to view more transfers and/or by selecting the transfer activity tab. Field 630 may display various fields that include information regarding the transactions. For example, such fields may include a date sent field 633, from account field 635, recipient field 637, amount field 639, description field 641, status field 643 and actions field 645. The date sent field 633 lists the date when the user initiated the send request. The from account field 635 may display the type of account (i.e. checking, savings, or money market) and a partial account number. The recipient field 637 may display the full name of the recipient. The amount field 639 displays the dollar amount sent to the recipient. The description field 641 displays the description that was entered by the user while processing the request. The status field 643 may inform the user whether the fund transfer is pending, returned or not processed, or has been completed. The actions field 645 may display a link that allows a user to view more details regarding the current status of the fund transfer.

Out-Of-Network Payments

In an alternative implementation to FIGS. 3A and 3B, a sender may be able to send funds to a recipient who is not a registered user of any member of any payment network— either the funds transfer payment network or other existing payment networks. For example, a user at a participating bank (i.e., sending bank) through the sending bank's online interface, enters a token (e.g., cell phone number or email address) for a desired recipient and a dollar amount desired to be sent to the recipient. The dollar amount and the token are then sent to the funds transfer payment network for matching services. Because the recipient is either out of the funds transfer payment network or not part of any known payment network, or both, the funds transfer payment network fails to match the token in the payment network's directory. In response, the funds transfer payment network sends a message to the sending bank indicating that the token is unknown. The funds transfer payment network also creates a pending payment, which may include some or all of the following fields: unknown token, sending bank, dollar amount, user name, and recipient name.

The sending bank then sends a message to the recipient using the token. For example, the sending bank may send a message to the recipient that the sender wants to send the recipient money. Alternatively, the funds transfer payment network sends the message to the recipient. If the recipient is not a registered user of any member of any payment network, the recipient is directed to a link to the website of the funds transfer payment network to begin the process of registering to receive the pending payment. If the token entered by the sender is the recipient's email address, the recipient receives the link at his or her email address. If the token entered by the sender is the recipient's cell phone number, the recipient receives the link at his or her cell phone number.

FIG. 7 shows a screen shot of an example web page 700 that may be presented to a recipient upon accepting an invitation in a link. As indicated in FIG. 7, the recipient is prompted to enter the token where the recipient was notified about the pending payment. The user enters the token in the field in web page 700. The funds transfer payment network matches the entered token to a pending payment. In one implementation, the recipient can only proceed if the entered token matches an unknown token for a pending payment.

In one implementation, a recipient who is not registered with any member of the funds transfer payment network can only join the funds transfer payment network and receive funds if a registered sender invites that non-registered recipient. The information and account ownership of the recipient may be validated and collected before the recipient can even join the funds transfer payment network. Thus, it should be appreciated that the funds transfer payment network may verify that a payment is pending before a non-registered out-of-network recipient can join the funds transfer payment network. Herein, "out-of-network" refers to users of financial institutions that are not members of the funds transfer payment network. Alternatively, "out-of-network" may also refer to financial institutions that are not members of the funds transfer payment network. An in-network user must send an out-of-network user a payment before the out-of-network user can join the funds transfer payment network. This may prevent fraud by ensuring that all users or entities involved in a transaction can be verified. Additionally, because out-of-network users must be invited to the funds transfer payment network by in-network users, fraud and fraudulent transactions are further reduced or eliminated.

Once the recipient is registered with the funds transfer payment network, the funds transfer payment network may send the recipient's bank account information to the sending bank to complete the initiation transaction. The transaction may be completed via ACH, for example. As is known in the art, ACH transactions may be a "pull" transaction or a "push" transaction. When an in-network user sends money to an out-of-network user, the sending bank may use a push transaction.

Figure 8:
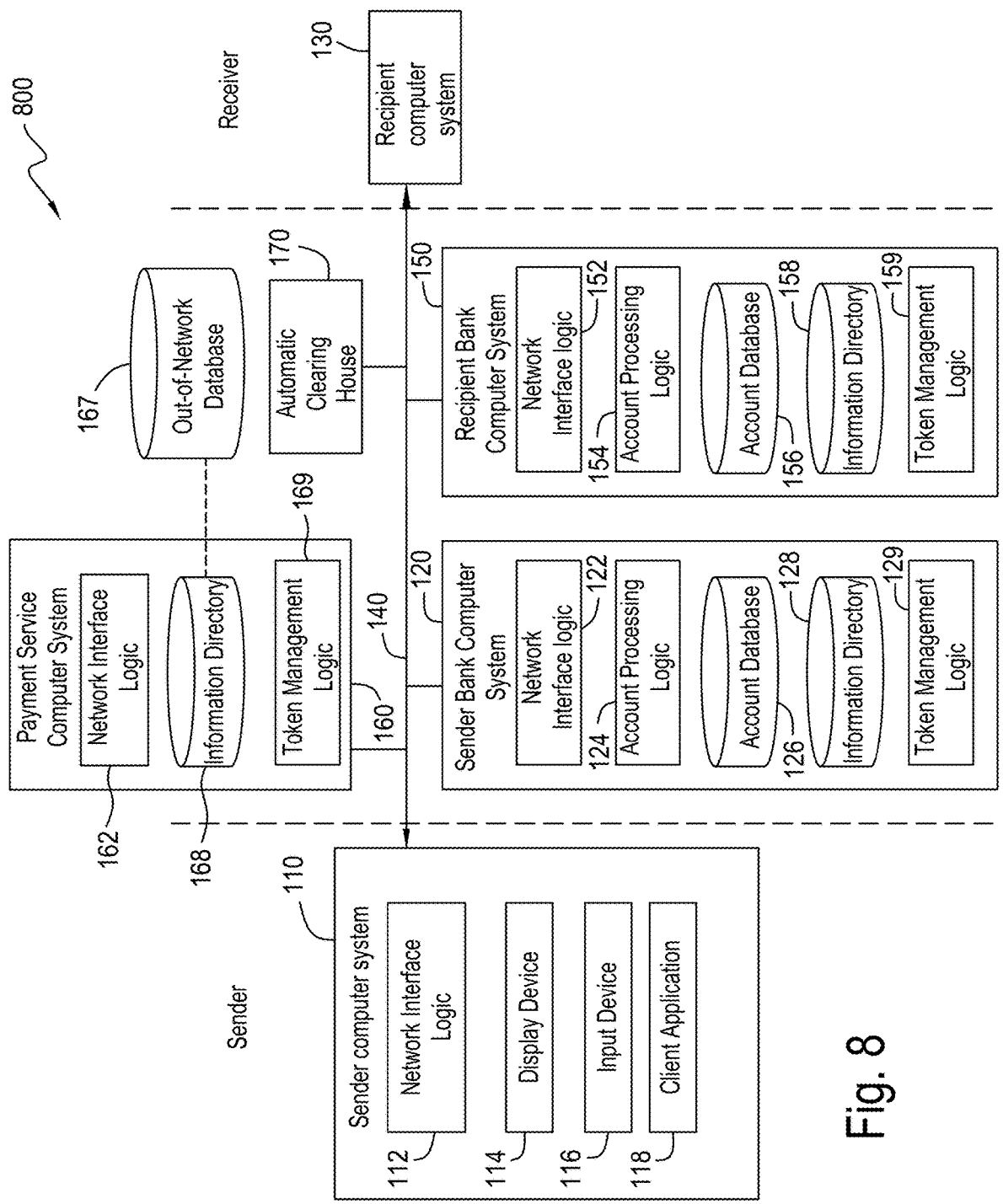
FIG. 8 depicts a schematic diagram of a funds transfer system in which a sender and a recipient use different banking institutions according to an example implementation.

Once the recipient is a registered user of the funds transfer payment network, the funds transfer payment network and funds transfer system 100 may maintain information about the recipient in an out-of-network database. FIG. 8 illustrates an example funds transfer system 800. Funds transfer system 800 is similar to funds transfer system 100, except that the payment service computer system includes an out-of-network database 167. The out-of-network database 167 may store information collected during a financial transaction involving out-of-network users. For example, the funds transfer payment network may perform a funds transfer to an out-of-network user and may store bank information about the out-of-network recipient in the out-of-network database 167. In one implementation, the funds transfer system 800 may store token and bank account information for out-of-network users in the out-of-network database 167.

In an alternative implementation, the funds transfer system 800 stores bank account information for out-of-network users in the out-of-network database 167, but does not store token information for out-of-network users in the out-of-network database 167. Instead, the funds transfer payment network associates the recipient with a private identifier as described above. The private identifier may be stored in information directory 168. Alternatively, the private identifier may be stored in information directory 128, or information directory 158. Thus, the user's token information is stored in a separate directory, e.g., information directory 168, from the out-of-network database 167, and a user's bank account information is stored in the out-of-network database 167. It should be appreciated that this alternative implementation increases user security by not storing a user's token and a user's bank information in the same database. It should also be appreciated that no publicly available information is stored with a user's bank information, thereby reducing the risk of fraud or theft. Thus, the funds transfer payment network can securely process payments and transactions for out-of-network recipients by using a private identifier to match a recipient's token to the recipient's bank information.

In one implementation, information directory 168 does not store bank account information. Although the out-of-network database 167 is shown outside of payment service computer system 160 in FIG. 8, in one implementation, the out-of-network database 167 may reside inside payment service computer system 160.

Figure 9:
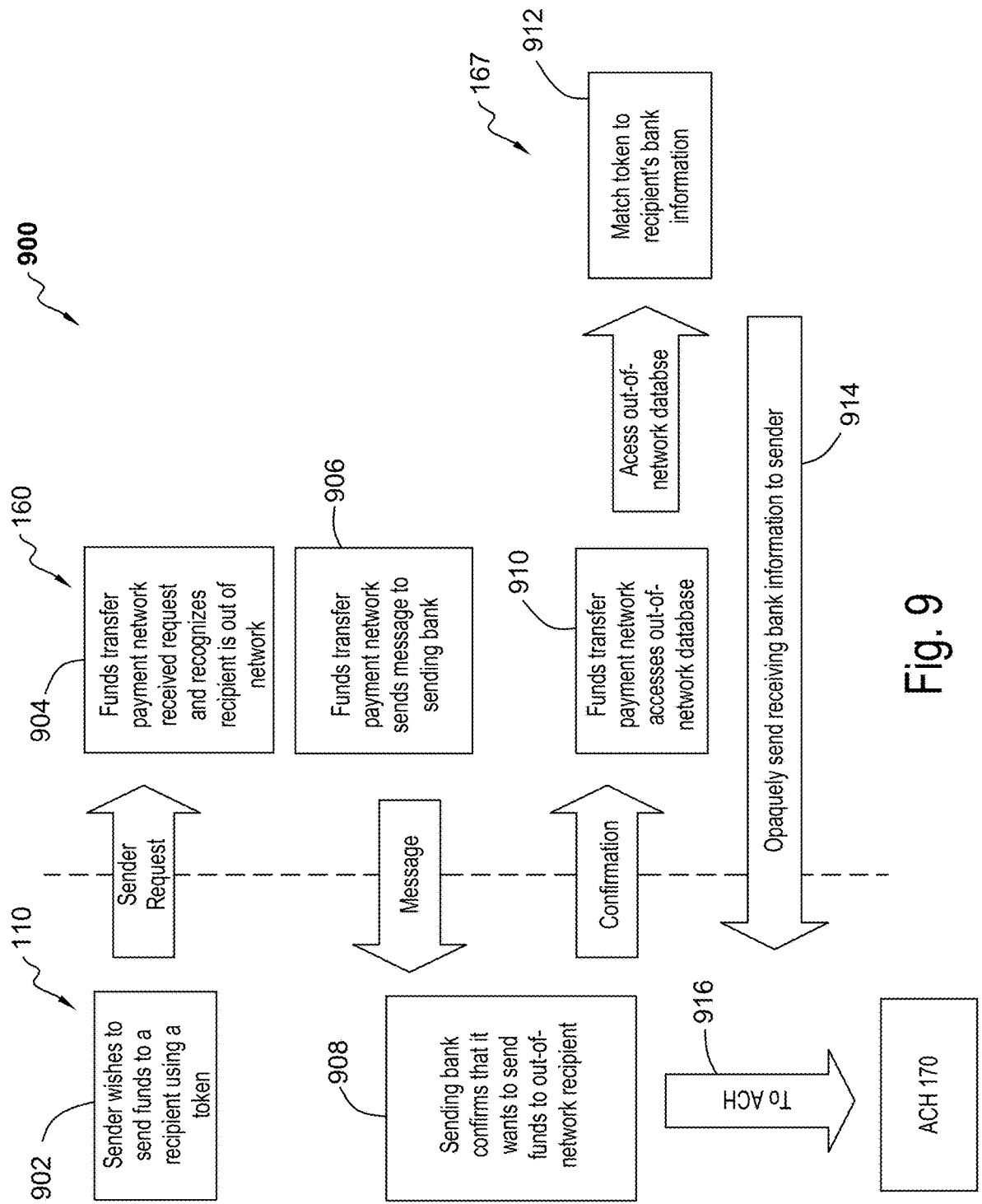
FIG. 9 depicts a flow diagram illustrating an example process for facilitating transfer of funds to an out-of-network recipient according to an example implementation.

In future transactions involving the recipient, the funds transfer payment network utilizes the out-of-network database 167 to facilitate the transfer funds of funds from a member. FIG. 9 is a flow diagram illustrating an example process 900 for facilitating payment or transfer of funds to an out-of-network recipient, according to an example implementation of the present invention. Although the process 900 is described with reference to the flow diagram illustrated in FIG. 9, it will be appreciated that many other methods of performing the acts associated with the process 900 may be used. For example, the order of many of the blocks may be changed, certain blocks may be combined with other blocks, and many of the blocks described are optional.

To pay funds to an out-of-network recipient whose information is already stored in out-of-network database 167, data may flow between a sender computer system 110, a funds transfer payment network that uses or implements payment service computer system 160, including out-of-network database 167, and recipient computer system 130. A sender may wish to send funds to a recipient using a token, as shown in block 902. The sending bank sends the token and dollar amount to the funds transfer payment network. The funds transfer payment network notes that the token is for an out-of-network recipient, as shown in block 904, and sends a message to the sending bank indicating the recipient is an out-of-network recipient, as shown in block 906. The sending bank may send a confirmation to the funds transfer payment network to continue the transaction, as shown in block 908. Upon receiving confirmation, the funds transfer payment network accesses the separate out-of-network database 167, as shown in block 910. The funds transfer payment network matches the token to the recipient's bank information stored in out-of-network database 167, as shown in block 912. The funds transfer payment network encrypts the receiving bank account information and opaquely sends the recipient's bank account information to the sending back, as shown in block 914. The sending bank decrypts and sends the recipient's bank account information and any other information required to complete the transaction to ACH 170.

The funds transfer system 100 also allows communications to non-customers of a financial institution. For example, once a bank is a member of the funds transfer payment network, that bank may be able to send messages to users who are not customers of that bank. Thus, the funds transfer payment network can behave as a communications intermediary. For example, when a new user is prompted to sign up to register with a member entity, that user may be presented a screen that expressly gains approval to send that user messages. In other words, the user must agree in one implementation to receive messages from members as a condition of joining the funds transfer payment network and the funds transfer system 100. Therefore, once a user is signed up, that user can be contacted by other members.

In one implementation, financial institutions who are members of the funds transfer payment network are able to send, receive and request funds on behalf of their customers to non-customers. Thus, it should be appreciated that a financial institution that is a member of the funds transfer payment network can help its customers do business with other entities who are not customers of that financial institution.

In one implementation, the funds transfer system 100 may track the status of payments and provide notifications to a sender and recipient as to the status of payments.

In one implementation, information is encrypted by a sender bank and decrypted by a receiver bank so that the payment network does not have access to any of the sender or receiver information. For example, the sender bank may use an encryption algorithm that is known by the receiver bank but is not known by a funds transfer payment network. In this case, the sending bank encrypts the account information before any information is given to the payment network. The payment network processes the information, including transferring encrypted sender and receiver information to the receiving bank. The receiving bank knows how to decrypt the encrypted information. In this manner the payment network cannot access any information being communicated by one bank to another bank. The entire transfer of funds is thus opaque to the funds transfer payment network.

In one implementation, the funds transfer system 100 relies on the banks' existing fraud systems to manage risks. In one implementation, the payment system does not actually move any money from one entity to another or one bank to another. There is no account owned by the payment service that can even hold money, even for a temporary period of time. The payment system in one implementation only facilitates the transfer of money from one bank to another bank.

In one implementation, the funds transfer system 100 or funds transfer payment network may send a payment from an out-of-network user to an in-network user. The funds transfer payment network may create a separate out-ofnetwork database for storing information about the out-of-network sender or utilize an existing database.

In one implementation, a user of a member bank may be able to present a bill or invoice using the funds transfer system 100. The bill may be presented to a consumer of a product or service provided by the user of the member bank. The consumer may be an in-network user or an out-of-network user. A bill presentment may include an electronic file, e.g., an Adobe PDF® document, a Microsoft Word® document, a text file, an image file or any other suitable document that displays a bill to the consumer. The electronic file, e.g., an Adobe PDF® document, may include terms for payment provided by the biller. In one implementation, the funds transfer system 100 may present other items besides bills, such as mortgage documents, business documents, subpoenas, or patent filings or applications, for example.

The funds transfer system 100 may also be used to securely present documents where the bank verifies the identity of the consumer receiving the documents. The sender can also use the bank to verify receipt of the documents. In one implementation, the biller can track whether the consumer has received the bill. For example, the biller may receive a notification from the funds transfer system 100 that the consumer received the bill. The sender may also be able to confirm that the consumer viewed the bill, e.g., opened or accessed the electronic file on a computer or mobile phone. It should be appreciated that receipt verification or tracking is useful because the biller can confirm, and the consumer cannot deny, that the consumer received the bill.

For an in-network bill presentment, the biller sends a request for money, or a bill or invoice, to the funds transfer payment network. The request or the bill includes a token identifying the recipient of the bill, or the consumer. The biller appends a request ID to the payment ID and sends the bill to the funds transfer payment network. The biller may also be able to add payment instructions to the bill. The funds transfer payment network routes the bill or invoice to the consumer based upon the token. The consumer responds by paying. The funds transfer payment network then notifies the biller of payment. A payment ID is sent to the bank and is then matched to the account. It should be appreciated that the biller or the biller's bank does not need to have the routing and account number of the consumer, thereby increasing security and convenience for the consumer and the biller.

For out-of-network consumers, instead of sending a payment ID with a request ID, the funds transfer payment network provides instructions to the billing bank to debit an account. The funds transfer payment network also provides the consumer's ACH information plus the payment ID, plus the request ID to the biller's bank to debit.

In one implementation, an out-of-network user may be able to send payments to a member bank customer even if the member bank customer did not send a payment request to the out-of-network user. Thus, registered out-of-network users, i.e., users who appear in the out-of-network database 167, can send money to a customer of a member bank. The member bank customers can receive money using that member bank customer's channel of choice. It should be appreciated that the member bank customer does not have to provide perceived confidential information, such as bank account numbers, to out-of-network users from whom they want to receive money. The funds transfer system 100 may be used for debit accounts, electronic funds transfers, credit card transactions, Amazon® payments, payments that are facilitated simply via electronic mail, business to business or merchant payments, expedited payments and scheduled payments, such as for rent, a housekeeper, or a weekly babysitter. In one implementation, the funds transfer payment network verifies account access via trial deposits. The sender gives amounts of transactions and the funds transfer system 100 verifies that the out-of-network sender has access to an account and has authorized the debit transaction.

In one implementation, the out-of-network users sending money may be subject to send limits. The send limit amounts may be for per day, per rolling seven-day or per rolling 30-day time periods. The send limits may be enforced for each out-of-network user regardless of the destination of the payments. If an out-of-network user attempts to send a payment exceeding a send limit, the funds transfer system 100 may inform the out-of-network user that the payment exceeds the send limit. In one implementation, the funds transfer payment network can impose transaction fees when an out-of-network user sends money to a customer of a member bank.

The decision to accept and execute a money transfer from an out-of-network consumer who wishes to send money may be managed by the member bank, i.e., the bank of the in-network user receiving the money. As described above with respect to the out-of-network database 167, out-of-network users must enroll for the out-of-network service before being able to send money to a member bank customer. Thus, it should be appreciated that an out-of-network user who is registered may be able to both initiate a payment to a registered customer of a member bank and respond to a request for money (e.g., a bill) from a customer of a member bank.

The debit transactions from an out-of-network user's bank account may be originated via ACH rails by the member banks. In one implementation, the member bank requires at least one of the following to process a transaction via ACH rails: sender name, transaction amount, transaction fee, recipient profile ID, recipient name as provided by the sender, payment memo, initiation date, bank account number, routing number, and an account type, e.g., checking or savings. When an out-of-network user sends money to an in-network user, the sending bank may use a pull transaction.

For security purposes, in one implementation, out-of-network users may not be allowed to initiate requests for payments and may also not be allowed to send payments to other out-of-network users. It should be appreciated that these features prevent fraud and also encourage financial institutions to join the funds transfer payment network.

Figure 10:
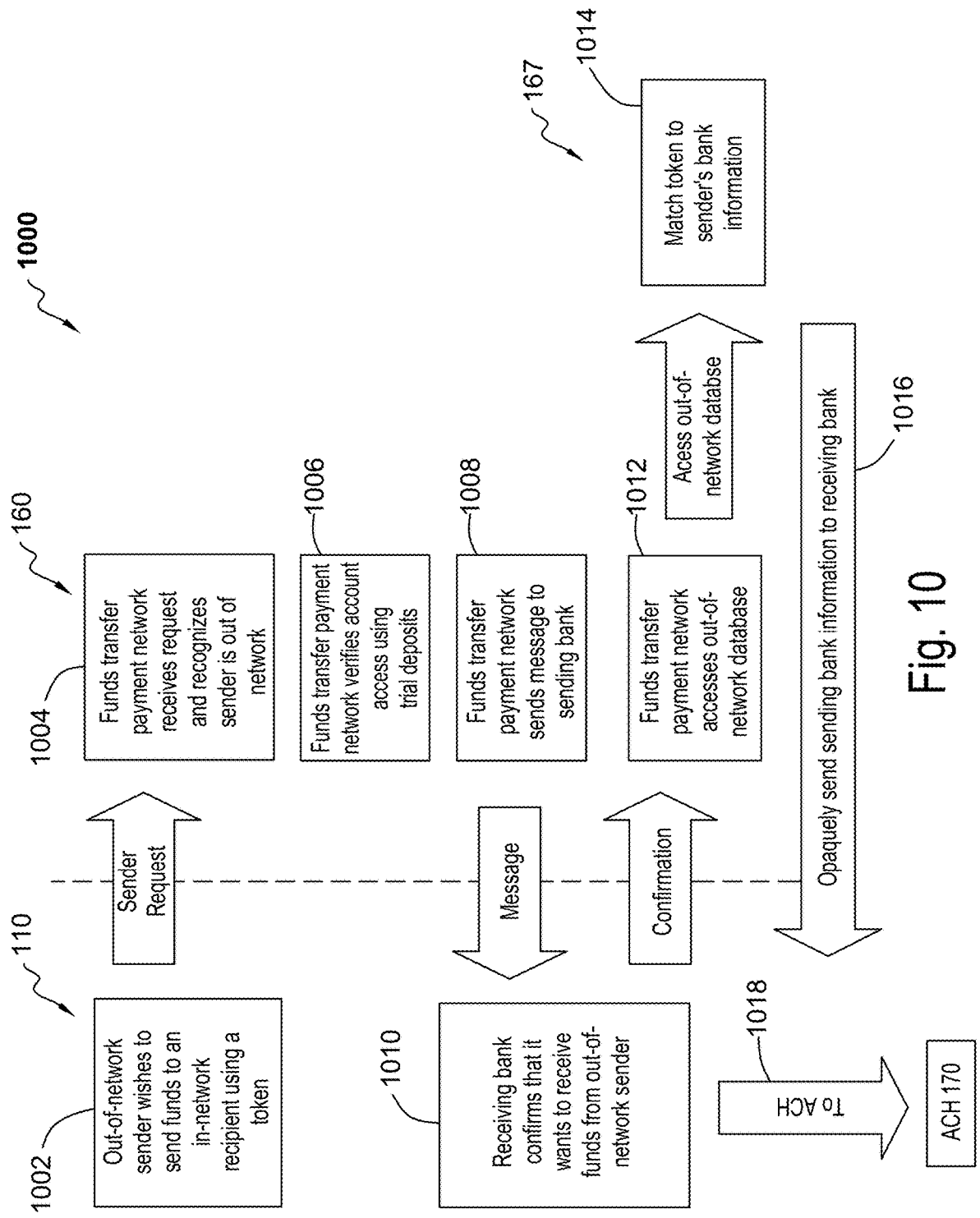
FIG. 10 depicts a flow diagram illustrating an example process for facilitating transfer of funds from an out-of-network sender to an in-network recipient according to an example implementation.

FIG. 10 is a flow diagram illustrating an example process 1000 for facilitating payment or transfer of funds from an out-of-network sender to an in-network recipient, according to an example implementation of the present invention. Although the process 1000 is described with reference to the flow diagram illustrated in FIG. 10, it will be appreciated that many other methods of performing the acts associated with the process 1000 may be used. For example, the order of many of the blocks may be changed, certain blocks may be combined with other blocks, and many of the blocks described are optional.

To send funds from an out-of-network sender whose information is already stored in out-of-network database 167 to an in-network recipient, data may flow between a sender computer system 110, a funds transfer payment network that uses or implements payment service computer system 160, including out-of-network database 167, and recipient computer system 130. A sender may wish to send funds to a recipient using a token, as shown in block 1002. The sending bank sends the token and dollar amount to the funds transfer payment network. The funds transfer payment network notes that the request is from an out-of-network sender as shown in block 1004. The funds transfer payment network may verify account access using trial deposits, as shown in block 1006. The funds transfer payment network sends a message to the receiving bank indicating the sender is an out-of-network sender, as shown in block 1008. The receiving bank may send a confirmation to the funds transfer payment network to continue the transaction, as shown in block 1010. Upon receiving confirmation, the funds transfer payment network accesses the separate out-of-network database 167, as shown in block 1012. The funds transfer payment network matches the sender to the sender's bank information stored in out-of-network database 167, as shown in block 1014. The funds transfer payment network encrypts the sending bank account information and opaquely sends the sending bank's account information to the receiving back, as shown in block 1016. The receiving bank decrypts and sends the sender's account information and any other information required to complete the transaction to ACH 170.

Expedited Payments

In one implementation, a sender may be able to make a "real time" or expedited payment of funds to a recipient. It should be appreciated that a payment may be considered to be "real time" if the paid funds are made available to the recipient much quicker than payments are typically made available. For example, a payment may be considered to be near real time if the funds are deposited in the recipient's account within a few minutes. In one implementation, a payment may be considered to be real time if funds from a sender to a recipient are deposited in the recipient's account in the amount of time required to send a message from the sender's bank to the recipient's bank. Messages may be sent between the sending bank, the funds transfer payment network and the recipient bank via a messaging service, such as, IBM® WebSphere MQ.

Some systems attempt to provide real time payments, however they require leveraging debit card systems, which can be inconvenient. Other systems utilize the ACH system, which may take several days to process and does not provide the speed of the real time or expedited payments presently disclosed. Other systems require that the sender create an account with some alternative payment provider. Yet other systems require having a direct connection to a financial institution's core processing platform.

Still other systems allow making quick payments from the sender's credit card. The funds transfer payment network allows sending funds in real time from the sender's financial institution, such as the sender's primary financial institution, to the recipient. It should be appreciated that sending funds from the sender's primary financial institution may allow the sender to centralize his or her financial transactions and more easily and conveniently manage his or her money. A sender could use any number of financial institutions, and could send/receive money from any of them as long as each financial institution is a member of the funds transfer payment network and the sender uses a different token (e.g., email address, phone) at each financial institution.

Other systems allow quick payments when the sending bank is the same as the recipient bank. The funds transfer payment network enables real time payments from a sender to a recipient even when the sender and recipient use different banks. The funds transfer payment network can work with any core financial institution's system through a system of APIs, and does not require a direct connection to a financial institution's core processing platform. The funds transfer payment network could alternatively work with non-bank financial institutions such as, for example, brokerage houses or investment companies.

In one implementation, the sending and recipient banks are both in-network banks. The sending bank and the receiving bank may be required to agree to offer real time payments to each other before a real time payment can be made. For example, the funds transfer payment network may provide a real time payment service to the sending bank and the recipient bank, in which the banks agree to facilitate real time payments to each other. The funds transfer payment network may additionally or alternatively require that before becoming a member bank, a bank must agree to send and receive real time payments from other member banks. Individual users may also sign up with their respective financial institutions to be able to send and/or receive expedited payments for a service fee.

Figure 11:
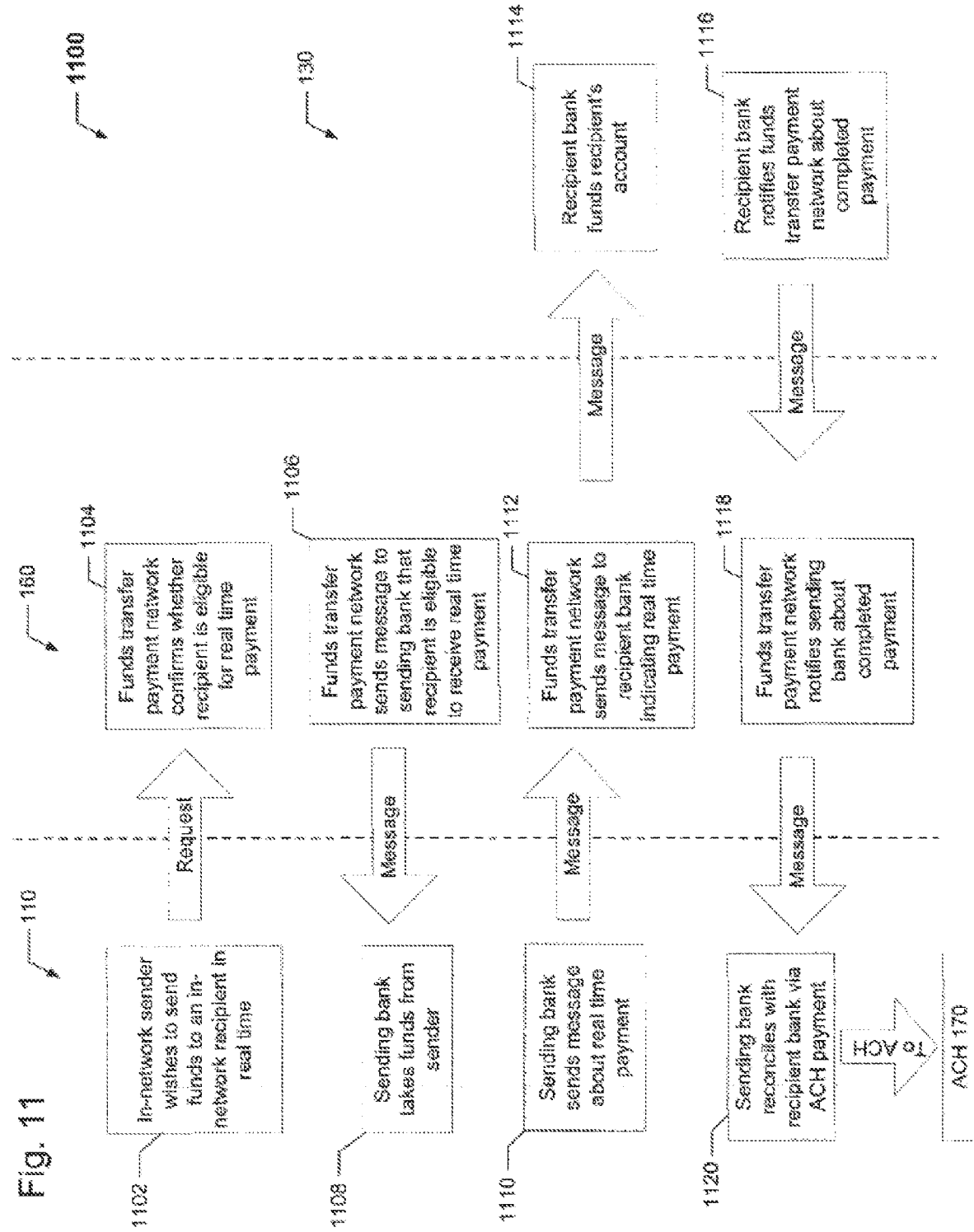
FIG. 11 depicts a flow diagram illustrating an example process for facilitating expedited transfer of funds from an in-network sender to an in-network recipient according to an example implementation.

FIG. 11 is a flow diagram illustrating an example process 1100 for facilitating payment or transfer of funds in real time from an in-network sender to an in-network recipient, according to an example implementation of the present invention. Although the process 1100 is described with reference to the flow diagram illustrated in FIG. 11, it will be appreciated that many other methods of performing the acts associated with the process 1100 may be used. For example, the order of many of the blocks may be changed, certain blocks may be combined with other blocks, and many of the blocks described are optional.

To pay funds in real time from an in-network sender to an in-network recipient, data may flow between a sender computer system 110, a funds transfer payment network that uses or implements payment service computer system 160, and recipient computer system 130. A sender may wish to send funds in real time to a recipient, as shown in block 1102. In one implementation, the recipient must be eligible to receive a real time payment, such as, for example, by signing up with a service with the recipient's financial institution. The sending bank may query the funds transfer payment network as to whether the recipient is eligible to receive real time payments. The funds transfer payment network checks whether the recipient is eligible to receive real time payments, as shown in block 1104, and if so, sends a confirmation message to the sending financial institution, as shown in block 1106. Upon receiving confirmation that the recipient is eligible, the sending bank removes the funds from the sender's account, as shown in block 1108. Thus, at this stage in the process 1100, the funds have been removed from the sender's bank account.

The sending bank then sends an expedited payment message to the funds transfer payment network, as shown in block 1110. The funds transfer payment network in turn sends an expedited payment message to the recipient bank indicating a real time payment, as shown in block 1112. The recipient bank then funds the recipient's account, as shown in block 1114. It should be appreciated that at this stage in the process 1100, the funds have been deposited into the recipient's bank account. It should also be appreciated that at this stage in the process 1100, the recipient bank has funded the recipient's bank account from its own funds, but the sending bank has not yet funded the money to the recipient bank.

The reconciliation or settlement between the sending bank and the recipient bank may occur at some time after the recipient's account has been funded. The settlement or reconciliation between the sending and recipient banks may not occur for several hours or even days after a payment is made to a recipient. The amount of time between the funds being deposited in the recipient's account and the reconciliation between the sending and recipient banks may be referred to as a reconciliation delay. It should be appreciated that the funds transfer payment network substantially avoids the recipient having to wait for the reconciliation delay before receiving the funds. In some cases, the funds transfer payment network may provide a maximum number of time, e.g., two hours, for the money to become available to the recipient. It should be appreciated that the money could become available to the recipient in substantially the amount of time required to send an electronic message to the recipient bank.

Referring back to FIG. 1100, after the recipient's account has been funded, the recipient bank notifies the funds transfer payment network that the recipient's account has been funded, as shown in block 1116. The funds transfer payment network then notifies the sending bank that the recipient's account has been funded, as shown in block 1118. The sending bank may send payment confirmation message to the sender indicating that the recipient's account has been funded. The sending bank then settles the funds with the recipient bank via, for example, an ACH payment, as shown in block 1120.

In one implementation, to make the payment even quicker, the sending bank may not withdraw funds from the sender's account until after the recipient's account has been funded. The sending bank may however restrict a sender from choosing to send more money than available in the sender's account. This way, the sending back is assured that the sender's account has enough funds to pay back the sending bank.

In one implementation, instead of the receiving bank immediately funding the recipient's account, the recipient must accept the payment before the funds are transferred to the recipient's account. Upon the recipient accepting the payment, the receiving bank transfers the requisite amount to the recipient's account.

In one implementation, the funds transfer payment network may require an unregistered recipient to register at an in-network financial institution before being able to receive the funds in an expedited manner.

The implementations of the present invention have been described with reference to drawings. The drawings illustrate certain details of specific implementations that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The implementations of the present invention may be implemented using an existing computer processor, or by a special purpose computer processor incorporated for this or another purpose or by a hardwired system.

As noted above, implementations within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other non-transitory medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations of the present invention have been described in the general context of method steps which may be implemented in one implementation by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, implementations of the present invention may be practiced in a networked environment using logical connections to one or more remote computers having processors. Those skilled in the art will appreciate that such network computing environments may encompass many types of computers, including personal computers, hand held devices, multi processor systems, microprocessor-based or programmable consumer electronics, network PCs, minicomputers, mainframe computers, and so on. Implementations of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. The foregoing description of implementations of the invention has been presented for purposes of illustration and description. It is not intended to be exhaustive or to limit the invention to the precise form disclosed, and modifications and variations are possible in light of the above teachings or may be acquired from practice of the invention. The implementations were chosen and described in order to explain the principals of the invention and its practical application to enable one skilled in the art to utilize the invention in various implementations and with various modifications as are suited to the particular use contemplated. Other substitutions, modifications, changes and omissions may be made in the design, operating conditions and arrangement of the implementations without departing from the scope of the present invention as expressed in the appended claims.

Secure Transfer of Funds Through Non-Financial Institutions

In various implementations, senders and/or recipients may have access to an online payment processes or a physical payment terminal maintained by a non-financial institution (e.g., service provider). A "sender" of funds, as used herein, may comprise an entity (individual, company, corporation, etc.) that provides instructions to transfer an amount of funds from the sender's financial institution to a recipient. A "recipient" of funds, as used herein, may refer to the intended recipient of the funds from the sender (e.g., the recipient of funds may receive funds at a recipient account at the recipient's financial institution). A "participant of a funds transfer," as used herein, may refer to either sender of funds or a recipient of funds.

A "financial institution" or FI is an entity that primarily deals with financial transactions such as investments, loans, and/or deposits. Example financial institutions include organizations such as commercial banks, investment banks, insurance companies, brokerages, investment companies, money transmitting entities, trust companies, savings and loans entities, credit unions, shadow banks, or the like.

A "non-financial institution," or "non-FI" as used herein, may refer to an entity that does not provide financial services as part of its primary functions. A non-financial institution may comprise a business entity that facilitates sale or exchange of goods and services. Examples of such business entities include service entities and retail entities (e.g., brick-and-mortar retail stores and online retailers). In some implementations, non-financial institutions comprise social networking entities that provide social networking services to users and/or other individuals. Examples of such social networking entities include Facebook®, LinkedIn®, social networks provided by Alphabet®, Inc., and Snapchat®.

Non-financial institutions may support online payment system. An "online payment system," as used herein, may refer to a website or networked application as well as a server system that enables goods/services to be browsed, reviewed, and/or paid for by an individual (e.g., a sender or recipient) using the individual's digital device. For example, the non-financial institution may provide a physical device and/or online service for payment of services rendered or payment of past bills to the non-financial institution. In another example, an online retailer (e.g., the GAP) may provide a payment processing server in communication over a public network such as the Internet. An individual may interact with the payment processing server through a webpage (accessible by a browser on any number of digital devices) or an application such as an application on a smartphone.

In various implementations, non-financial institutions may include physical payment terminals that accept funds from individuals for payment of goods and/or services. The physical payment terminals at non-financial institutions may also allow individuals to obtain funds (e.g., physical currency, digital currency, or the like).

Financial institutions may act as financial intermediaries between senders and recipients and may facilitate transfer of funds. Financial institutions may be regulated by government(s) and/or other regulatory bodies. A "sender financial institution" may refer to a financial institution that provides financial services to an entity that attempts to transfer funds to another. For example, a sender financial institution may be the sender's bank. The sender's bank may include any number of bank accounts associated with the sender. Each account of the sender may include one or more sender account numbers (e.g., an account number that identifies account of the sender). The sender financial institution may provide access to funds (physical currencies, digital currencies, line(s) of credit, etc.) that the sender may use to transfer funds to a recipient.

A "recipient financial institution" may refer to a financial institution that provides financial services to an entity that receives funds from another. For example, a recipient financial institution may be the recipient's bank. The recipient's bank may include any number of bank accounts associated with the recipient. Each account of the recipient may include one or more recipient account numbers (e.g., an account number that identifies account of the recipient). The recipient financial institution may provide access to funds (physical currencies, digital currencies, line(s) of credit, etc.) that the recipient may use to receive funds from a sender.

Figure 12:
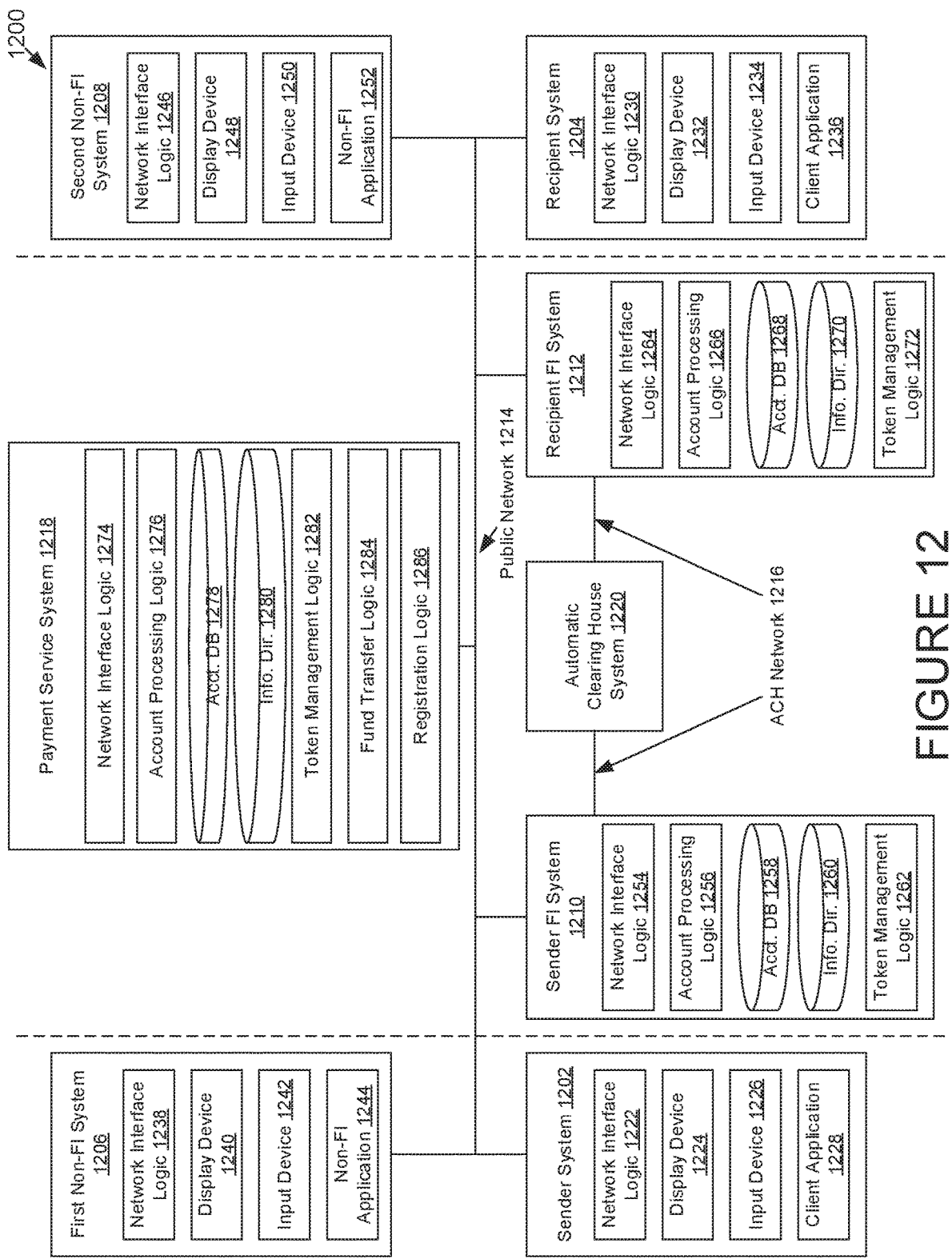
FIG. 12 depicts a diagram of a funds transfer system for securely transferring funds from a sender non-financial institution system to a recipient non-financial institution system, according to some implementations.

FIG. 12 depicts a diagram of a funds transfer system 1200 for securely transferring funds from a sender non-financial institution system to a recipient non-financial institution system, according to some implementations. The funds transfer system 1200 may include a sender system 1202, a recipient system 1204, a first non-FI system 1206, a second non-FI system 1208, a sender FI system 1210, a recipient FI system 1212, a payment service system 1218, an automatic clearing house (ACH) system 1220, a public network 1214 and an ACH network (e.g., private network) 1216.

The sender system 1202 may include one or more digital devices associated with a sender (e.g., a user). As an example, the sender may be a person who transfers funds to a third-party recipient using a website of a non-financial institution or a physical payment terminal of the non-financial institution (e.g. using a credit card, debit card, or smart device with a terminal provided by the non-financial institution). As an example, the sender may be a person who has access to a networked application or web page that is managed by a retailer (e.g., the first non-FI system 1206). A transfer of funds by the sender may be backed by a sender financial institution, discussed further herein. As an example, the sender may maintain a sender account at a sender financial institution that provides access to funds that the sender wishes to transfer to a recipient.

Figure 19:
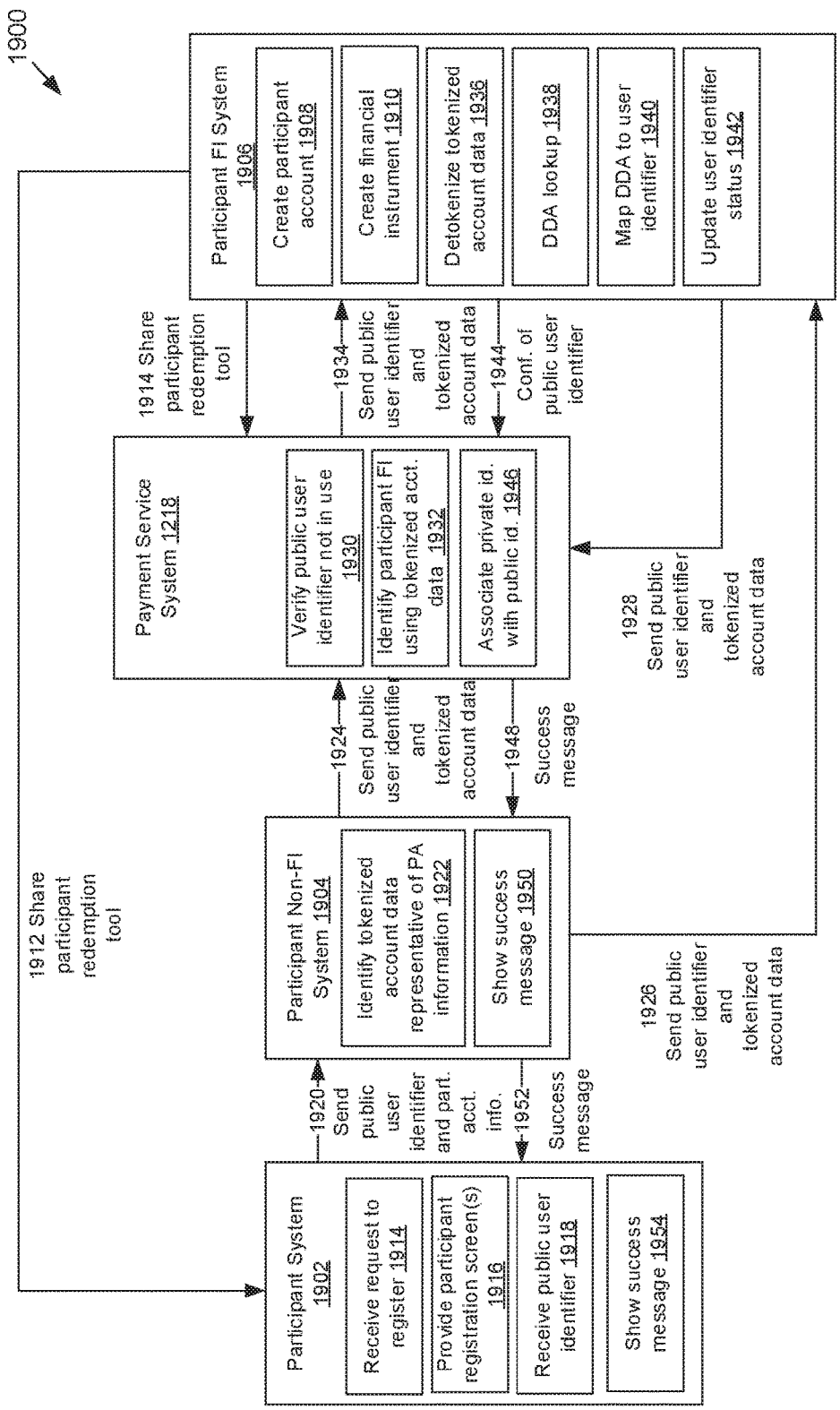
FIG. 19 depicts a diagram of a data flow for registering a participant in a funds transfer system, according to some implementations.

The sender system 1202 may have some or all of the components of a digital device, an example of which is shown in FIG. 19 and discussed further herein. For example, the sender system 1202 may be computer (e.g., desktop or laptop computer), a cellular telephone, a smart phone, a mobile handheld wireless e-mail device, a personal digital assistant, a portable gaming device, or other suitable digital device. The sender system 1202 may also include one or more processors configured to execute instructions stored in memory.

The sender system 1202 may include network interface logic 1222, a display device 1224, an input device 1226, and a client application 1228. The network interface logic 1222 may include program logic that enables a connection between the sender system 1202 with the public network 1214 (or any network). The display device 1224 may include a display configured to display content, such as a graphical user interface (GUI) of an online payment system or information from the payment server system 1218 and/or information from the sender FI system 1210. The input device 1226 may be used to permit the sender to initiate account access and to facilitate receiving fund transfer request information from the user.

In some implementations, the sender system 1202 may enable sending funds to the recipient system 1204. For example, the sender system 1202 may include a browser or application configured to interact with online payment processes (e.g., online payment system) supported by the first non-FI system 1206.

The client application 1228 may include program logic configured to implement one or more of the functions of the sender system 1202. In some implementations, the client application 1228 may include or be an application configured to receive and display content (e.g., to the display device 1224) or may include or be a web browser configured to receive and display web pages from the sender FI system 1210. For example, the client application 1228 may include a mobile web browser, a Short Messaging Service (SMS) or other text messaging application, a dedicated application, or other computer program configured to send/receive information over the network 1214.

Though FIG. 12 shows the sender system 1202 within the funds transfer system 1200, it is noted that in some implementations, the sender system 1202 may not reside within the funds transfer system 1200 or some or all of the functions of the sender system 1202 may be performed by the first non-FI system 1206. For example, in some implementations where the first non-FI system 1206 incorporates a physical payment terminal, the funds transfer system 1200 may not include the sender system 1202, and/or the first non-FI system 1206 may perform some or all of the functions ascribed to the sender system 1202.

The recipient system 1204 may include a digital device associated with a recipient. For instance, a recipient may be a person who receives funds proved by the sender (e.g., from the sender system 1202) via online payment processes of a non-financial institution (e.g., first non-FI system 1206). Transfers of funds to the recipient may include transfers to an account held by the recipient at a recipient financial institution. In some implementations, funds are transferred into a recipient account held by the recipient at the recipient financial institution (e.g., recipient FI system 1212) before these funds are made available to the recipient. In various implementations, the recipient FI system 1212 may provide funds to the recipient before a transfer of the funds is made from the sender's account at the sender FI system 1210 (e.g., via the ACH network 1216).

The recipient system 1204 may have some or all of the components of a digital device, an example of which is shown in FIG. 19 and discussed further herein. Like the sender system 1202, the recipient system 1204 may be computer (e.g., desktop or laptop computer), a cellular telephone, a smart phone, a mobile handheld wireless e-mail device, a personal digital assistant, a portable gaming device, or other suitable digital device. The recipient system 1204 may also include one or more processors configured to execute instructions stored in memory.

The recipient system 1204 may include network interface logic 1230, a display device 1232, an input device 1234, and a client application 1236. The network interface logic 1230, the display device 1232, and the input device 1234 may be configured similarly to their counterparts in the sender system 1202. The client application 1236 may include program logic configured to implement one or more of the functions of the recipient system 1204. In various implementations, the client application 1236 may include an application configured to receive and display content or a web browser configured to receive and display web pages from the first non-FI system 1206, the second non-FI system 1208, the sender FI system 1210, the payment service system 1218, the recipient FI system 1212, or any combination. The client application 1236 may include a mobile web browser, a Short Messaging Service (SMS) or other text messaging application, a dedicated application, or other computer program configured to send/receive information over the network 1214.

In various implementations, the recipient system 1204 may receive a notification request that requests permission to receive funds from the sender, a notification request that requests approval of a transaction, a notification indicating a status of a transfer of funds, and/or a notification of successful transfer of funds from a sender. The recipient system 1204 may be configured to interact with online payment processes supported by the first non-FI system 1206, the second non-FI system 1208, or both.

Though FIG. 12 shows the recipient system 1204 within the funds transfer system 1200, it is noted that in some implementations, the recipient system 1204 may not reside within the funds transfer system 1200 or some or all of the functions of the recipient system 1204 may be performed by the second non-FI system 1208. For example, in some implementations where the second non-FI system 1208 incorporates a physical payment terminal, the funds transfer system 1200 may not include the recipient system 1204, and/or the second non-FI system 1208 may perform some or all of the functions ascribed to the recipient system 1204.

The first non-FI system 1206 may include any number of digital devices configured to support the functions of the first non-financial institution. For example, the first non-FI system 1206 may be a server that hosts a website of a retailer. The website may allow users (e.g., sender or receiver) to browse goods and/or services. The website may also allow users to make purchases of the goods and/or services. In some implementations, the first non-FI system 1206 may be a server for interacting with an application (e.g., client application 1228 or client application 1236) on any number of digital devices. The application may allow users to make payments for the goods and/or services.

In various implementations, the first non-FI system 1206 may provide services to assist users to direct funds to other users. For example, the first non-FI system 1206 may provide an interface or device that allows the sender or recipient to register with the payment service system 1218. The interface may also enable the sender system 1202 to identify the recipient and indicate an amount to transfer to the recipient. The first non-FI system 1206 may provide all or part of the information to the payment service system 1218, the sender FI system 1210, or any other system as further described herein. In such implementations, the first non-FI system 1206 may include one or more servers each with one or more processors configured to execute instructions stored in memory. The servers may be configured to process payment information provided by the client application 1228 on the sender system 1202.

The first non-FI system 1206 may have some or all of the components of a digital device, an example of which is shown in FIG. 19 and discussed further herein. In some implementations, the first non-FI system 1206 includes a physical payment terminal that is configured to manage payments for a sender non-financial institution. In these implementations, the physical payment terminal may comprise circuitry, other hardware, and/or software configured to process payment information from the sender (e.g., a credit card at the physical terminal) or from the sender system 1202.

The first non-FI system 1206 may include network interface logic 1238, an optional display device 1240, an input device 1242, and a non-FI application 1244. The network interface logic 1238, the display device 1240, and the input device 1242 may be configured similarly to counterparts described herein.

The non-FI application 1244 may be configured to manage payments for a sender non-financial institution. For example, the non-FI application 1244 may provide a physical device, web pages, or information to applications (e.g., including client application 1228). The non-FI application 1244 may, in some implementations, allow for users to pay for goods/services previously purchased, browse goods/services, purchase goods/services, and/or provide requests to transfer money to others. In some implementations, the sender non-FI application 1244 may include program logic to process payment information provided to a physical payment terminal supported by the first non-FI system 1206. The sender non-FI application 1244 may include program logic to support online payment processes managed by the first non-FI system 1206.

In some embodiments, the non-FI application 1244 or a financial services provider (e.g., the MasterCard network) may tokenize (e.g., encrypt) a number of other identifying information associated with a financial instrument of a sender or recipient (e.g., a credit card or debit card number) to create a token for the sender or recipient. The issuing or backing financial institution for the financial instrument may be capable of de-tokenizing the token to recover the information as disclosed herein. The non-FI institution 1244 may store the tokenized financial instrument of the sender or recipient for future transactions. The non-FI application 1244 may also retrieve or identify a financial identifier that identifies a financial institution associated with the financial instrument (e.g., the financial institution that issued the financial instrument).

The second non-FI system 1208 may be similar to the first non-FI system 1206. For example, both systems may be owned by the same entity or related entities (e.g., both systems provide services for the same entity). Alternately, each system may be operated, owned, or controlled by different entities.

Like the first non-FI system 1206, the second non-FI system 1208 may include any number of digital devices configured to support the functions of the second non-financial institution. For example, the second non-FI system 1208 may provide a physical interface to receive public identifiers and/or account numbers of senders or recipients to transfer funds to any number of individuals. In another example, the second non-FI system 1208 may be a server that hosts a website of a retailer. The website may allow users (e.g., sender or recipient) to browse past purchases and/or future purchases for goods or services. The website may also allow users to make purchases of the goods and/or services. In some implementations, the second non-FI system 1208 may be a server for interacting with an application (e.g., client application 1228 or client application 1236) on any number of digital devices. The application may allow users to make payments for the goods and/or services.

In various implementations, the second non-FI system 1208 may provide services to assist users to direct funds to other users. For example, the second non-FI system 1208 may provide an interface (e.g., of a physical device) that that allows the sender or recipient to register with the payment service system 1218. The interface may also enable the sender system 1202 to identify the recipient and indicate an amount to transfer to the recipient. The second non-FI system 1208 may provide all or part of the information to the payment service system 1218, the first FI system 1206, or any other system as further described herein. In such implementations, the second non-FI system 1208 may include one or more servers each with one or more processors configured to execute instructions stored in memory. The servers may be configured to process payment information provided by the client application 1236 on the recipient system 1204.

The second non-FI system 1208 may have some or all of the components of a digital device, an example of which is shown in FIG. 19 and discussed further herein. The second non-FI system 1208 may have some or all of the components of a digital device, an example of which is shown in FIG. 19 and discussed further herein. In some implementations, the second non-FI system 1208 includes servers and/or a physical payment terminal that is configured to manage payments for a recipient non-financial institution. The physical payment terminal may comprise circuitry, other hardware, and/or software configured to process payment information in payment hardware on the recipient system 1204.

In some implementations, the second non-FI system 1208 may be configured to support online payment processes for a recipient non-financial institution. In such implementations, the second non-FI system 1208 may include one or more servers each with one or more processors configured to execute instructions stored in memory. The servers may be configured to process payment information provided by the client application 1236 on the recipient system 1204.

The second non-FI system 1208 may include network interface logic 1246, a display device 1248, an input device 1250, and a non-FI application 1252. The network interface logic 1246, the display device 1248, and the input device 1250 may be configured similarly to counterparts described herein. The non-FI application 1252 may be configured to manage payments. The recipient non-FI application 1252 may include program logic to process payment information provided to a website or a physical payment terminal supported by the second non-FI system 1208. In some implementations, the recipient non-FI application 1252 comprises program logic to support online payment processes managed by the second non-FI system 1208, as well as logic to tokenize a sender or receiver's financial instrument(s).

The sender FI system 1210 may be any digital device operated by or providing services to a financial institution (e.g., a sender financial institution). The sender FI system 1210 may have some or all of the components of a digital device, an example of which is shown in FIG. 19 and discussed further herein. The sender FI system 1210 may hold one or accounts on behalf of a sender. The sender financial institution may maintain accounts held by customers, such as demand deposit accounts, credit card accounts, home mortgage loans, student loans, or the like. The sender FI system 1210 may include one or more servers each with one or more processors configured to execute instructions stored in memory, send and receive data stored in memory, and perform one or more operations. The sender FI system 1210 may include network interface logic 1254, account processing logic 1256, an account database 1258, an information directory 1260, and token management logic 1262. The network interface logic 1254 may include program logic that connects the sender FI system 1210 to the network 1214. The network interface logic 1254 may facilitate secure communications between the sender FI system 1210 and other elements in FIG. 12.

The account processing logic 1256 may be configured to process transactions in connection with the account(s) of the account holder, such as account credits and debits to checking and savings accounts, credits and debits to home mortgage and home equity accounts, credits and debits to student loan accounts, or the like. In some implementations, when funds are transferred into or out of an account of an account holder (e.g., an account of a participant), the account processing logic 1256 may reflect an appropriate debit or credit in the account database 1258. The account processing logic 1256 may also process fund transfer requests to transfer funds from a sender to a recipient. The funds may be transferred using the techniques described herein.

The account database 1258 may be configured to store account information (e.g., transactions, information about the account holder, and so on) for accounts that are maintained by the bank on behalf of its customers.

The information directory 1260 may be configured to store tables that correlate user identifiers with account information used to effect a transfer of funds. The information directory 1260 may be used when a user identifier not specifying account information is used to effect a transfer of funds. In some implementations, the information directory 1260 may associate a sender's private identifier with a sender's account in the account database 1258. The information directory 1260 is further described herein.

"Account information," as used herein, may refer to information used to effect a transfer of funds to or from a participant of a funds transfer. Account information may include, for instance, account numbers, routing numbers, credit card numbers, digital currency codes that effect transfer of funds, or the like.

A "user identifier" or interchangeably, "user token," as used herein, may refer to information that identifies a participant of a funds transfer for the purpose of transferring funds. User identifiers may include or be associated with public identifiers/public tokens and private identifiers/private tokens.

A "public identifier" or interchangeably a "public token," may refer to information that identifies a participant of a funds transfer but that does not identify account information related to the participant. In some implementations, public identifiers may be configured to be shared by participants with one another. As an example, a participant may wish to share a public identifier with other participants who wish to send him funds or receive funds from him. Public identifiers may be, for example, email addresses or other information that may be used to identify a participant (e.g., a sender or recipient) such as a phone number.

A "private identifier" or interchangeably, a "private token," as used herein, may refer to information that identifies a user (e.g., a user with an account at the FI system) and/or may be associated with account information (e.g., an account number) related to the participant. Private identifiers may be generated by the sender FI system 1210 and may be used by the sender FI system 1210 to identify account information, such as account numbers, routing numbers, credit card information, or the like. In some implementations, the private identifier does not include a bank account number, routing number, credit card numbers, or the like.

Private identifiers may be known by one or more financial institutions and entities that are members of a payment network that effect transfers of funds to participants. In one example, the sender FI system 1210 may generate a private identifier associated with the sender. The private identifier, however, may not indicate to any other entity any private information. The sender FI system 1210 may share the sender's private identifier with the payment service system 1218. The sender's private identifier may not be provided to the sender system 1202, sender, recipient's system 1204, recipient, first non-FI system 1206, or the second non-FI system 1208. Neither the payment service system 1218 nor the recipient FI system 1212 may be able to identify any account numbers or other private information from the sender's private identifier.

The FI system (e.g., sender FI system 1210 and the recipient FI system 1212 may not share private identifiers with any entity other than FI systems (e.g., each other), the automatic clearing house system 1220 discussed herein, and/or the payment service system 1218. Similarly, the payment service system 1218 may not share the private identifiers received from FI systems with any entities other than FI systems. As described herein, participants to funds transfers between non-financial institutions may transfer funds to one another using public identifiers that the participants may provide one another, using the techniques described herein. This arrangement, in some implementations, allows the sender to uniquely identify the recipient (e.g., with an e-mail address or other identifier), without necessarily having private/personal information regarding the recipient (i.e., the recipient's bank account/routing number). In addition to the public and private identifiers that have already been described herein, additional identifiers may also be used. For example, such additional identifiers may be handled with varying levels of security. As another example, variations of existing public identifiers may be used to implement special purpose public tokens, public tokens with customized functionality, and so on, as discussed in greater detail below.

The sender FI system 1210 may include an account database 1258 and an information directory 1260. Once a user is registered with the payment service system 1218 described herein, the sender FI system 1210 may generate a private identifier associated with a user's public identifier. The private identifier of the user may be associated with both the user's public identifier (e.g., the user's email address, phone number, or other contact information) as well as a user's account at the sender FI system 1210. The account database 1258 may include the user's account and the information directory 1260 may associate the public identifier, private identifier, and account information (e.g., account number). The account database 1258 may include any number of accounts for any number of users. The information directory 1260 may include information for any number of private identifiers and public identifiers for any number of users.

The token management logic 1262 may be configured to manage tokens (e.g., public identifiers and/or private identifiers). In various implementations, the token management logic 1262 may be configured to register tokens, authenticate tokens, generate tokens, or the like. The token management logic 1262 may also facilitate identification of the recipient when a token is not recognized. The token management logic 1262 may also be used to customize attributes of tokens, such that particular accounts are used, particular methods of notification are used, and so on. The token management logic 1262 may have some or all of the attributes of the token management logic 129 shown in FIG. 2 and discussed in relation thereto.

In some implementations, the token management logic 1262 may be configured to recognize, identify, authenticate, and de-tokenize tokens of financial instruments (e.g., that were tokenized by the first non-FI system 1206). Once de-tokenized, the token management logic 1262 may recover financial information such as an account number or routing number associated with a financial instrument as discussed herein.

The recipient FI system 1212 may comprise a digital device operated by a financial institution that provides financial services to the recipient system 1204. The recipient FI system 1212 may have some or all of the components of a digital device, an example of which is shown in FIG. 19 and discussed further herein. The recipient financial institution may maintain accounts held by customers, such as demand deposit accounts, credit card accounts, home mortgage loans, student loans, or the like. The recipient FI system 1212 may include one or more servers each with one or more processors configured to execute instructions stored in memory, send and receive data stored in memory, and perform one or more operations. The recipient FI system 1212 may include network interface logic 1264, account processing logic 1266, an account database 1268, an information directory 1270, and token management logic 1272. The network interface logic 1264, the account processing logic 1266, the account database 1268, the information directory 1270, and the token management logic 1272 may be configured similarly to counterparts in the sender FI system 1210.

The payment service system 1218 may include a digital device configured to enable or facilitate payment services that allow secure transfer of funds from the sender to the recipient (e.g., from a sender account at the sender FI system 1210 to a recipient account at the recipient FI system 1212 as instructed by the sender system 1202 via the first non-FI system 1206). The payment service system 1218 may have some or all of the components of a digital device, an example of which is shown in FIG. 19 and discussed further herein. The payment service system 1218 may comprise one or more servers each with one or more processors configured to execute instructions stored in memory, send and receive data stored in memory, and perform one or more operations.

In some implementations, the payment service system 1218 assists in the transfer of funds between one or more of the sender FI system 1210, the recipient FI system 1212, the sender non-FI bank system 1214, and the recipient non-FI bank system 1216.

The payment service system 1218 may provide payment services to participants that have accounts at member banks. More particularly, in some implementations, the financial institutions associated with the sender FI system 1210 and the recipient FI system 1212 may comprise member banks. "Member banks," as used herein, may refer to financial institutions that are members of the payment service system 1218 and that follow protocols established by government agencies, regulatory bodies, or the like for transferring funds to one another. In various implementations, the payment service system 1218 provides payment services to participants that have accounts at financial institutions that are not member banks.

The payment service system 1218 may include network interface logic 1295, account processing logic 1276, an account database 1278, an information directory 1280, token management logic 1282, fund transfer logic 1284, and registration logic 1286. The network interface logic 1274, the account processing logic 1276, the account database 1278, the information directory 1280, and the token management logic 1282 may be configured similarly to counterparts in the sender FI system 1210.

In various implementations, participants to a funds transfer may share their information with the information directory 1280 using the network 1214. Network interface logic 1274 may be configured to receive information over the network 1214. The account processing logic 1276 may determine if a public identifier of a participant is registered by determining if there is an account associated with the public identifier in the account database 1278. A participant may be added to the information directory 1280 upon registering for the funds transfer system 1200 through the sender FI system 1210 or through the first non-FI system 1206. Upon registration, a new entry may be created for the newly registered user in a database that implements the information directory 1280. In some implementations, the information directory 1280 is populated automatically with public identifiers and private identifiers during a secure online banking session that includes the sender FI system 1210.

In some implementations, the information directory 1280 stores registries of other participants connected to a specific participant. For instance, for each user, the information directory 1280 may store a registry that includes a listing of each other user with whom the user has an established connection. Such connection may be established, for example, the first time that the user sends or receives funds from the other user. A connection may also be established by way of a user interface that permits a user to add connections with other users through a lookup service in the information directory 1280 and/or another information directory. An example of such a user interface is discussed in connection with FIG. 4 and further herein. The users may include not only users that are registered in the funds transfer payment network, but also other affiliated payment networks, as discussed in greater detail below. For each user in the registry, additional information may be stored, such as their unique ID and/or other information. As another example, the information for the other users may be stored in separate database entries in the information directory 1280.

In various implementations, the information directory 1280 may comprise one of a plurality of information directories, each maintained by a different institution or entity. Each information directory may store information about participants relevant to the digital device containing it. Each information directory may allow relevant participants to register with it.

The fund transfer logic 1284 may be configured to assist with the transfer of funds between two participants. The fund transfer logic 1284 is further described with regard to FIG. 13. Fund transfers may involve transfers of funds from a sender to a recipient. In various implementations, all participants to a transfer may have registered for fund transfer services provided by the payment service system 1218. However, in some implementations, at least one participant may be registered only for financial services of a financial institution and/or registered to use the purchase processes (physical purchase terminal, online purchase processes, etc.) of a non-financial institution. As noted herein, registration for fund transfer services provided by the payment service system 1218 may include registering public identifiers for participant accounts and/or receipt of participant redemption tools (e.g., financial instruments), both of which are further discussed herein. In various implementations, a recipient of a funds transfer may need not take any action to accept a payment (e.g., the recipient may have an "auto-accept" status that allows transfer to the recipient's participant account without further action by the recipient). It is noted in some implementations, the recipient may have to manually accept at least some or all fund transfers.

In some implementations, the payment service system 1218 may provide a web portal provided for an online community of individuals where such individuals obtain user names/login IDs or otherwise become registered members. The individuals may, for example, use the web portal to interact with each other and/or to interact with a service provided by the online community. Examples of online communities include MSN®, iPhone® users, Facebook®, LinkedIn®, etc. The payment service may, for example, be an additional service that is offered by the web portal to the members of the online community. As another example, the payment service may be provided by one of the financial institutions, e.g., such that a financial institution performs both the operations described herein as being performed by the sender FI system 1210, the recipient FI system 1212, the sender non-FI bank system 1214, and the recipient non-FI bank system 1216.

In implementations where the second non-FI system 1208 corresponds to a physical purchase terminal, the transfer logic 1284 may manage transfers of funds from the sender FI system 1210 to the second non-FI system 1208. Funds obtained at the second non-FI system 1208 may take the form of physical currency, digital currencies, etc. a recipient may obtain from the physical purchase terminal. In implementations where the second non-FI system 1208 supports online payment processes, the transfer logic 1284 may manage transfers of funds from the sender FI system 1210 to the second non-FI system 1208 and/or the recipient system 1204. Funds obtained at the second non-FI system 1208 and/or the recipient system 1204 may take the form of digital currencies, etc. that can be deposited into online accounts maintained by the recipient FI system 1212 and/or accessed by the second non-FI system 1208 and/or the recipient system 1204. In some implementations, the transfer logic 1284 may facilitate fund transfers to unregistered participants. In some implementations, the transfer logic 1284 may instruct the sender FI system 1210 and the recipient FI system 1212 to extract public identifiers from the transaction data. The transfer logic 1284 may further instruct the sender FI system 1210 and/or the recipient FI system 1212 to look up DDAs after the public identifiers have been extracted.

The registration logic 1286 may be configured to manage registration of unregistered participants for fund transfers. The registration logic 1286 is further described with regard to FIG. 14. In some implementations, the registration logic 1286 may issue participant accounts to access those participant accounts. A "participant account," as used herein, may refer to a registration account managed by the payment service system 1218 to assist in the transfer of funds between financial institutions. A participant account may be linked to and/or backed by funds in financial accounts provided by a financial institution. Participant accounts may be identified by account numbers and/or other account identifiers.

The registration logic 1286 may create tokenized account data for those participant accounts when a participant seeks to register user identifiers for those participant accounts. "Tokenized account data," as used herein, may comprise a representation of account information that makes the account information secure from outside discovery. In some implementations, tokenized account data may comprise a proxy number or encrypted version of account information. The tokenized account data may further include the names/identifiers/etc. of financial institutions that are associated with the account information. In various implementations, the registration logic 1286 may allow users to register user identifiers for participant accounts.

The Automatic Clearing House (ACH) system 1220 may include one or more digital devices used to transmit funds to and from bank accounts of the senders and recipients. The Automatic Clearing House (ACH) system 1220 may be used to transmit funds to and from bank accounts of the senders and recipients. In some implementations, the ACH system 1220 may facilitate secure transfer of funds and/or information between the sender FI computer system 1210 and the recipient FI computer system 1212. The ACH system 1220 may include a computer system configured similarly to the ACH system 170 shown in FIG. 1.

In some implementations, the ACH system 1220 may enable a batch processing system. A "batch processing system," as used herein, may include a system that allows financial institutions to accumulate transactions over a specified period of time. In some implementations, financial institutions that transfer funds to one another over a batch processing system may accumulate transactions over a specified period of time (hourly, daily, weekly, etc.) or until a specified event has occurred. After the specified period of time or specified event, the financial institutions may settle amounts owed to one another using a private network (e.g., ACH network 1216) and/or the ACH system 1220. In some implementations, a batch transfer system may allow financial institutions to transfer funds to one another as needed and to settle amounts owed to one another at a specified time each day, week, etc. Settlement times may be supported by regulations. As an example, National Automated Clearing House Association (NACHA) rules may require financial institutions that use a batch processing system to settle credits to one another before the end of the next business day after a specific fund transfer.

In various implementations, the ACH network 1220 may allow the sender FI system 1210 and the recipient FI system 1212 to transfer funds electronically. Instead of using paper to carry necessary transaction information, such as with checks, transactions over the ACH network 1220 may be transmitted electronically over a private network, allowing for faster and more secure processing times and cost savings.

The ACH network 1220 may process different types of transactions, including but not limited to Direct Deposit transactions and Direct Payments transactions. Direct Deposit transactions may comprise the deposit of funds for payroll, employee expense reimbursement, government benefits, tax and other refunds, and annuities and interest payments. Direct Deposit transactions may include ACH credit payment from a business or government to a consumer. Direct Payment transactions may comprise the use of funds to make a payment. In some implementations, individuals and/or organizations can make a Direct Payment via ACH as either an ACH credit or ACH debit. Direct Payment transactions may be processed as ACH debit transactions, ACH credit transactions, or some combination thereof. A Direct Payment transaction processed as an ACH credit transaction pushes funds into an account. An example of this is when a consumer initiates a payment through his/her bank or credit union to pay a bill. A Direct Payment processed as an ACH debit transaction may pull funds from an account. An example of this is when a consumer establishes a recurring monthly payment for a mortgage or utility bill, and his/her account is debited automatically.

While FIG. 12 describes a sender system 1202 and a recipient system 1204, it will be appreciated that the sender system 1202 and the recipient system 1204 may be optional. For example, a sender may interact directly with the first non-FI system 1206 which may include, for example, a physical device configured to receive a credit or debit card number from the sender. The physical device may further receive a public identifier of the sender. In some implementations, the physical device or another part of the sender system 1202 may further receive an amount to transfer to a recipient as well as a recipient public identifier. In this example, the physical device, sender system 1202, or a financial services provider (e.g., MasterCard or Visa) may tokenize the credit or debit card number and/or provide an identifier of the financial institution that backs or issued the financial instrument. The non-FI system 1206 and/or the financial services provider may provide the sender public identifier, identifier of the financial institution (e.g., that identifies the sender FI system 1210), amount to be transferred, and/or the recipient identifier to the payment service system 1218 and/or the sender FI system 1210.

Figure 13:
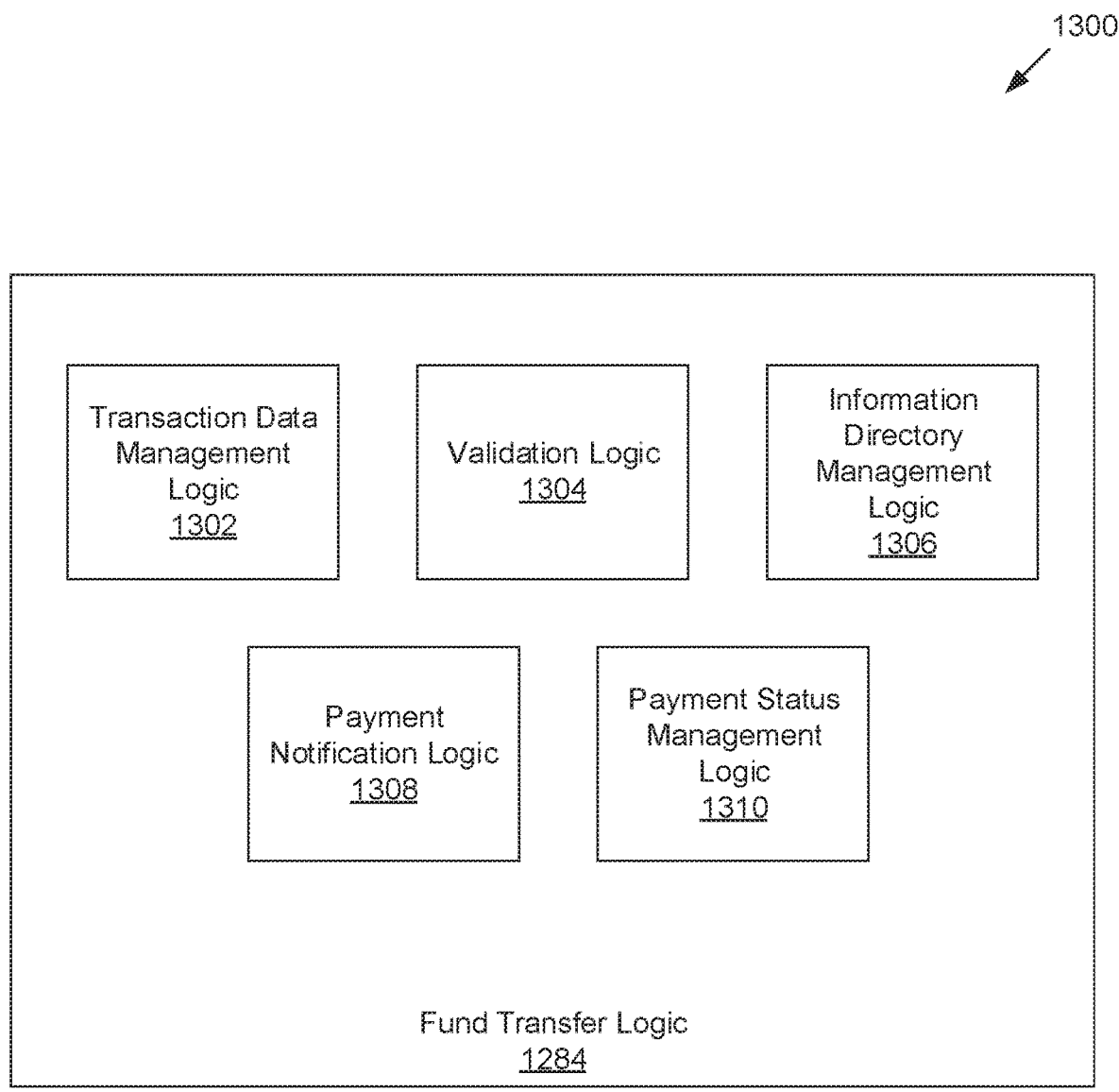
FIG. 13 depicts a diagram of transfer logic, according to some implementations.

FIG. 13 depicts a diagram of fund transfer logic 1284, according to some implementations. The fund transfer logic 1284 may include transaction data management logic 1302, payment validation logic 1304, information directory management logic 1306, payment notification logic 1308, and payment status management logic 1310. One or more of the transaction data management logic 1302, the payment validation logic 1304, the information directory management logic 1306, the payment notification logic 1308, and the payment status management logic 1310 may be implemented using physical computer processor(s) and memory stored in the fund transfer logic 1284. The memory may store computer program instructions to instruct the physical processor(s) to implement one or more of the transaction data management logic 1302, the payment validation logic 1304, the information directory management logic 1306, the payment notification logic 1308, and the payment status management logic 1310.

The transaction data management logic 1302 may be configured to manage transaction data, including transaction data to and from participant systems (e.g., the sender system 1202, the recipient system 1204, the first non-FI system 1206, and the second non-FI system 1208) as well as transaction data to and from the payment service system 1218. "Transaction data," as used herein, may refer to data related to a transaction, including a request to perform a fund transfer from one participant to another (e.g., from a sender to a recipient received from the first non-FI system 1206), public identifier of the sender, public identifier of the recipient, a transaction identifier identifying the transaction to transfer funds, a private identifier of the sender, a private identifier of the recipient, an financial institution (FI) identifier associated with the sender, an FI identifier associated with the recipient, or any combination. In some implementations, transaction data includes an amount of funds to be transferred.

The transaction data management logic 1302 may, in some implementations, receive transaction data (e.g., from the sender system 1202, the first non-FI system 1206, the sender FI system 1210, and/or financial services provider) indicating a sender is attempting to provide funds to a recipient. The transaction data may, in this example, include a public identifier of the sender, a public identifier of the recipient, a sender FI system identifier, and an amount to transfer. The transaction data management logic 1302 may determine if the sender is registered by comparing the public identifier of the sender to a list of registered users (e.g., to information in the account database 1278, the information directory 1280, or the like). If registered, the transaction data management logic 1302 may provide a success message that the sender is registered to the first non-FI system 1206 and/or the sender system 1202. Further, the transaction data management logic 1302 may provide a private identifier of the sender and the amount to be transferred to the sender FI system 1210. The transaction data management logic 1302 may also provide a public identifier of the recipient, a private identifier of the recipient, a recipient FI identifier, a public identifier of the sender and/or any other information to the sender FI system 1210.

The transaction data management logic 1302 may receive authorization from the sender FI system 1210 indicating that the sender FI system 1210 has identified the account of the sender and that the sender has sufficient funds for the transaction. At any time, the transaction data management logic 1302 may generate and share a transaction identifier with the sender FI system 1210 and/or the recipient FI system 1212 identifying the transaction to transfer funds from the sender to the recipient.

In some implementations, the transaction data management logic 1302 may provide logic and/or instruction to the first non-FI system 1206 to enable the first non-FI system 1206 to provide fund transfer options to users of the system. For example, the transaction data management logic 1302 may provide logic (e.g., code or software) to the first non-FI system 1206 to be placed or embedded within a physical device, web page or code provided by the first non-FI system 1206 to the sender or sender system 1202. The logic may allow the sender to see options to transfer money, allow the sender to input or select a recipient's public identifier, allow the sender to input or select their own public identifier, indicate an amount of funds to transfer, receive a debit or credit card number of the sender, and/or any other information.

The validation logic 1304 may be configured to validate payment details related to transaction data. Validation may involve determining if the sender public identifier is registered, determining if the recipient public identifier is registered, or determination of the FI identifier is associated with a known financial institution (or a member financial institution). It will be appreciated that the FI identifier may be generated as part of the tokenization of the debit or credit card number of the sender or in any number of ways (e.g., retrieved based on the debit or credit card of the sender, or information provided by the sender).

In various implementations, the validation logic 1304 implements one or more validation protocols (e.g., validation interfaces) that request confirmation from financial institutions whether or not a sender has authorization to provide the funds requested. The validation logic 1304 may further implement one or more checks to see if public identifiers provided in association with transaction data are valid.

The information directory management logic 1306 may be configured to provide instructions to add the transaction data to the information directory 1280. In various implementations, the information directory management logic 1306 may add, delete and/or otherwise modify or manage the information directory 1280.

The payment notification logic 1308 may be configured to provide support payment notifications, e.g., notifications to the sender FI system 1210 indicating success or failure of the fund transfer to the recipient and/or sender.

The payment status management logic 1310 may be configured to manage status updates indicating if the fund transfer is possible or if there is an error. In some implementations, the payment status management logic 1310 may request additional information to assist in the process of the fund transfer.

Figure 14:
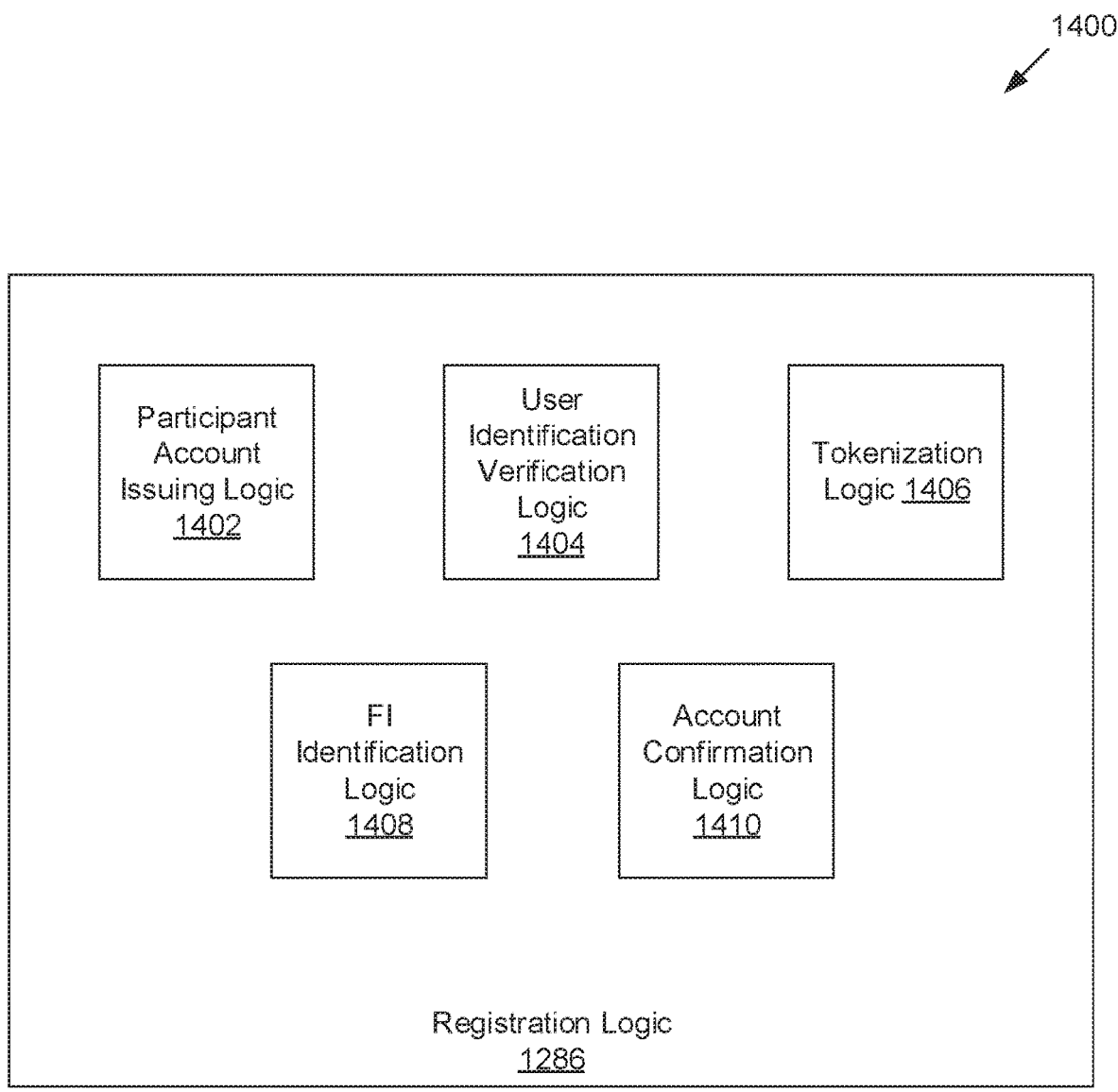
FIG. 14 depicts a diagram of registration logic, according to some implementations.

FIG. 14 depicts a diagram of registration logic 1286, according to some implementations. It will be appreciated that, in some implementations, the registration logic 1286 may register a sender and/or a recipient once. The registration logic 1286 may include participant account issuing logic 1402, user identification verification logic 1404, tokenization logic 1406, financial institution identification logic 1408, and account confirmation logic 1410. One or more of the participant account issuing logic 1402, the user identification verification logic 1404, the tokenization logic 1406, the financial institution identification logic 1408, and the account confirmation logic 1410 may be implemented using physical computer processor(s) and memory stored in the registration logic 1286. The memory may store computer program instructions to instruct the physical processor(s) to implement one or more of the participant account issuing logic 1402, the user identification verification logic 1404, the tokenization logic 1406, the financial institution identification logic 1408, and the account confirmation logic 1410.

The participant account issuing logic 1402 may be configured to facilitate issuance of participant accounts. In some implementations, the participant account issuing logic 1402 may create account numbers and/or other account identifiers that participants can use as the basis of participant accounts (e.g., which may assist in the transfer of funds between financial institutions).

The user identification verification logic 1404 may be configured to verify user identifiers when the user identifiers are provided for registering a participant account. In various implementations, the user identification verification logic 1404 is configured to assess whether a participant has the right to register a specific participant account. The user identification verification logic 1404 may further be configured to determine whether or not a user identifier and/or participant account information provided by a participant are associated with accounts at a financial institution or if the financial institution may be identified.

Verification of a public identifier may involve one or more verification techniques, such as verifying the public identifier is in appropriate format (e.g., appropriate alphanumeric format), verifying the public identifier has not been previously assigned to another participant, and verifying the public identifier does not include account information.

The tokenization logic 1406 may be configured to tokenize participant account information. In various implementations, the tokenization logic 1406 may encrypt participant account information or assign proxy numbers to participant account information to keep the participant account information secure from discovery by outside entities, including non-financial institutions.

The financial institution identification logic 1408 may be configured to identify a financial institution associated with participant account information. The financial institution identification logic 1408 may identify a participant financial institution that provides financial services to the participant system. In some implementations, the financial institution identification logic 1408 may use names/identifiers/etc. of financial institutions included in tokenized account data to identify the appropriate participant financial institution. As examples, in implementations where the participant system corresponds to the sender system 1202, the financial institution identification logic 1408 may identify the sender FI system 1210. In implementations where the participant system corresponds to the recipient system 1204, the financial institution identification logic 1408 may identify the recipient FI system 1212.

The account confirmation logic 1410 may provide status updates and/or other information to indicate whether or not a participant account has been successfully registered. The account confirmation logic 1410 may instruct the participant system to confirm ownership of the public identifier and send the public identifier and the account information to a non-FI system that corresponds to the participant system. As an example, the account confirmation logic 1410 may instruct the sender system 1202 to confirm ownership of the public identifier and send the public identifier and the account information to the first non-FI system 1206. As another example, the account confirmation logic 1410 may instruct the recipient system 1204 to confirm ownership of the public identifier and send the public identifier and the account information to the second non-FI system 1208.

The account confirmation logic 1410 may instruct the non-FI system that corresponds to the participant system to send the public identifier and the tokenized account data to the payment service system 1218. In some implementations, the public identifier and the tokenized account data is sent directly to the payment service system 1218, while in other implementations, the public identifier and the tokenized account data is sent to the payment service system 1218 through the sender non-FI bank system 1214. The account confirmation logic 1410 may instruct the relevant participant FI system to obtain an identifier of the financial institution associated with the participant using the tokenized account data. The account confirmation logic 1410 may instruct the participant FI system to perform DDA lookups, map DDA numbers to the public identifier, and associate the public identifier with the relevant user account. In various implementations, the account confirmation logic 1410 may provide confirmation of whether or not the participant was successfully registered for fund transfers at non-financial institutions.

Figure 15:
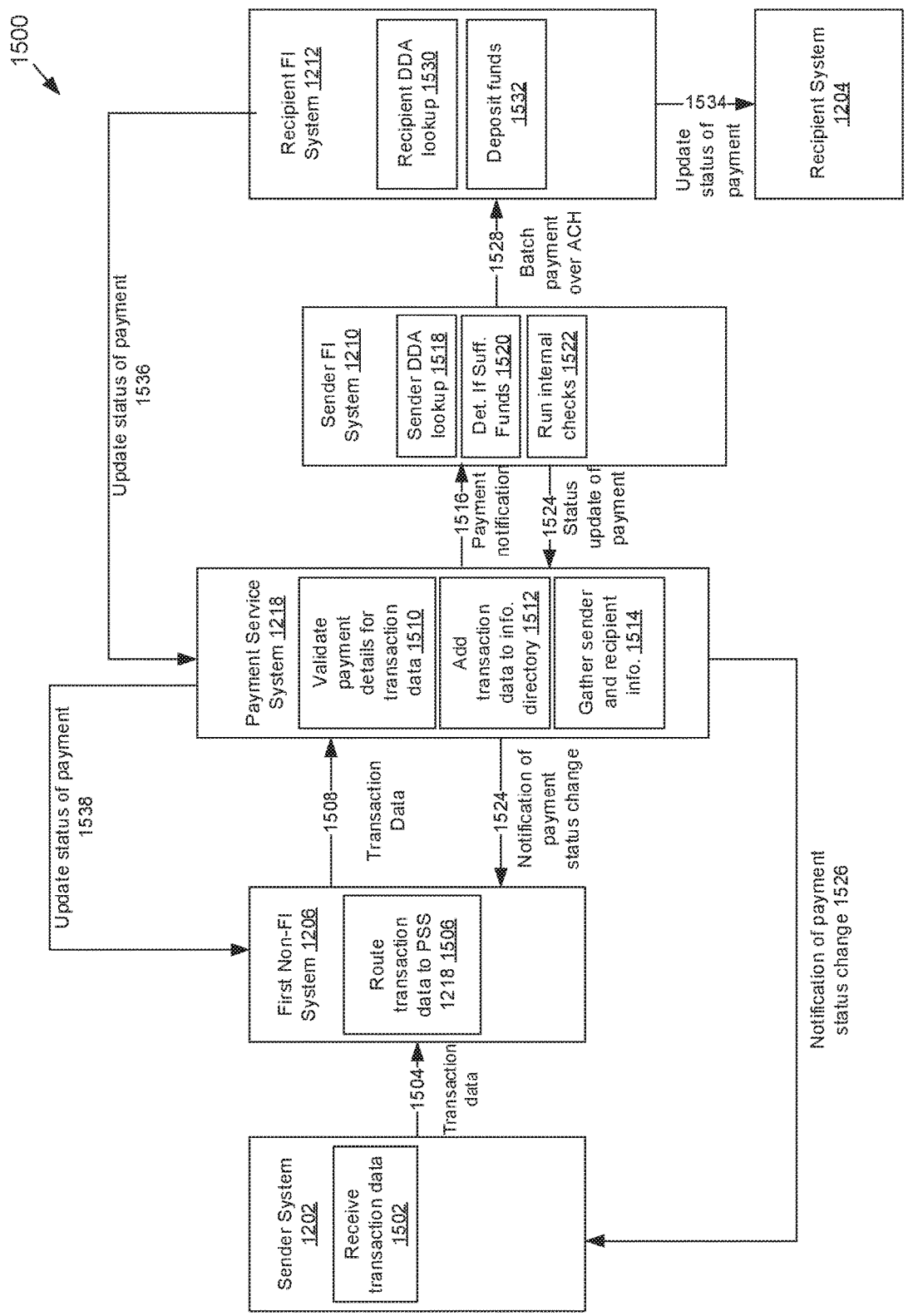
FIG. 15 depicts a diagram of a data flow for securely transferring funds from a sender to a recipient in a funds transfer system, according to some implementations.

FIG. 15 depicts a diagram of a data flow 1500 for securely transferring funds from a sender to a recipient in a funds transfer system, according to some implementations. The data flow 1500 depicted in FIG. 15 may be an example, for example, where both the sender and the recipient are already registered with the payment service system 1218. The data flow 1500 includes components of the funds transfer system 1200, shown in FIG. 12, and discussed further herein. More particularly, the data flow 1500 includes operations one or more of the sender system 1202, the recipient system 1204, the first non-FI system 1206, the sender FI system 1210, the recipient FI system 1212, and the payment service system 1218. It is noted that the elements of the data flow 1500 are by way of example only, and that various implementations may employ a greater number of elements or a lesser number of elements without departing from the scope and substance of the inventive concepts described herein.

At an operation 1502, the sender system 1202 may receive transaction data related to a fund transfer from the sender system 1202. The transaction data may specify an amount of funds to be transferred, a public identifier of a sender (e.g., a participant associated with the sender system 1202), and a public identifier of a recipient (e.g., a participant associated with the second non-FI system 1208). As further noted herein, the public identifiers of the sender and the recipient may facilitate routing the fund transfer to the recipient and facilitate reconciliation between sender and recipient financial accounts without requiring account information to be provided outside financial institutions.

At an operation 1504, the sender system 1202 may provide the transaction data to the first non-FI system 1206 over the public network 1214 (or any network). In various implementations, the sender system 1202 may provide the transaction data to a physical purchase terminal or to an application, website, or the like sourced by online purchase processes supported by the first non-FI system 1206. The transaction data may comprise the amount of funds for the transfer, as well as the public identifiers of the sender and the recipient.

It will be appreciated that operations 1502 and 1504 may be optional. For example, as discussed herein, the non-FI system 1206 may include a physical device configured to receive fund transfer information (e.g., sender public identifier, credit or debit card number, amount to be transferred or the like) from the sender without a sender system 1202.

At an operation 1506, the first non-FI system 1206 may route the transaction data to the payment service system 1218. The first non-FI system 1206 may recognize that the public identifiers of the sender and recipient are in a format that corresponds to a fund transfer managed by the payment service system 1218. At an operation 1508, the first non-FI system 1206 may provide the transaction data to the payment service system 1218 over the public network 1214 (or any other network).

At an operation 1510, the payment service system 1218 may validate payment details for the transaction data. As noted herein, validation may involve determining whether the public identifier of the sender is valid, whether the public identifier of the recipient is valid, whether the sender has authorization to provide the funds requested, and/or the like. In some implementations, the payment service system 1218 confirms that the public identifier of the sender is associated with a sender private identifier and an FI system (e.g., sender FI system 1210). Similarly, the payment service system 1218 may confirm that the public identifier of the recipient is associated with a recipient private identifier and an FI system (e.g., recipient FI system 1212). The payment validation logic 1304 may perform operation 1510.

At an operation 1512, the payment service system 1218 may add some or all of the transaction data to the information directory 1280. For example, the payment service system 1218 may log fund transfer information (e.g., time, amount to transfer, recipient public identifier, sender FI identifier, recipient FI identifier, transaction identifier, and/or the like). In some embodiments, the payment service system 1218 may store additional information, such as additional sender public identifiers, with a recipient account. In various implementations, if the fund transfer request was successfully added to the information directory 1280, the payment service system 1218 may send a notification to the first non-FI system 1206 to that effect. The information directory management logic may perform operation 1512.

At an operation 1514, the information directory management logic 1306 may gather sender private identifier and recipient private identifier from the information directory 1280. As discussed herein, the sender private identifier may have been previously generated by the sender FI system 1210 and provided to the payment services system 1218. Similarly, the recipient private identifier may have been previously generated by the recipient FI system 1212.

At an operation 1516, the payment service system 1218 may provide a payment notification to the sender FI system 1210 over the public network 1214 (or any network). The payment notification may inform the sender FI system 1210 that the fund transfer request was successfully added to the information directory 1280. The payment notification may include at least some of the transaction data, including the amount of the funds transfer request, the private identifier of the sender, and the private identifier of the recipient. The payment notification may include instructions or information to the sender FI system 1210 to assist with the transfer funds to the recipient FI system 1212. The payment notification logic 1308 may perform operation 1516.

At an operation 1518, the sender FI system 1210 may look up one or more accounts (e.g., DDAs) associated with the sender's private identifier. In various implementations, the sender FI system 1210 may use the private identifier of the sender to look up DDAs in the information directory 1260. The sender FI system 1210 may identify any number of accounts and/or other information relevant to the sender system 1206.

At an operation 1520, the sender FI system 1210 may determine if the sender account has sufficient finds to perform the fund transfer. At an operation 1522, the sender FI system 1210 may perform internal checks, such as checks related to whether or not a sender account has sufficient funds, whether or not the transaction data is likely to be fraudulent/suspicious, or any other checks which may be based on regulation compliance.

At an operation 1524, the sender FI system 1210 may provide instructions to the payment service system 1218 to update any relevant status related to whether or not funds for the fund transfer is approved and/or will be conducted. At any time the payment service system 1218 may generate a transaction identifier that identifies the transaction. The transaction identifier may be shared by the payment service system 1218 with the sender FI system 1210 and the recipient FI system 1204. The payment service system 1218 may provide to the first non-FI system 1206 a first notification of the updated status, including whether or not the funds for the transfer are to be transferred.

At an operation 1526, the payment service system 1218 may provide to the sender system 1202 (or the first non-FI system 1206) a second notification of the updated status, including whether or not the funds will be transferred. In various implementations, the payment status management logic 1310 may perform the operations 1524 and 1526.

At an operation 1528, the sender FI system 1210 may provide the recipient FI system 1212 with a batch transfer to settle fund transfer between the two financial institutions using the ACH network 1216. In various implementations, the request to settle the payment may include or be associated with an ACH message that specifies a transaction identifier (e.g., identifying the transaction and may be linked to the amount to be transferred, an identifier of the sender FI system 1210, and any other information) and/or the amount of the funds transfer. In some implementations, the batch transfer may accompany the sender private identifier, the sender public identifier, the recipient private identifier, the recipient public identifier, the FI identifier of the sender FI system 1210, and/or any other information. Alternately, the sender private identifier, the sender public identifier, the recipient private identifier, the recipient public identifier, the FI identifier of the sender FI system 1210, and/or any other information may be provided at a later time. In some implementations, the payment status management logic 1310 may perform the operation 1528.

At an operation 1530, the recipient FI system 1212 may identify the transaction identifier and retrieve information related to the transfer including, for example, the recipient and the amount of money to transfer. For example, the recipient FI system 1212 may use the transaction identifier to identify the recipient and retrieve one or more accounts (e.g., DDAs) associated with the recipient.

At an operation 1532, the recipient FI system 1212 may deposit funds in the amount of the funds transfer into the recipient account of the recipient. For example, the funds may be deposited into the recipient's DDA by the recipient FI system 1212 from the amount received in the ACH transfer.

At an operation 1534, the recipient FI system 1212 may provide the second non-FI system 1208 and/or the recipient system 1204 with an updated status indicating funds were transferred into the recipient account.

At an operation 1536, the recipient FI system 1212 may provide the payment service system 1218 with an updated status indicating funds were transferred into the recipient account. At an operation 1538, the payment service system 1218 may provide the first non-FI system 1206 or the sender system 1202 with an updated status indicating funds were transferred into the recipient account.

Figure 16A:
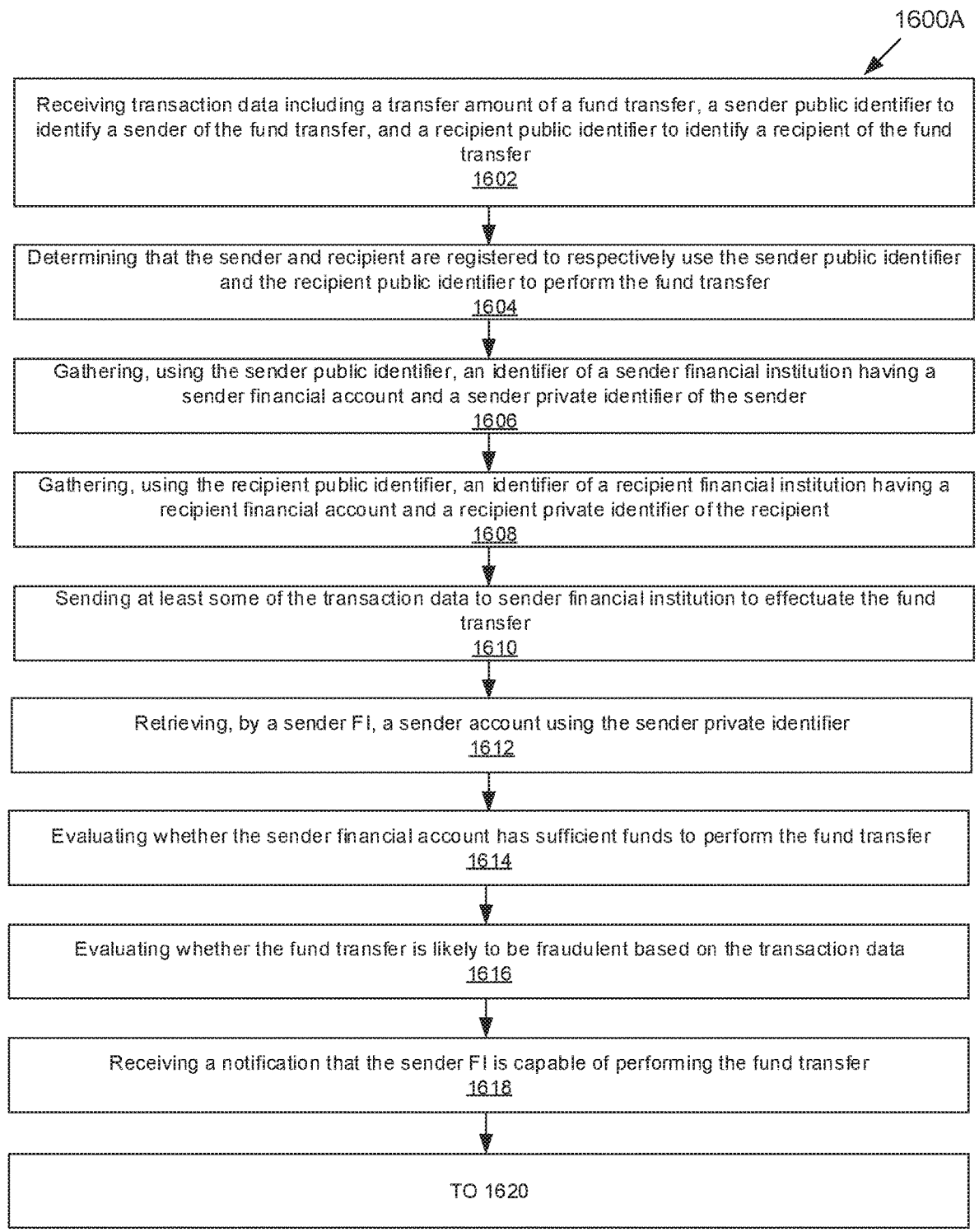
FIG. 16A depicts a diagram of a flowchart of a method for securely transferring funds from a sender to a recipient in a funds transfer system, according to some implementations.
Figure 16B:
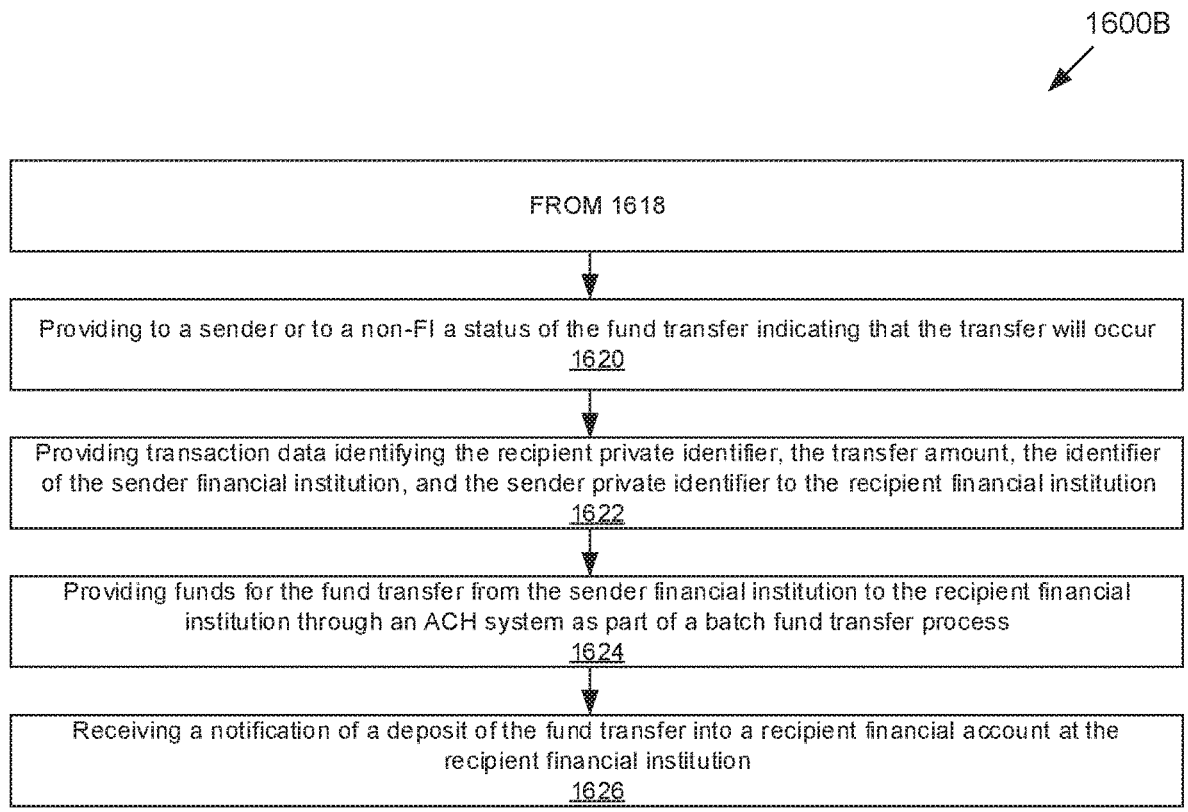
FIG. 16B depicts a diagram of a flowchart of a method for securely transferring funds from a sender to a recipient in a funds transfer system, according to some implementations.

FIG. 16A and FIG. 16B depict diagrams of flowchart of methods 1600A and 1600B for securely transferring funds from a sender to a recipient in a funds transfer system, according to some implementations. The flowchart of methods 1600A and 1600B may include similar operations as that of FIG. 15. The methods 1600A and 1600B may be performed by one or more of the systems or system components shown in FIGS. 12-14. It is noted that the methods 1600A and 1600B may include more or less operations than those explicitly shown.

At an operation 1602, the transaction data management logic 1302 may receive transaction data from the first non-FI system 1206 over the public network 1214. The transaction data may specify a transfer amount of a fund transfer between a sender and a recipient (e.g., between the sender system 1202 and the second non-FI system 1208 or the recipient system 1204). In some implementations, the transaction data may include a sender public identifier to identify a sender of the fund transfer. The sender public identifier may include information that may be used to contact the sender such as an email address, a username, a phone number, an alphanumeric string or the like that uniquely identifies the sender but does not include financial information of the sender to secure from outside discovery. The transaction data may include a recipient public identifier to identify a recipient of the fund transfer. The recipient public identifier may similarly include an email address, a username, a phone number, an alphanumeric string or the like. The recipient public identifier may also uniquely identifies the recipient but keeps financial information of the recipient secure from outside discovery.

At an operation 1604, the transaction data management logic 1302 of the payment service system 1218 may determine that the sender and recipient are registered to respectively use the sender public identifier and the recipient public identifier to perform the fund transfer. In various implementations, the transaction data management logic 1302 may determine that the sender and the recipient are registered with the information directory 1280. The transaction data management logic 1302 may determine, e.g., that public and/or private identifiers of senders and/or recipients have been registered in the information directory 1280.

At an operation 1606, the transaction data management logic 1302 may gather, using the sender public identifier, an identifier of a sender financial institution having a sender financial account and a sender private identifier. At an operation 1608, the transaction data management logic 1302 may gather, using the recipient public identifier, an identifier of a recipient financial institution having a recipient financial account and a recipient private identifier. The transaction data management logic 1302 may obtain the sender financial institution and/or the recipient financial institution using names, identifiers, etc. incorporated in the transaction data to identify the sender financial institution and the recipient financial institution.

At an operation 1610, the payment notification logic 1308 may send at least some of the transaction data and retrieved information to the sender financial institution to effectuate the fund transfer. In various implementations, the sender private identifier, the recipient public identifier, the recipient FI system 1212, and the transfer amount may be sent by the payment notification logic 1308 to the sender FI system 1210. The portions of the transaction data may comprise data sufficient to identify the sender of the fund transfer, the recipient of the fund transfer, and the transfer amount of the fund transfer.

At an operation 1612, the sender FI system 1210 may retrieve a sender account using the sender private identifier. In some implementations, the sender FI system 1210 may identify the sender account by using the sender private identifier to query the information directory 1260. The resulting response may form the basis of retrieving the sender account. As discussed herein, during registration, the sender private identifier is generated by the sender FI system 1210 during registration and may be used to link the sender with one or more account numbers of accounts of the sender maintained or managed by the sender FI system 1210. The sender private identifier may not be an account number or an encrypted account number. For example, although the sender private identifier is not provided to the sender system 1202, the recipient system 1204, or the first non-FI system 1206, the sender private identifier may have not be reverse engineerable (e.g., an account number cannot be obtained from the sender private identifier). The sender private identifier may only be an identifier that can be used by the sender FI system 1210 because of an association with other account information. At an operation 1614, the sender FI system 1210 may evaluate whether or not the sender financial account has sufficient funds to perform the fund transfer. In some implementations, the sender FI system 1210 may send one or more instructions to the sender FI system 1210 to ensure the sender has account access, sufficient funds, and other information needed to use the public identifier to perform the fund transfer.

At an operation 1616, the sender FI system 1210 may evaluate whether the fund transfer is likely to be fraudulent based on the transaction data. In some implementations, the payment validation logic 1304 may determine whether circumstances of the sender's transfer make it appear like the sender is not who the sender claims to be. The sender FI system 1210 may evaluate whether the sender's Internet Protocol (IP) addresses, etc. are valid and/or if the sender has attempted the fund transfer from an authorized system or system the sender has used before, repeated fund transfers in a short time, or the like. If the transfer passes approval, the sender FI system 1210 may provide a notification that it is capable of performing the fund transfer. At an operation 1618, the payment service system 1218 may receive a notification that the sender FI system 1210 is capable of performing the fund transfer.

In some implementations, the payment service system 1218 may generate a transaction identifier associated with the fund transfer and provide the transaction identifier to the sender FI system 1210 and the recipient FI system 1212. The transaction identifier may be used in the ACH batch transfer between the sender FI system 1210 and the recipient FI system 1212.

At an operation 1620, the payment notification logic 1308 may provide to one or more of the sender system 1202 and the first non-FI system 1206 a status of the fund transfer that indicates the fund transfer will occur.

At an operation 1622, the sender FI system 1210 or the payment service system 1218 may provide to the recipient FI system 1212 transaction data that identifies the transaction identifier, the recipient private identifier, the transfer amount, the identifier of the sender financial institution, and/or the sender private identifier to the recipient financial institution. In various implementations, the private identifiers are provided so that account information need not be transmitted over the public network 1214 (or other network).

At an operation 1624, the sender FI system 1210 may provide funds (including funds for the funds transfer) to the recipient FI system 1212 through the ACH system 1220 and/or the ACH network 1216 as part of a batch fund transfer process. At an operation 1628, the payment status management logic 1310 may receive a notification of a deposit of the fund transfer into a recipient financial account at the recipient financial institution.

Figure 17:
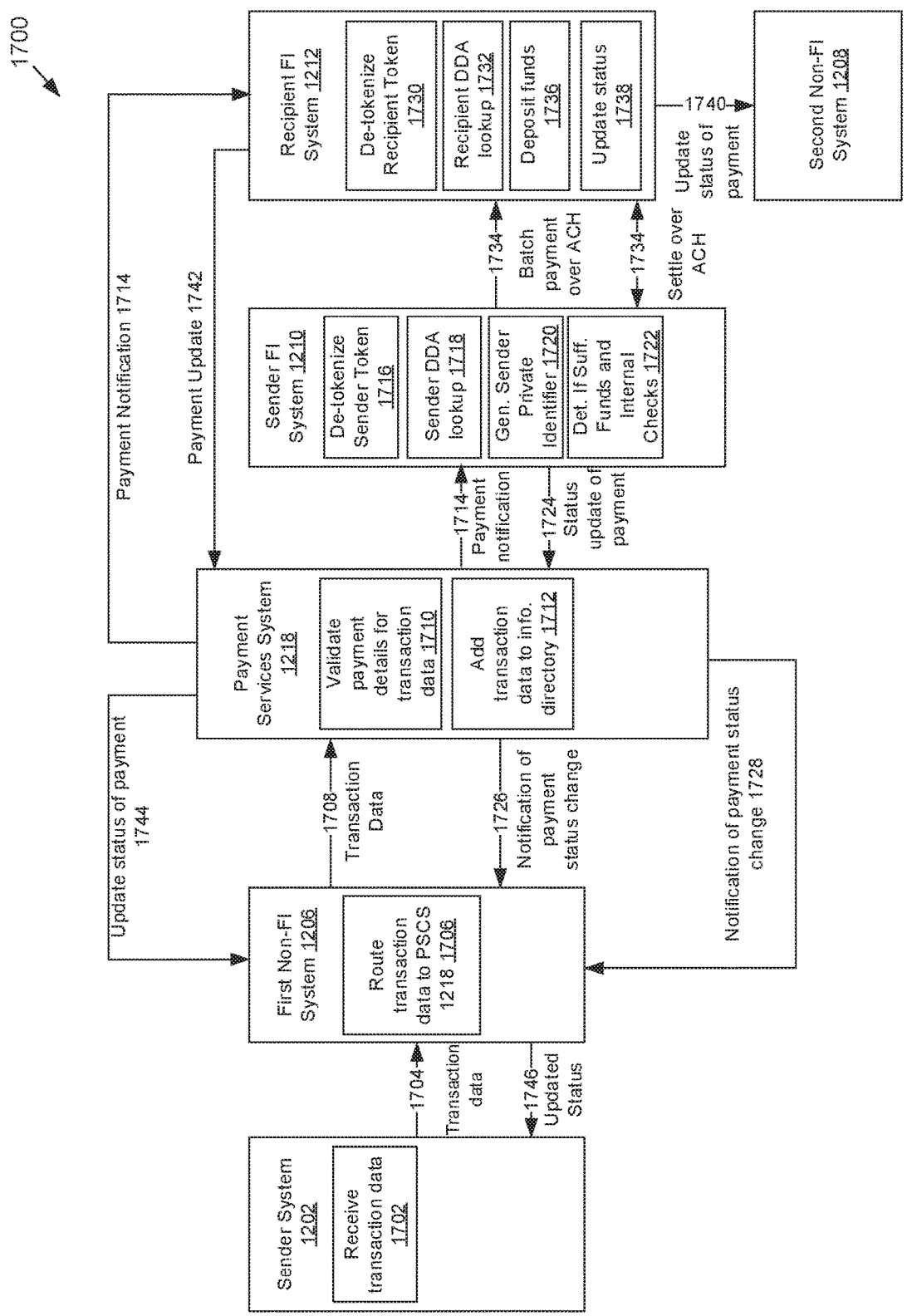
FIG. 17 depicts a diagram of a data flow for securely transferring funds from a sender to an unregistered recipient in a funds transfer system, according to some implementations.

FIG. 17 depicts a diagram of a data flow 1700 for securely transferring funds from a sender to a recipient in a funds transfer system, according to some implementations. The data flow 1700 may be, for example, where one participant, such as the sender, is not previously registered with the payment service system 1208. The data flow 1700 includes components of the funds transfer system 1200, shown in FIG. 12, and discussed further herein. More particularly, the data flow 1700 includes operations of one or more of the sender system 1202, the first non-FI system 1206, the second non-FI system 1208, the sender FI system 1210, the payment service system 1218, and the recipient FI system 1212 may provide. It is noted that the elements of the data flow 1700 are by way of example only, and that various implementations may employ a greater number of elements or a lesser number of elements without departing from the scope and substance of the inventive concepts described herein.

At an operation 1702, the sender system 1202 may receive transaction data related to a fund transfer. The transaction data may specify an amount of funds to be transferred. The transaction data may specify a public identifier of a sender (e.g., a participant associated with the sender system 1202) and a public identifier of a recipient. As further noted herein, the public identifiers of the sender and the recipient may facilitate routing the fund transfer to the recipient and facilitate reconciliation between sender and recipient financial accounts without requiring account information to be provided outside financial institutions. It will be appreciated that the recipient system 1204 may also receive transaction data related to a fund transfer.

At an operation 1704, the sender system 1202 (and the recipient system 1204) may provide the transaction data to the first non-FI system 1206 over the public network 1214. In various implementations, the sender system 1202 may provide the transaction data to a physical purchase terminal or to an application, website, or the like sourced by payment processes supported by the first non-FI system 1206. Similarly, the recipient system 1204 may provide transaction details to the second non-FI system 1208 or the first non-FI system 1206. In some embodiments, the first non-FI system 1206 and the second non-FI system 1208 are owned by the same entity. In some embodiments, the sender system 1202 provides a first financial instrument of a sender or a tokenized financial instrument of a sender (to generate a sender token) to the first non-FI system 1206 and the recipient system 1204 provides second financial instrument of the recipient or a tokenized financial instrument of the recipient (to generate a recipient token) to the first non-FI system 1206 or second non-FI system 1208.

It will be appreciated that operations 1702 and 1704 may be optional. For example, as discussed herein, the non-FI system 1206 may include a physical device configured to receive fund transfer information (e.g., sender public identifier, credit or debit card number, amount to be transferred or the like) from the sender without a sender system 1202.

It will be appreciated that the first and second non-FI system may not be necessary. For example, the sender system 1202 and the recipient system 1204 may each be smartphones configured to share transaction information (e.g., funds to be transferred, tokenized financial instruments to create tokens from the recipient and sender, and public identifiers of the sender and recipient). The transaction information may be provided to the payment services system 1218.

At an operation 1706, the first non-FI system 1206 may route the transaction data to the payment service system 1218. At an operation 1708, the first non-FI system 1206 may provide the transaction data to the payment service system 1218 over the public network 1214 (or any network). The transaction data may include a sender public identifier, a recipient public identifier, an amount to be transferred, the recipient token, and the sender token. In some implementations, the first non-FI system 1206 may receive an account number associated with any number of financial instruments. The first non-FI system 1206 may tokenize the account number of a financial instrument or provide the account number to a financial service provider associated with the financial instrument to tokenize the account number. Subsequently, the first non-FI system 1206 or the financial service provider associated with the financial instrument may provide the token(s) of the account number(s) to the payment services system 1218.

At an operation 1710, the payment service system 1218 may confirm if the sender is registered with the payment services system 1218 using the sender's public identifier. If the sender is already registered, the sender may not need to be re-registered. If the sender is not recognized, the payment services system 1218 may request additional information from the sender, sender system 1202, or the first non-FI system 1206 to identify the sender.

Similarly, the payment service system 1218 may confirm if the recipient is registered with the payment services system 1218 using the recipient's public identifier. If the recipient is already registered, the recipient may not need to be re-registered. If the recipient is not recognized, the payment services system 1218 may request additional information from the recipient, recipient system 1204, the first non-FI system 1206, or the second non-FI system 1208, to identify the sender.

In some implementations, the first non-FI system 1206 or an entity associated with the sender's financial instrument may tokenize the sender's financial instrument and/or the recipient's financial instrument (to generate the sender token and/or the recipient token). The first non-FI system 1206 may also send an FI identifier associated with the sender's financial instrument (e.g., the bank that issued the financial instrument) and the FI identifier associated with the recipient's financial instrument to the payment services system 1218. If the payment services system 1218 determines to register the sender (e.g., upon request of the sender for registration), the payment services system 1218 may identify the sender FI system 1210 with the FI identifier and may provide the sender's token and sender public identifier to the sender FI system 1210.

At an operation 1712, the payment service system 1218 may add the transaction data to the information directory 1280 to tentatively log the transaction. It will be appreciated that the non-FI system 1210 may log or store information related to the fund transfer including, for example, the sender public identifier, the funds to be transferred, the recipient public identifier, the financial identifier associated with the financial instrument, the tokenized account number of the financial instrument (e.g., the sender's token and/or the recipient's token), or any combination.

At an operation 1714, the payment service system 1218 may provide a notification including the sender public identifier, recipient public identifier, sender's token, funds to be transferred, or any other information to the sender FI system 1210 over the public network 1214 (or any network). The payment service system 1218 may also provide a notification including the sender public identifier, recipient public identifier, recipient's token, funds to be transferred, or any other information to the recipient FI system 1212 over the public network 1214 (or any network).

At an operation 1716, the sender FI system 1210 may de-tokenize the sender's token to identify the financial instrument number (e.g., the credit or debit card number). At an operation 1718, the sender FI system 1210 may look up one or more de-tokenized numbers to identify the sender and any number of accounts (e.g., DDAs) associated with the sender. In various implementations, the sender FI system 1210 may use the public identifier of the sender to further confirm accounts. The sender FI system 1210 may identify, e.g., account and/or other information relevant to the sender system 1206. If the sender and the sender's account(s) at the sender FI system 1210 are identified, in operation 1720 the sender FI system 1210 may generate a sender private identifier and share the private identifier with the payment services system 1218 which may then store the information in an information directory.

At an operation 1722, the sender FI system 1210 may determine if the sender account has sufficient finds to perform the fund transfer. The sender FI system 1210 may also perform internal checks, such as checks related to whether or not the transaction data is likely to be fraudulent/suspicious, etc. At an operation 1724, the sender FI system 1210 may provide instructions to the payment service system 1218 to update status of the transaction.

At an operation 1726, the payment service system 1218 may provide to the first non-FI system 1206 a first notification of the updated status, including whether or not the funds for the transfer may be transferred. At an operation 1728, the payment service system 1218 may provide to the first Non-FI system 1206 or the sender system 1202 a second notification of the updated status, including whether or not the funds for the transfer may be transferred. In various implementations, the payment status management logic 1310 may perform the operations 1726 and 1728.

At any time, the payment services system 1218 may generate a transaction identifier associated with the transaction. In one example, the payment services system 1218 may generate the transaction identifier once the sender private identifier is received from the sender FI system 1210 and the recipient private identifier is received from the recipient FI system 1212. The payment services system 1218 may provide transaction identifier and any other information to the recipient FI system 1212 and the sender FI system 1210.

At an operation 1730, the recipient FI system 1212 may de-tokenize the recipient token. At an operation 1734, the recipient FI system 1212 may look up one or more DDAs associated with the recipient's public identifier. The recipient FI system 1212 may use the public identifier of the recipient to look up DDAs associated with the sender system 1202 in the information directory 1270.

At an operation 1734, the sender FI system 1210 may provide the recipient FI system 1212 with a batch payment to settle the payment for the funds transfer over the ACH network 1216. In various implementations, the request to settle the payment may include a both transfer over the ACH network 1216 and may accompany the transaction identifier and the amount of the funds transfer.

At an operation 1736, the recipient FI system 1212, using the transaction identifier, may identify funds from the ACH batch processing and deposit funds in the amount of the transfer into a recipient account of the recipient. The funds may be deposited into the recipient's DDA by the recipient FI system 1212. At an operation 1738, the recipient FI system 1212 may update the status of the recipient account to indicate funds were transferred into the recipient account. At an operation 1740, the recipient FI system 1212 may provide the recipient non-FI system 1208 and/or the recipient system 1204 with an updated status indicating funds were transferred into the recipient account.

At an operation 1742, the recipient FI system 1212 may provide the payment service system 1218 with an updated status indicating funds were transferred into the recipient account. At an operation 1744, the payment service system 1218 may provide the first non-FI system 1206 with an updated status indicating funds were transferred into the recipient account. At an operation 1746, the first non-FI system 1206 may provide the sender system 1202 with an updated status indicating funds were transferred into the recipient account. At an operation 1748, the sender FI system 1210 and the recipient FI system 1212 may settle amounts of the fund transfer over the ACH system 1220 and/or the ACH network 1216. Operation 1748 may occur as part of batch transfer process between the two institutions.

In some embodiments, the recipient FI system 1212 may place funds within the recipient's account before funds are received through the ACH network from the sender FI system 1210. The recipient FI system 1212 may then be reimbursed when the batch payment is received.

Figure 18A:
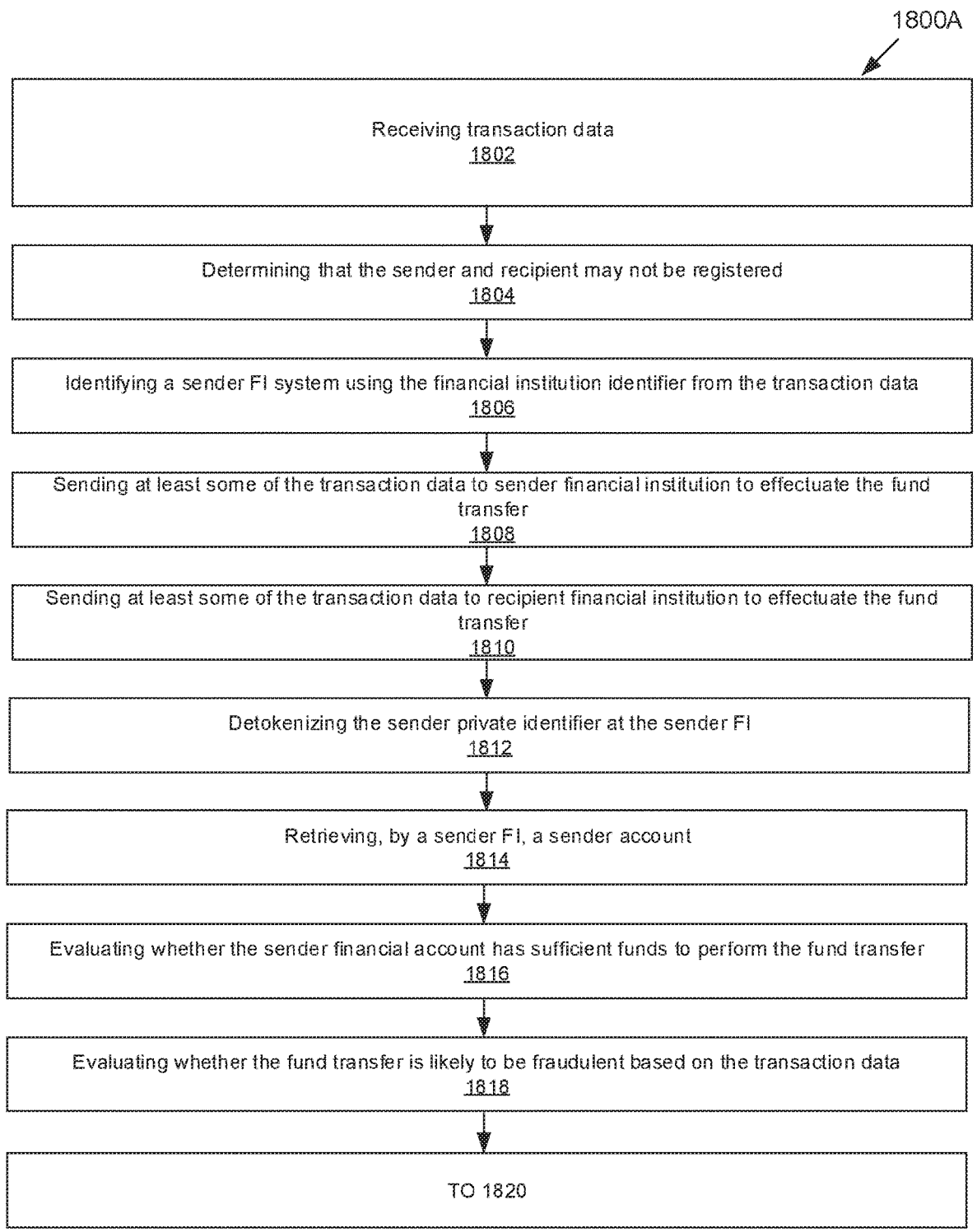
FIG. 18A depicts a diagram of a flowchart of a method for securely transferring funds from a sender to an unregistered recipient in a funds transfer system, according to some implementations.
Figure 18B:
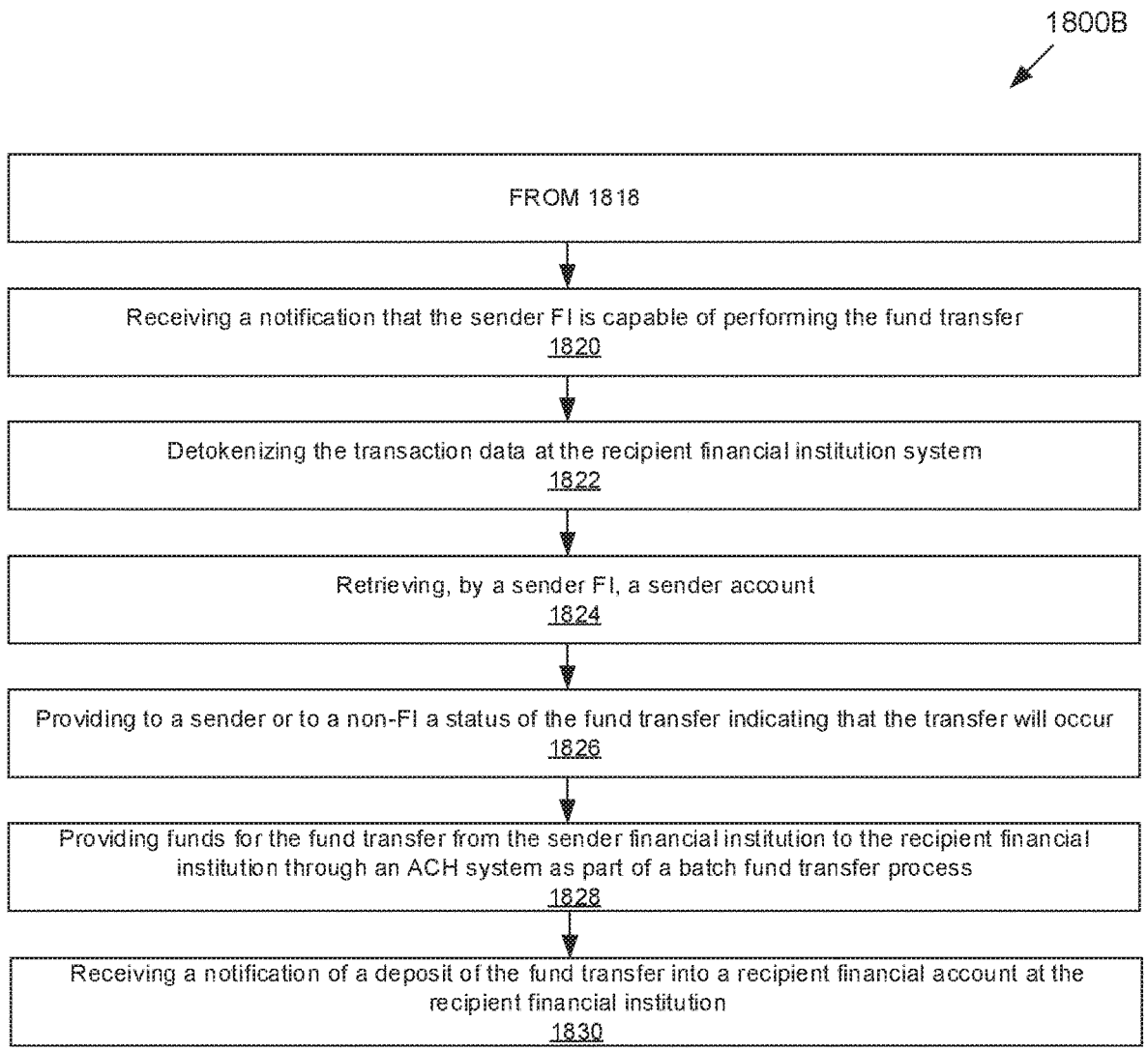
FIG. 18B depicts a diagram of a flowchart of a method for securely transferring funds from a sender to an unregistered recipient in a funds transfer system, according to some implementations.

FIG. 18A and FIG. 18B depict diagrams of flowchart of a methods 1800A and 1800B for securely transferring funds from a sender to a recipient in a funds transfer system, according to some implementations. The flowchart in 1800A and 1800B may be similar to the flow discussed in FIG. 17. The methods 1800A and 1800B may be performed by one or more of the systems or system components shown in FIGS. 12-14. It is noted that the methods 1800A and 1800B may include more or less operations than those explicitly shown.

At an operation 1802, the transaction data management logic 1302 of the payment services system 1218 may receive transaction data from the first non-FI system 1206 over the public network 1214. The transaction data may specify a transfer amount of a fund transfer between a sender and a recipient (e.g., between the sender system 1202 and the second non-FI system 1208 or the recipient system 1204), a sender public identifier to identify a sender of the fund transfer, a recipient public identifier to identify the recipient of the fund transfer, a sender token of a tokenized financial instrument of the sender, a recipient token of a tokenized financial instrument of the recipient, a sender FI identifier associated with the sender's financial instrument (e.g., issuing bank of the sender's financial instrument), and/or a recipient's FI identifier associated with the recipient's financial instrument. It will be appreciated that transaction data may be received from any number of sources. For example, the transaction data management logic 1302 may receive some of the transaction data from the first non-FI system 1206 and receive the sender token of a tokenized financial instrument of the sender, the recipient token of a tokenized financial instrument of the recipient, or both, from any number of entities.

At an operation 1804, the transaction data management logic 1302 may determine that the sender and recipient are not registered to respectively use the sender public identifier and the recipient public identifier to perform the fund transfer. In various implementations, the transaction data management logic 1302 may determine that the sender and the recipient are registered through non-financial institutions. In various implementations, the sender, the recipient, or both may not be registered.

At an operation 1806, the transaction data management logic 1302 may identify the sender FI system 1210 and the recipient FI system 1212 using the financial institution identifiers from the transaction data received in operation 1804.

At an operation 1808, the payment notification logic 1308 may send at least some of the transaction data to the sender financial institution to effectuate the fund transfer. In various implementations, the sender public identifier, the recipient public identifier, the transfer amount, recipient FI identifier, and/or the sender's token may be sent by the payment notification logic 1308 to the sender FI system 1210. The portions of the transaction data may comprise data sufficient to identify the sender of the fund transfer, the recipient of the fund transfer, and the transfer amount of the fund transfer.

At an operation 1810, the payment notification logic 1308 may send at least some of the transaction data to the recipient financial institution to effectuate the fund transfer. In various implementations, the recipient public identifier, the sender public identifier, the transfer amount, sender FI identifier, and/or the recipient's token may be sent by the payment notification logic 1308 to the recipient FI system 1212. The portions of the transaction data may comprise data sufficient to identify the sender of the fund transfer, the recipient of the fund transfer, and the transfer amount of the fund transfer.

At an operation 1812, the sender FI system 1210 may de-tokenize the sender private identifier. At an operation 1814, the sender FI system 1210 may retrieve a sender account using information from the de-tokenized sender private identifier (e.g., using the sender's credit card number or debit card number).

At an operation 1816, the sender FI system 1210 may evaluate whether or not the sender financial account has sufficient funds to perform the fund transfer. In some implementations, the sender FI system 1210 may ensure the sender has account access, sufficient funds, and other information needed to use the public identifier to perform the fund transfer.

At an operation 1818, the sender FI system 1210 may evaluate whether the fund transfer is likely to be fraudulent based on the transaction data. The sender FI system 1210 may provide a notification that it is capable of performing the fund transfer. At an operation 1820, the payment service system 1218 may receive a notification that the sender FI system 1210 is capable of performing the fund transfer.

At an operation 1822, the recipient FI system 1212 may de-tokenize the recipient's token. At an operation 1824, the recipient FI system 1212 may identify one or more of the recipient's accounts at the recipient FI system 1212 using the de-tokenized recipient's token (e.g., using the credit card number or debit card number of the recipient). If successful, may recipient FI system 1212 may provide a notification that the recipient's account has been determined to the payment service system 1218 in operation 1826. The payment services system 1218 may provide a transaction identifier for the transfer and a notification to recipient FI system 1212 and/or the sender FI system 1210 indicating that the one or both financial institutions are ready to perform the transfer.

In operation 1828, the sender FI system 1210 may provide funds for the funds transfer to the recipient FI system 1212 through the ACH system 1220 and/or the ACH network 1216 as part of a batch fund transfer process including an indication of the transaction identifier. At an operation 1830, the payment status management logic 1310 may receive a notification of a deposit of the fund transfer into a recipient financial account at the recipient financial institution.

FIG. 19 depicts a diagram of a data flow 1900 for registering a participant in a funds transfer system, according to some implementations. The data flow 1900 includes the components of the funds transfer system 1200, shown in FIG. 12, and discussed further herein. The data flow may include the payment service system 1218, and a participant system 1902, a participant non-FI system 1904, and a participant FI system 1906. In some implementations, the participant system 1902 corresponds to the sender system 1202, the participant non-FI system 1904 corresponds to the first non-FI system 1206, and the participant FI system corresponds to the sender FI system 1210. In various implementations, the participant system 1902 corresponds to the recipient system 1204, the participant non-FI system 1904 corresponds to the second non-FI system 1208, and the participant FI system 1906 corresponds to the recipient FI system 1212. The data flow 1900 further includes a plurality of operations that correspond to instructions the registration logic 1286 may provide the components of the funds transfer system 1200. It is noted that the elements of the data flow 1900 are by way of example only, and that various implementations may employ a greater number of elements or a lesser number of elements without departing from the scope and substance of the inventive concepts described herein.

At an operation 1908, the participant FI system 1906 may create a participant account. The participant account may be linked to a financial account at a financial institution. In various implementations, the participant account may comprise an account number and/or other account identifier that can be used to identify the account when a participant seeks to register a public identifier for the account. The participant account may be linked to a financial account at a financial institution that comprises financial data, such as debit/credit card information, routing numbers, account numbers, etc. The financial data may comprise identifiers (names, routing numbers, etc.) of financial institutions that provide financial services to the participant system 1902. At an operation 1910, the participant FI system 1906 may create of a financial instrument (e.g., debit/credit cards may be printed and/or online accounts created for the participant account).

At an operation 1912, the participant FI system 1906 may share the financial instrument with the participant (user of the participant system 1902), the participant system 1902, and/or the payment service system 1218. The participant FI system 1906 may share the financial instrument in conjunction with a financial services provider (e.g., MasterCard). In some implementations, a code may be mailed and/or electronically sent to a participant or the participant system 1902 so that a participant may register user identifier(s) for the participant account.

In some implementations, a participant system 1902 may interact with the participant non-FI system 1904. In other implementations, the participant may interact with the participant non-FI system 1904 (e.g., using a credit card and a physical device of the participant non-FI). Operations 1914-1920 are described herein from using the participant system 1902 although it will be appreciated that other implementations do not require all or any of the operations.

At an operation 1914, the participant system 1902 may receive a request from the participant to register a participant account using the financial instrument. At an operation 1916, the participant system 1902 may provide the participant with one or more participant registration screens. At an operation 1918, the participant system 1902 may receive a public identifier of a participant. In some implementations, the public identifier and the account information may be provided into an input device of the participant system 1902. The public identifier may comprise an alphanumeric or other string that can identify the participant. The participant system 1902 may receive passwords, biometric authentication techniques, other authentication techniques or the like that allow verification of the public identifier.

At an operation 1920, the participant system 1902 may send the public identifier and the participant account information to the participant non-FI system 1904. In some embodiments, the participant system 1902 or participant (e.g., a user) may provide the financial instrument (e.g., an account number, routing number or the like related to a financial instrument) to the participant non-FI system 1904 or may tokenize the financial instrument to generate a token of the financial instrument and provide the token to the participant non-FI system 1904 or a financial services provider. The participant system 1902 may also send a FI identifier that issued the financial instrument to the participant non-FI system 1904.

At an operation 1922, the participant non-FI system 1904 or a financial services provider associated with the account data may identify tokenized account data representative of participant account information. The tokenized account data may comprise an encrypted version of the participant account information. In some implementations, the tokenized account data may comprise a proxy number that is representative of debit/credit/etc. card numbers in the participant account information. At an operation 1926, the participant non-FI system 1904 (or the financial services provider) may identify tokenized account data representative of the participant account information.

At an operation 1924, the participant non-FI system 1904 and/or the financial services provider may send the public identifier and the tokenized account data to the payment service system 1218. At an operation 1926, the participant non-FI system 1904 may optionally send the public identifier and/or the tokenized account data to the participant FI system 1906. In some implementations, the participant non-FI system 1904 may provide the information to the participant FI system 1906, the payment service system 1218, or both.

At an operation 1928, the participant FI system 1906 may optionally send the public identifier and/or the tokenized account data to the payment service system 1218. In one example, the information is shared by the participant non-FI system 1904 with the participant FI system 1906 which, in turn, optionally shares all or some of the information with the payment service system 1218.

At an operation 1930, the payment service system 1218 may verify the public identifier is not in use. Verification of the public identifier may include reviewing an information directory to determine whether another user has already registered the public identifier in association with another account. In some implementations, the payment service system 1218 may return a failure message if the public identifier is already in use. The user identification verification logic 1404 may perform operation 1930.

At an operation 1932, the payment service system 1218 may identify a participant financial institution using the tokenized account data or a financial institution identifier from the participant system 1902 and/or the participant non-FI system 1904. In some embodiments, the payment service system 1218 may evaluate the tokenized account data for names, identifiers, or the like that correspond to financial institutions. In various implementations, the payment service system 1218 may de-tokenize the tokenized account data to extract information to identify a participant financial institution (e.g., the financial institution that manages the participant FI system 1906).

At an operation 1934, the payment service system 1218 may send the public identifier and the tokenized account data (e.g., the participant's token) to the participant FI system 1906. The account confirmation logic 1410 may perform the operations 1932 and 1934.

At an operation 1936, the participant FI system 1906 may de-tokenize the tokenized account data. The participant FI system 1906 may decrypt, translate any proxy numbers, etc. to obtain account information for the participant account. At an operation 1938, the participant FI system 1906 may perform a DDA lookup using, e.g., the account information for the participant's account. At an operation 1940, the participant FI system 1906 may map the DDA to the user's public identifier. The participant FI system 1906 may generate a private identifier associated with an account number of the participant at the participant's FI system 1906. In some implementations, the participant FI system 1906 may write the account number (e.g., DDA), the public identifier, and the private identifier into an information directory stored in the participant FI system 1906. At an operation 1942, the participant FI system 1906 may update the public identifier status to reflect the fact that the public identifier can be used for future funds transfers and other transactions involving the participant.

At an operation 1944, the participant FI system 1906 may provide the payment service system 1218 with a confirmation that the public identifier can be used for future fund transfers and other transactions involving the participant. The participant FI system 1906 may also share the private identifier of the participant with the payment service system 1218.

At an operation 1946, the information directory management logic 1306 may associate the participant private identifier with the participant public identifier. At an operation 1948, the payment service system 1218 may provide the participant non-FI system 1904 with a success message that the public identifier can be used for future funds transfers and other transactions involving the participant. The account confirmation logic 1410 may perform operation 1948.

At an operation 1950, the participant non-FI system 1904 may provide configure the participant system 1902 to show a success message indicating that the participant successfully registered. At an operation 1952, the participant non-FI system 1904 may provide the participant system 1902 with a success message that the public identifier can be used for future funds transfers and other transactions involving the participant. At an operation 1954, the success message may be shown on the participant system 1902.

Figure 20:
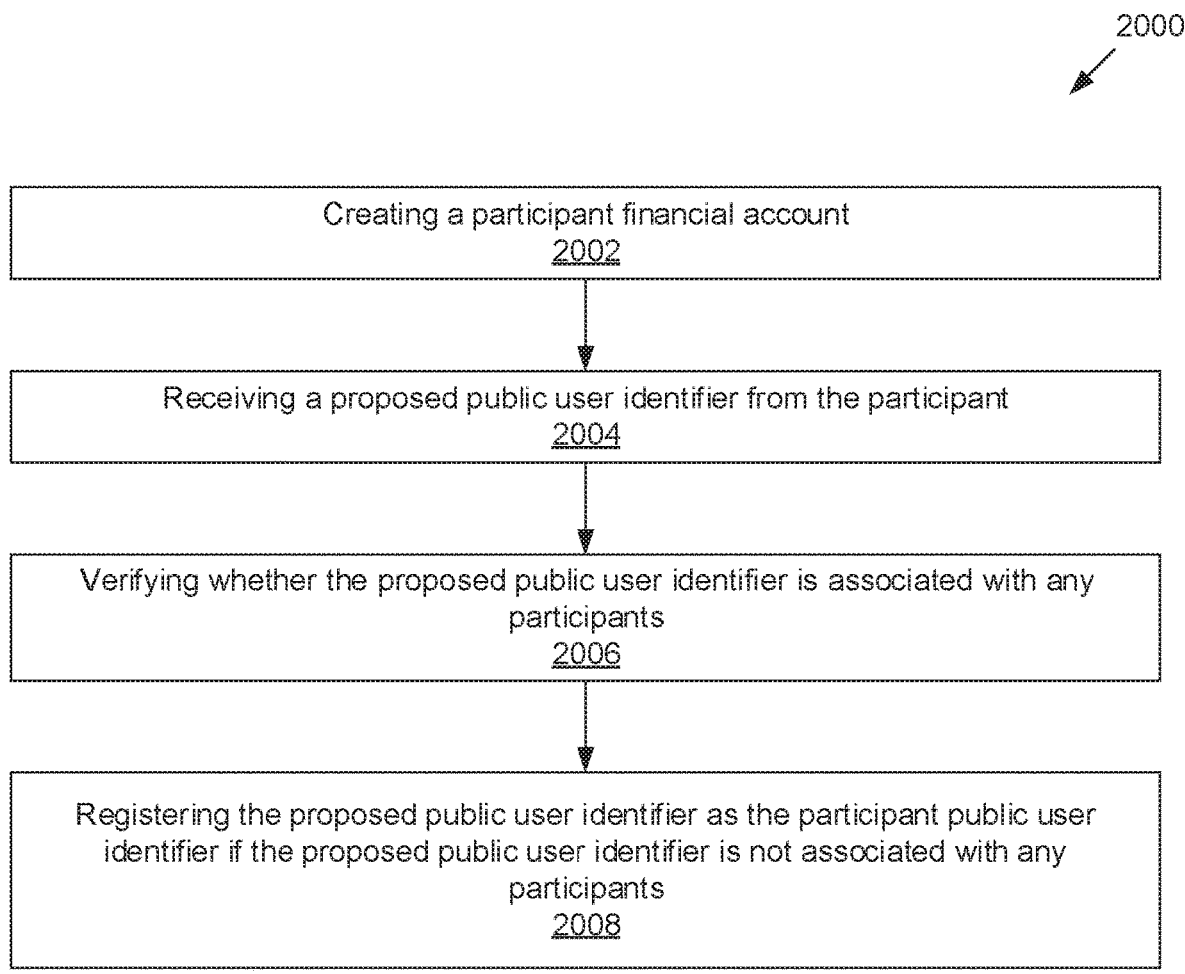
FIG. 20 depicts a diagram of a flowchart of a method for registering a participant in a funds transfer system, according to some implementations.

FIG. 20 depicts a diagram of a flowchart of a method 2000 for registering a participant in a funds transfer system, according to some implementations. The method 2000 may be performed by one or more of the modules shown in FIGS. 12-14. It is noted that the method 2000 may include more or less operations than those explicitly shown.

At an operation 2002, the participant account issuing logic 1402 creates a participant financial account. The participant account issuing logic 1402 may create a sender financial account corresponding to a specific sender or a recipient account corresponding to a specific recipient. The participant account issuing logic 1402 may link the participant account to a financial account maintained/backed by a financial institution. In some implementations, the participant account may be linked to collateral, cash, etc. The participant account issuing logic 1402 may store information about the participant account in the information directory 1280.

At an operation 2004, the user identification verification logic 1404 receives a proposed public identifier from the participant. The proposed public identifier may or may not comprise email addresses, alphanumerical usernames, Universal Payment Identification Codes (UPICs), phone numbers, user-generated or system-generated numbers or character strings, etc. The proposed public identifier may provide a basis to identify a participant and/or a participant system.

At an operation 2006, the user identification verification logic 1404 verifies whether the proposed public identifier is associated with any participants. The user identification verification logic 1404 may verify whether or not the proposed public identifier comprises appropriate email addresses, alphanumerical usernames, Universal Payment Identification Codes (UPICs), phone numbers, user-generated or system-generated numbers or character strings, etc. The user identification verification logic 1404 may verify whether or not the proposed public identifier corresponds to a public identifier used to identify another participant.

At an operation 2008, the user identification verification logic 1404 registers the proposed public identifier as the participant public identifier if the proposed public identifier is not associated with any participants. As discussed herein, the participant public identifier and any other financial information (e.g., tokens, financial instrument numbers and the like) may be shared with the participant's financial institution. Alternately, the participant may interact with the financial institution (e.g., log onto the participant's account) and the financial institution may confirm the participant's account. The financial institution may generate a participant private identifier associated with the participant and the participant's account number at the financial institution and private the participant private identifier with the payment services system.

The user identification verification logic 1404 may store the proposed public identifier along with the private identifier and associated account information in the information directory 1280.

Figure 21:
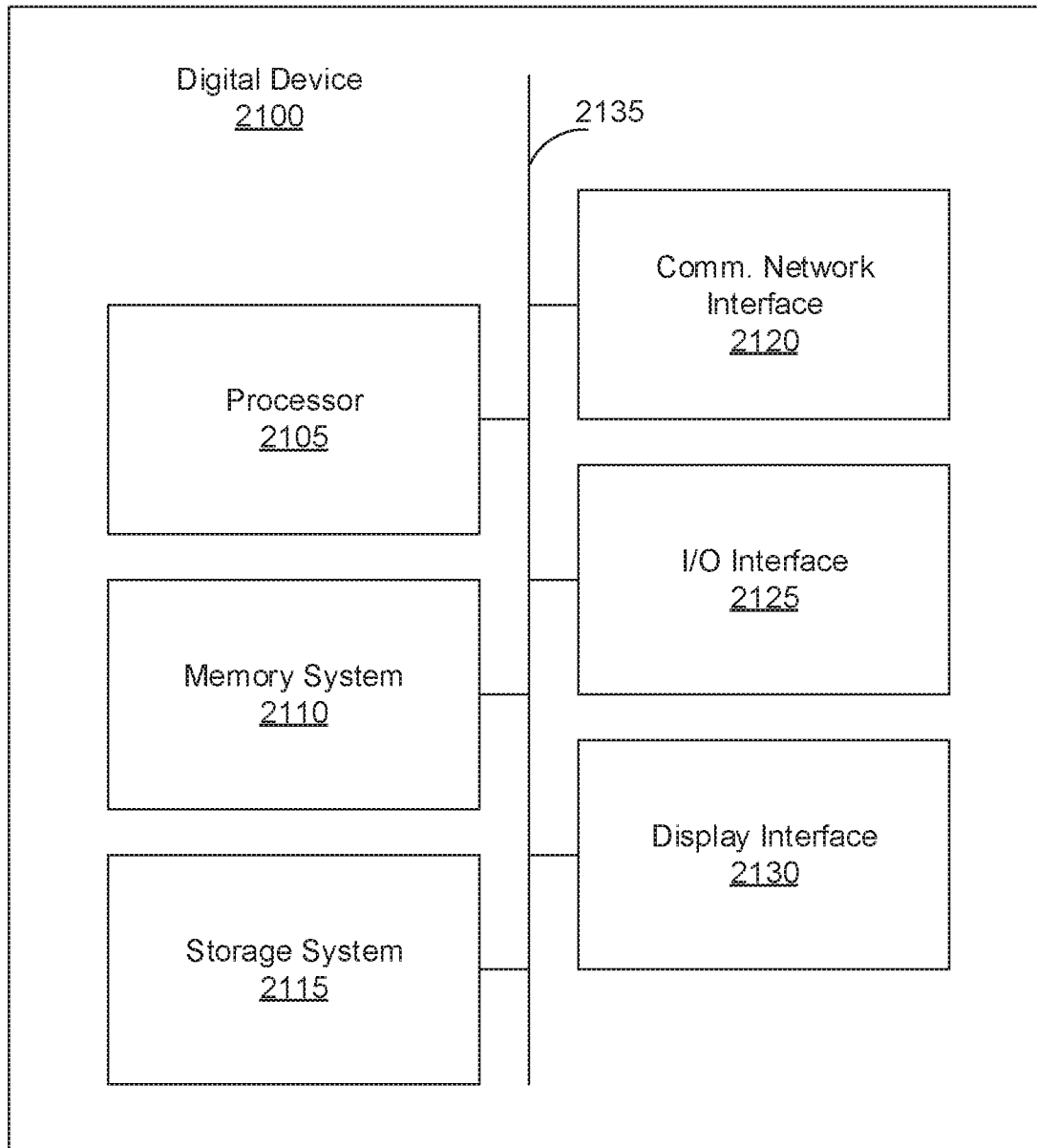
FIG. 21 depicts an example of a digital device, according to some implementations.

FIG. 21 depicts an example of a digital device 2100, according to some implementations. The digital device 2100 comprises a processor 2105, a memory system 2110, a storage system 2115, a communication network interface 2120, an Input/output (I/O) interface 2125, a display interface 2130, and a bus 2135. The bus 2135 may be communicatively coupled to the processor 2105, the memory system 2110, the storage system 2115, the communication network interface 2120, the I/O interface 2125, and the display interface 2130.

In some implementations, the processor 2105 comprises circuitry or any processor capable of processing the executable instructions. The memory system 2110 comprises any memory configured to store data. Some examples of the memory system 2110 are storage devices, such as RAM or ROM. The memory system 2110 may comprise the RAM cache. In various implementations, data is stored within the memory system 2110. The data within the memory system 2110 may be cleared or ultimately transferred to the storage system 2115.

The storage system 2115 comprises any storage configured to retrieve and store data. Some examples of the storage system 2115 are flash drives, hard drives, optical drives, and/or magnetic tape. In some implementations, the digital device 2100 includes a memory system 2110 in the form of RAM and a storage system 2115 in the form of flash data. Both the memory system 2110 and the storage system 2115 comprise computer readable media which may store instructions or programs that are executable by a computer processor including the processor 2105.

The communication network interface (com. network interface) 2120 may be coupled to a data network. The communication network interface 2120 may support communication over an Ethernet connection, a serial connection, a parallel connection, or an ATA connection, for example. The communication network interface 2120 may also support wireless communication (e.g., 802.1 a/b/g/n, WiMAX, LTE, 3G, 2G). It will be apparent to those skilled in the art that the communication network interface 2120 may support many wired and wireless standards.

The optional input/output (I/O) interface 2125 is any device that receives input from the user and output data. The display interface 2130 is any device that may be configured to output graphics and data to a display. In one example, the display interface 2130 is a graphics adapter.

It will be appreciated by those skilled in the art that the hardware elements of the digital device 2100 are not limited to those depicted in FIG. 21. A digital device 2100 may comprise more or less hardware elements than those depicted. Further, hardware elements may share functionality and still be within various implementations described herein. In one example, encoding and/or decoding may be performed by the processor 2105 and/or a coprocessor located on a GPU.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some implementations. Those skilled in the art are familiar with instructions, processor(s), and storage medium.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation," "an implementation," "some implementations," "various implementations," "certain implementations," "other implementations," "one series of implementations," or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the following claims.

What is claimed is:

1. A method comprising:
   receiving, by a computer system over a computer network from a recipient financial institution, (i) a public identifier associated with a recipient and (ii) a private profile identifier that was generated by the recipient financial institution, the private profile identifier being embedded with information that identifies the recipient financial institution, the recipient having a recipient account at the recipient financial institution, the private profile identifier being a unique identifier for the recipient at the recipient financial institution, the recipient financial institution associating the private profile identifier with an account number of the recipient account at the recipient financial institution, and the public identifier having been confirmed as useable to contact the recipient;
   storing, by the computer system, a record including the public identifier and the private profile identifier in an information directory, the record not including the account number of the recipient account;
   receiving, by the computer system over the computer network, a funds transfer request to transfer funds from a sender account of a sender at a sender financial institution to the recipient account at the recipient financial institution, the funds transfer request identifying the recipient by the public identifier, the funds transfer request not including the account number of the recipient account at the recipient financial institution or the private profile identifier, and the private profile identifier not being shared with the sender;
   determining, by the computer system, the private profile identifier for the recipient based on the public identifier in the funds transfer request and using the record stored in the information directory; and
   in response to receiving the funds transfer request, providing the private profile identifier, by the computer system over the computer network, to the sender financial institution to facilitate a transfer of the funds from the sender account at the sender financial institution to the recipient financial institution, the private profile identifier being provided to the sender financial institution to enable the sender financial institution to associate the transfer of the funds with the private profile identifier such that the recipient financial institution can identify the account number of the recipient account based on the private profile identifier,
   wherein:
   the computer system is operated by an entity that is different from the recipient financial institution and the sender financial institution.

2. The method of claim 1, wherein the public identifier comprises an email address or a phone number of the recipient.

3. The method of claim 1, wherein the private profile identifier is a unique identifier for the recipient across a plurality of financial institutions comprising the recipient financial institution.

4. The method of claim 1, wherein the transfer of the funds is initiated at the sender financial institution to cause the funds to be transferred from the sender account to the recipient account.

5. The method of claim 1, wherein the account number of the recipient account is not shared with the sender or the sender financial institution by the recipient financial institution or the computer system.

6. The method of claim 1 further comprising, before providing the private profile identifier to the sender financial institution:
   sending an expedited funds transfer message to the recipient financial institution,
   wherein:
   the expedited funds transfer message requests that the recipient financial institution provides recipient funds to the recipient account at the recipient financial institution before the funds are received by the recipient financial institution from the sender financial institution;

the sender financial institution and the recipient financial institution are members of a computer-implemented payment network, and the expedited funds transfer message comprises the private profile identifier.

7. The method of claim 6, wherein:

the private profile identifier in the expedited funds transfer message is used by the recipient financial institution to determine the account number of the recipient account for providing the recipient funds to the recipient account.

8. The method of claim 6, wherein the recipient funds are provided to the recipient account without waiting for the recipient to accept the recipient funds.

9. The method of claim 1, wherein the funds are sent from the sender financial institution to the recipient financial institution as part of a scheduled automated clearing house (ACH) batch reconciliation.

10. The method of claim 1 further comprising:

receiving, by the computer system, a second funds transfer request from a second sender, the second sender having a second sender account at the sender financial institution, the second funds transfer request being received after the private profile identifier was provided to the sender financial institution in response to receiving the funds transfer request, the second funds transfer request identifying the recipient by the public identifier, and the second funds transfer request not including (a) the account number of the recipient account at the recipient financial institution or (b) the private profile identifier;

determining, by the computer system, the private profile identifier for the recipient based on the public identifier in the second funds transfer request and using the record stored in the information directory; and in response to receiving the second funds transfer request, providing the private profile identifier, by the computer system over the computer network, to the sender financial institution to facilitate a second transfer of second funds from the second sender account at the sender financial institution to the recipient financial institution, the private profile identifier being provided to the sender financial institution to enable the sender financial institution to associate the second transfer of the second funds with the private profile identifier such that the recipient financial institution can identify the account number of the recipient account based on the private profile identifier.

11. A system comprising:

one or more processors;

one or more computer-readable media comprising computing instructions configured to be executed on the one or more processors and perform:

receiving, by a computer system over a computer network from a recipient financial institution, (i) a public identifier associated with a recipient and (ii) a private profile identifier that was generated by the recipient financial institution, the private profile identifier being embedded with information that identifies the recipient financial institution, the recipient having a recipient account at the recipient financial institution, the private profile identifier being a unique identifier for the recipient at the recipient financial institution, the recipient financial institution associating the private profile identifier with an account number of the recipient account at the recipient financial institution, and the public identifier having been confirmed as useable to contact the recipient;

storing, by the computer system, a record including the public identifier and the private profile identifier in an information directory, the record not including the account number of the recipient account;

receiving, by the computer system over the computer network, a funds transfer request to transfer funds from a sender account of a sender at a sender financial institution to the recipient account at the recipient financial institution, the funds transfer request identifying the recipient by the public identifier, the funds transfer request not including the account number of the recipient account at the recipient financial institution or the private profile identifier, and the private profile identifier not being shared with the sender;

determining, by the computer system, the private profile identifier for the recipient based on the public identifier in the funds transfer request and using the record stored in the information directory; and in response to receiving the funds transfer request, providing the private profile identifier, by the computer system over the computer network, to the sender financial institution to facilitate a transfer of the funds from the sender account at the sender financial institution to the recipient financial institution, the private profile identifier being provided to the sender financial institution to enable the sender financial institution to associate the transfer of the funds with the private profile identifier such that the recipient financial institution can identify the account number of the recipient account based on the private profile identifier, wherein:

the computer system is operated by an entity that is different from the recipient financial institution and the sender financial institution.

12. The system of claim 11, wherein the public identifier comprises an email address or a phone number of the recipient.

13. The system of claim 11, wherein the private profile identifier is a unique identifier for the recipient across a plurality of financial institutions comprising the recipient financial institution.

14. The system of claim 11, wherein the transfer of the funds is initiated at the sender financial institution to cause the funds to be transferred from the sender account to the recipient account.

15. The system of claim 11, wherein the account number of the recipient account is not shared with the sender or the sender financial institution by the recipient financial institution or the computer system.

16. The system of claim 11, wherein the computing instructions are further configured to perform, before providing the private profile identifier to the sender financial institution:

sending an expedited funds transfer message to the recipient financial institution, wherein:

the expedited funds transfer message requests that the recipient financial institution provides recipient funds to the recipient account at the recipient financial institution before the funds are received by the recipient financial institution from the sender financial institution;

the sender financial institution and the recipient financial institution are members of a computer-implemented payment network, and the expedited funds transfer message comprises the private profile identifier.

17. The system of claim 16, wherein:

the private profile identifier in the expedited funds transfer message is used by the recipient financial institution to determine the account number of the recipient account for providing the recipient funds to the recipient account.

18. The system of claim 16, wherein the recipient funds are provided to the recipient account without waiting for the recipient to accept the recipient funds.

19. The system of claim 11, wherein the funds are sent from the sender financial institution to the recipient financial institution as part of a scheduled automated clearing house (ACH) batch reconciliation.

20. The system of claim 11, wherein the computing instructions are further configured to perform:

receiving, by the computer system, a second funds transfer request from a second sender, the second sender having a second sender account at the sender financial institution, the second funds transfer request being received after the private profile identifier was provided to the sender financial institution in response to receiving the funds transfer request, the second funds transfer request identifying the recipient by the public identifier, and the second funds transfer request not including (a) the account number of the recipient account at the recipient financial institution or (b) the private profile identifier;

determining, by the computer system, the private profile identifier for the recipient based on the public identifier in the second funds transfer request and using the record stored in the information directory; and in response to receiving the second funds transfer request, providing the private profile identifier, by the computer system over the computer network, to the sender financial institution to facilitate a second transfer of second funds from the second sender account at the sender financial institution to the recipient financial institution, the private profile identifier being provided to the sender financial institution to enable the sender financial institution to associate the second transfer of the second funds with the private profile identifier such that the recipient financial institution can identify the account number of the recipient account based on the private profile identifier.

* * * * *